United States Patent
Watanuki et al.

(10) Patent No.: US 9,584,782 B2
(45) Date of Patent: Feb. 28, 2017

(54) PROJECTION DEVICE AND IMAGE CORRECTION METHOD

(71) Applicant: JVC KENWOOD Corporation, Yokohama-shi (JP)

(72) Inventors: Katsumi Watanuki, Yokohama (JP); Ryo Nishima, Yokohama (JP); Hironobu Fukutomi, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 276 days.

(21) Appl. No.: 14/546,987

(22) Filed: Nov. 18, 2014

(65) Prior Publication Data

US 2015/0070663 A1 Mar. 12, 2015

Related U.S. Application Data

(63) Continuation of application No. PCT/JP2013/063462, filed on May 14, 2013.

(30) Foreign Application Priority Data

May 18, 2012 (JP) ................... 2012-115072

(51) Int. Cl.
*H04N 9/31* (2006.01)
*G03B 21/14* (2006.01)

(52) U.S. Cl.
CPC ......... *H04N 9/3185* (2013.01); *G03B 21/142* (2013.01); *G03B 21/145* (2013.01);
(Continued)

(58) Field of Classification Search
CPC .. G03B 21/142; G03B 21/147; H04N 9/3185; H04N 9/3188; H04N 9/3194; H04N 9/3147

See application file for complete search history.

(56) References Cited

U.S. PATENT DOCUMENTS

| | | | |
|---|---|---|---|
| 6,431,711 B1* | 8/2002 | Pinhanez | G03B 21/28 348/E5.137 |
| 7,090,358 B2* | 8/2006 | Feigel | G06F 3/011 348/77 |

(Continued)

FOREIGN PATENT DOCUMENTS

| | | |
|---|---|---|
| JP | 3092698 U | 3/2003 |
| JP | 2004-077545 A | 3/2004 |

(Continued)

OTHER PUBLICATIONS

Office Action in Taiwanese Patent Application No. 10520905290 dated Jul. 22, 2016.

(Continued)

*Primary Examiner* — Bao-Luan Le
(74) *Attorney, Agent, or Firm* — Venable LLP; Michael A. Sartori

(57) ABSTRACT

A projection device includes a correction unit that corrects a trapezoidal distortion of a projection image projected onto a projection medium in accordance with a projection angle derived by a projection angle deriving unit, and the correction unit sets a correction amount for the trapezoidal distortion of a case where the derived projection angle is changed within a range larger than a first predetermined angle determined based on the projection direction toward a boundary between a first projection face and a second projection face and smaller than a second predetermined angle determined based on the projection direction toward the boundary to be the correction amount for the trapezoidal distortion at one of the first predetermined angle and the second predetermined angle or less.

4 Claims, 31 Drawing Sheets

(52) U.S. Cl.
CPC ......... *G03B 21/147* (2013.01); *H04N 9/3188* (2013.01); *H04N 9/3194* (2013.01)

(56) References Cited

U.S. PATENT DOCUMENTS

| | | | | |
|---|---|---|---|---|
| 7,134,080 B2* | 11/2006 | Kjeldsen | ................... | H04N 5/74 348/E5.137 |
| 7,289,114 B2* | 10/2007 | Damera-Venkata | ... | G09G 3/007 345/100 |
| 7,358,930 B2* | 4/2008 | Childers | .............. | H04N 9/3188 345/32 |
| 7,530,019 B2* | 5/2009 | Kjeldsen | ................... | H04N 5/74 715/730 |
| 7,576,727 B2* | 8/2009 | Bell | ......................... | G06F 3/011 345/156 |
| 8,155,872 B2* | 4/2012 | Kjeldsen | .............. | G03B 21/006 340/8.1 |
| 8,199,108 B2* | 6/2012 | Bell | ......................... | G06F 3/011 345/156 |
| 8,446,288 B2* | 5/2013 | Mizushima | .......... | H04N 9/3129 340/539.1 |
| 8,454,173 B2* | 6/2013 | Nakamura | ............. | G03B 21/14 345/1.3 |
| 8,589,796 B2* | 11/2013 | Moesgaard Kjeldsen | ................ | G03B 21/28 715/730 |
| 8,591,039 B2* | 11/2013 | Morrison | .............. | G06F 3/0412 348/745 |
| 8,840,250 B1* | 9/2014 | Yao | ......................... | G01S 17/46 345/633 |
| 8,845,110 B1* | 9/2014 | Worley, III | ............ | G03B 17/54 348/135 |
| 8,887,043 B1* | 11/2014 | Pollack | ................... | G06F 3/017 345/108 |
| 8,905,551 B1* | 12/2014 | Worley, III | ............. | G06F 3/011 353/122 |
| 9,028,076 B2* | 5/2015 | Nishima | ................. | G03B 21/16 353/119 |
| 9,129,375 B1* | 9/2015 | Liu | ....................... | G06T 7/0038 |
| 9,241,141 B1* | 1/2016 | Chang | ................... | H04N 7/183 |
| 9,268,520 B1* | 2/2016 | Cederlof | ................... | G06F 3/16 |
| 9,336,602 B1* | 5/2016 | Chang | ................... | G06T 7/0075 |
| 2002/0105623 A1* | 8/2002 | Pinhanez | ............... | G03B 21/28 353/69 |
| 2004/0036717 A1* | 2/2004 | Kjeldsen | .................. | H04N 5/74 715/730 |
| 2005/0025388 A1* | 2/2005 | Damera-Venkata | ... | G09G 3/007 382/300 |
| 2005/0078056 A1* | 4/2005 | Childers | .............. | H04N 9/3188 345/32 |
| 2005/0128437 A1* | 6/2005 | Pingali | ................. | H04N 9/3194 353/69 |
| 2005/0195373 A1* | 9/2005 | Feigel | ..................... | G06F 3/011 353/94 |
| 2007/0013716 A1* | 1/2007 | Kjeldsen | ................. | H04N 5/74 345/594 |
| 2008/0180637 A1* | 7/2008 | Kjeldsen | .............. | G03B 21/006 353/11 |
| 2008/0218641 A1* | 9/2008 | Kjeldsen | ................. | H04N 5/74 348/746 |
| 2010/0289664 A1* | 11/2010 | Mizushima | .......... | H04N 9/3129 340/691.6 |
| 2011/0157486 A1* | 6/2011 | Murata | ................... | G08B 7/062 348/744 |
| 2012/0140188 A1 | 6/2012 | Yasuda et al. | | |
| 2013/0010268 A1* | 1/2013 | Nishima | ................. | G03B 21/16 353/52 |

FOREIGN PATENT DOCUMENTS

| | | |
|---|---|---|
| JP | 2005-318355 A | 11/2005 |
| JP | 4772917 B1 | 9/2011 |
| TW | 200536384 A | 11/2005 |
| TW | M425322 U1 | 3/2012 |

OTHER PUBLICATIONS

International Search Report and Written Opinion in PCT International Application No. PCT/JP2013/063462, dated Jun. 25, 2013.

* cited by examiner

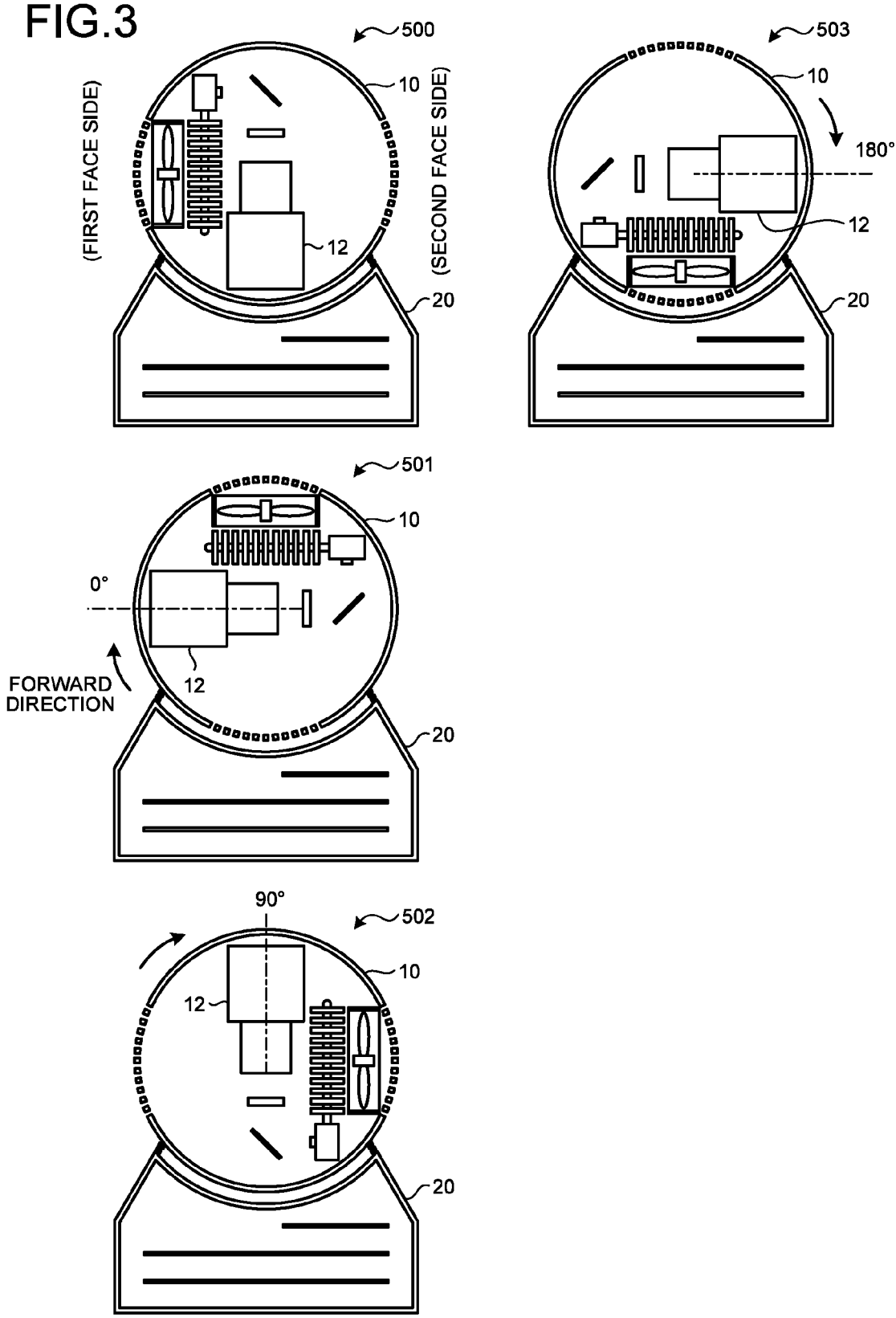

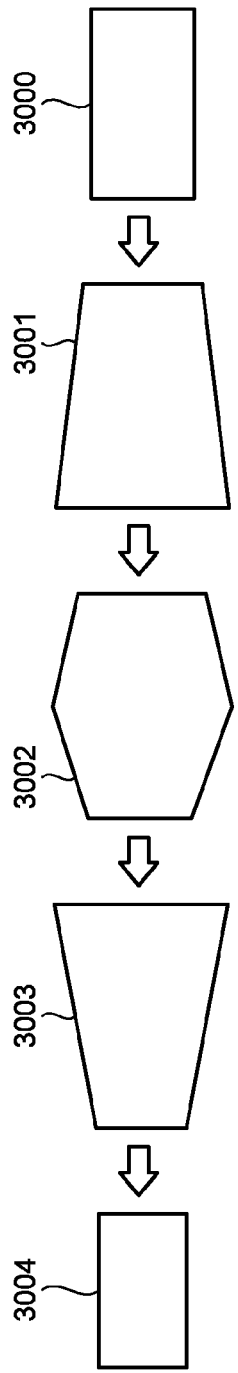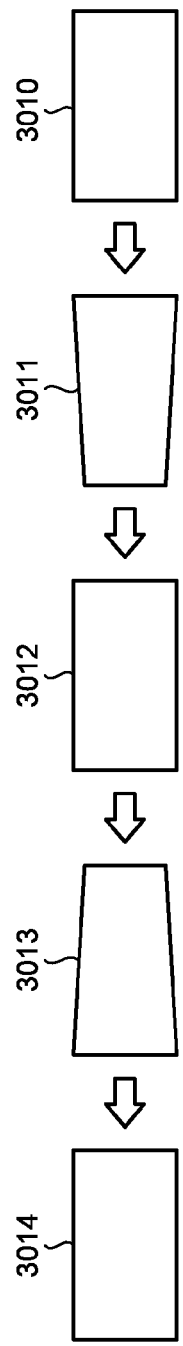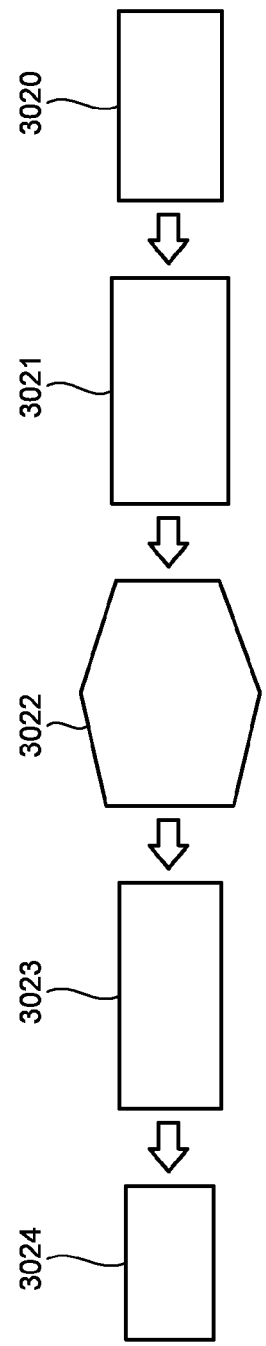

PROJECTION DEVICE AND IMAGE CORRECTION METHOD

CROSS-REFERENCE TO RELATED APPLICATION(S)

This application is a continuation of International Application No. PCT/JP2013/063462, filed on May 14, 2013 which claims the benefit of priority of the prior Japanese Patent Application No. 2012-115072, filed on May 18, 2012, the entire contents of which are incorporated herein by reference.

BACKGROUND OF THE INVENTION

1. Field of the Invention

The present invention relates to a projection device and an image correction method.

2. Description of the Related Art

A projection device such as a projector device is known which drives display elements based on an input image signal and projects an image relating to the image signal on a projection face of a projection medium such as a screen or a wall face. In such a projection device, in a case where a projection image is projected not in a state in which an optical axis of a projection lens is perpendicular to the projection face but in a state in which the optical axis of the projection lens is inclined with respect to the projection face, a problem of a so-called trapezoidal distortion in which a projection image projected in an originally approximate rectangular shape is displayed to be distorted in a trapezoidal shape on the projection face occurs.

Accordingly, conventionally, by performing a trapezoidal correction (keystone correction) for converting an image that is a projection target into a trapezoidal shape formed in a direction opposite to the trapezoidal distortion occurring in the projection image displayed on the projection face, a projection image having an approximately rectangular shape without any distortion is displayed on the projection face.

For example, in Japanese Patent Application Laid-open No. 2004-77545, a technology for projecting an excellent video for which a trapezoidal distortion correction has been appropriately performed onto a projection face in a projector also in a case where the projection face is either a wall face or a ceiling is disclosed.

More specifically, in Japanese Patent Application Laid-open No. 2004-77545, a technology is disclosed in which, in a case where a video is projected while moving the video in the vertical direction, when an inclined angle from a reference position, which relates to the vertical direction, of an inclining mechanism unit supporting a video projection mechanism unit projecting the video to be rotatable in the vertical direction becomes a predetermined inclined angle set in advance, the degree of correction at the time of performing a trapezoidal correction for video data corresponding to a video is changed by reversing the upper side and the lower side of the trapezoid.

In addition, in Japanese Patent Application Laid-open No. 2004-77545, a technology is disclosed in which, in a case where a video is projected while being moved in the horizontal direction, when a displacement angle displaced from the reference position, which relates to the horizontal direction, of a rotation mechanism unit that supports the video projection mechanism unit projecting a video to be rotatable in the horizontal direction becomes a predetermined displacement angle set in advance, the degree of correction at the time of performing a trapezoidal correction of video data corresponding to a video is changed by reverting the left side and the right side of the trapezoid.

Meanwhile, in Japanese Patent Application Laid-open No. 2004-77545 described above, in a case where the projection position on a projection medium is moved while the video is continued to be projected, the kind of the trapezoidal correction performed on each corner of the projection medium and the kind of video to be projected are not disclosed.

In other words, for example, when a video is continuously projected while the projection position is changed from the front wall portion of the projection medium to the ceiling portion, in a case where a corner of the front wall portion and the ceiling portion is included in the projection range of the projected video, the kind of the trapezoidal correction to be performed and the like are not disclosed. The same is true of the case of a corner of the front wall portion and the side wall portion. Only it is disclosed that the degree of a correction for the projected video is switched between before and after a predetermined displacement angle set in advance in a non-continuous manner.

Thus, in a case where the projection position on the projection medium is changed while the projection of the video is continued, according to the technology disclosed in Japanese Patent Application Laid-open No. 2004-77545 described above, in a case where the projected video is positioned at the corner (for example, a corner of the front wall portion and the side wall portion or a corner of the front wall portion and the ceiling portion) of the projection medium, a problem in that the shape of the projected video changes in a non-continuous manner before and after the above-described predetermined displacement angle set in advance is supposed to occur.

For example, in a case where the projection position of the video is changed from the front wall portion to the ceiling portion, the video positioned at the corner is projected for up to the predetermined displacement angle such that a portion projected to the front wall portion has a rectangular shape, and a portion projected to the ceiling portion with the corner formed as the boundary has a trapezoidal shape. Then, after the predetermined displacement angle, a video is projected such that a portion projected to the front wall portion has a trapezoidal shape, and a portion projected to the ceiling portion with the corner formed as the boundary has a rectangular shape. In other words, between before and after the predetermined displacement angle, the shape of the projected video changes in a non-continuous manner.

In addition, in a case where the projection image reciprocates over the corner of the projection medium or in a case where the movement of the projection image is stopped at the corner limit, the forward/backward conversion of the trapezoidal correction is repeatedly performed, and the shape of the projected video repeatedly changes in a non-continuous manner in accordance with the repeated conversion, and accordingly, the occurrence of a problem in that the projection image becomes unstable may be supposed.

As above, according to the technology disclosed in Japanese Patent Application Laid-open No. 2004-77545 described above, at the corner of two projection faces of the projection medium such as a wall face and a ceiling face lined up to have a predetermined angle therebetween, that is, at the boundary between two projection faces, the occurrence of a problem in that it is difficult to project a smooth and stable projection image that is easily viewable for an observer is supposed.

SUMMARY OF THE INVENTION

It is an object of the present invention to at least partially solve the problems in the conventional technology.

There is provided a projection device that includes a projection unit that converts input image data into light and projects converted light with a predetermined view angle as a projection image onto a projection medium configured by a first projection face and a second projection face lined up to have a predetermined angle therebetween; a projection direction changing unit that changes a projection direction of the projection unit from a first projection direction up to a second projection direction; a projection angle deriving unit that derives a projection angle of the projection unit in the projection direction changed by the projection direction changing unit; and a correction unit that corrects a trapezoidal distortion of the projection image projected onto the projection medium in accordance with the projection angle derived by the projection angle deriving unit, and the correction unit sets a correction amount for the trapezoidal distortion of a case where the derived projection angle is changed within a range larger than a first predetermined angle determined based on the projection direction toward a boundary between the first projection face and the second projection face and smaller than a second predetermined angle determined based on the projection direction toward the boundary to be the correction amount for the trapezoidal distortion at one of the first predetermined angle and the second predetermined angle or less.

There is also provided an image correction method that includes converting input image data into light and projecting converted light with a predetermined view angle as a projection image onto a projection medium configured by a first projection face and a second projection face lined up to have a predetermined angle therebetween using a projection unit; changing a projection direction of the projection unit from a first projection direction up to a second projection direction; deriving a projection angle of the projection unit in the projection direction changed in the changing of a projection direction; and correcting a trapezoidal distortion of the projection image projected onto the projection medium in accordance with the projection angle derived in the deriving of a projection angle, and in the correcting of a trapezoidal distortion, a correction amount for the trapezoidal distortion of a case where the derived projection angle is changed within a range larger than a first predetermined angle determined based on the projection direction toward a boundary between the first projection face and the second projection face and smaller than a second predetermined angle determined based on the projection direction toward the boundary is set to be the correction amount for the trapezoidal distortion at one of the first predetermined angle and the second predetermined angle or less. The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram that illustrates each posture of the drum unit according to the first embodiment;

FIG. 30A is a diagram that illustrates a keystone correction according to the second embodiment in a case where image data is projected onto the projection faces that are two wall faces;

FIG. 30B is a diagram that illustrates a keystone correction according to the second embodiment in a case where image data is projected onto the projection faces that are two wall faces;

FIG. 30C is a diagram that illustrates a keystone correction according to the second embodiment in a case where image data is projected onto the projection faces that are two wall faces;

DETAILED DESCRIPTION OF THE PREFERRED EMBODIMENTS

Figure 1A:
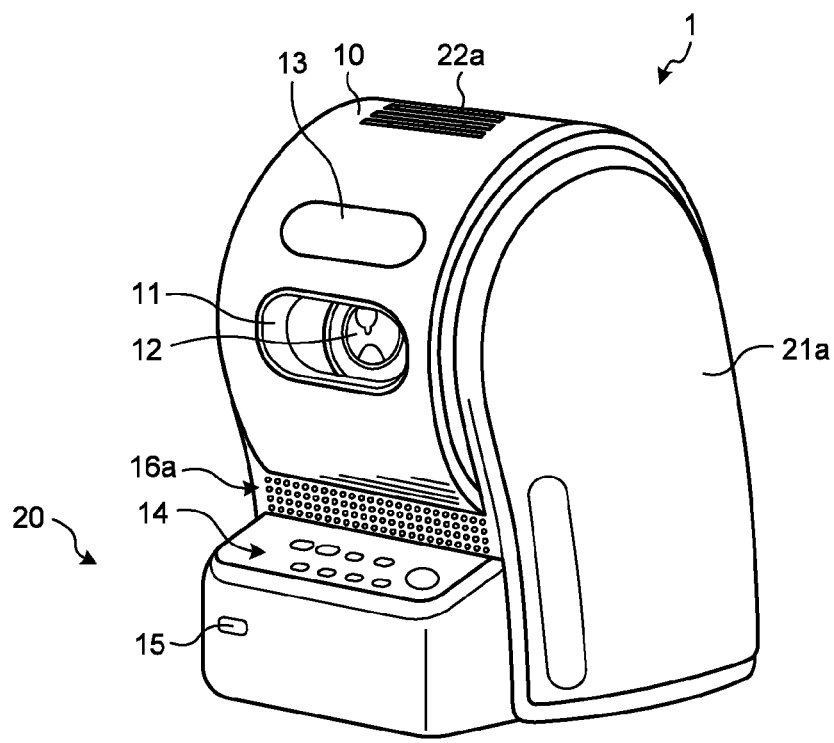
FIG. 1A is a schematic diagram that illustrates an example of the external view of a projector device according to a first embodiment.

Hereinafter, projection devices and image correction methods according to embodiments will be described in detail with reference to the accompanying drawings. Specific numerical values, external configurations, and the like represented in the embodiments are merely examples for easy understanding of the present invention but are not for the purpose of limiting the present invention unless otherwise mentioned. In addition, elements not directly relating to the present invention are not described in detail and are not presented in the drawings.

First Embodiment

External View of Projection Device

Figure 1B:
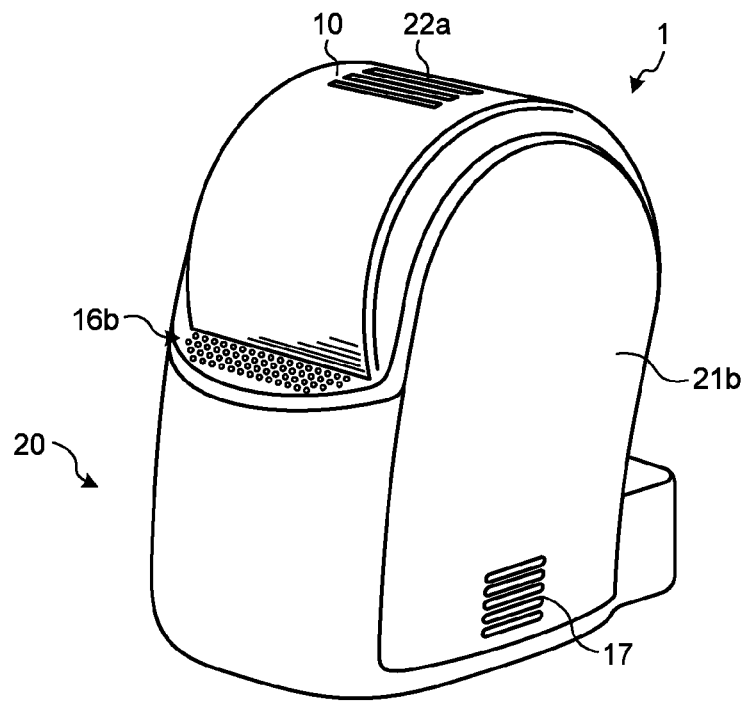
FIG. 1B is a schematic diagram that illustrates an example of the external view of the projector device according to the first embodiment.

FIGS. 1A and 1B are schematic diagrams that illustrate an example of the external views of a projection device (projector device) 1 according to a first embodiment. FIG. 1A is a perspective view of the projector device 1 viewed from a first face side on which an operation unit is disposed, and FIG. 1B is a perspective view of the projector device 1 viewed from a second face side that is a side facing the operation unit. The projector device 1 includes a drum unit 10 and a base 20. The drum unit 10 is a rotor that is driven to be rotatable with respect to the base 20. In addition, the base 20 includes a support portion supporting the drum unit 10 to be rotatable and a circuit unit performing various control operations such as rotation driving control of the drum unit 10 and image processing control.

The drum unit 10 is supported to be rotatable by a rotation shaft, which is not illustrated in the figure, that is disposed on the inner side of side plate portions 21a and 21b that are parts of the base 20 and is configured by a bearing and the like. Inside the drum unit 10, a light source, a display element that modulates light emitted from the light source based on image data, a drive circuit that drives the display element, an optical engine unit that includes an optical system projecting the light modulated by the display element to the outside, and a cooling means configured by a fan and the like used for cooling the light source and the like are disposed.

In the drum unit 10, window portions 11 and 13 are disposed. The window portion 11 is disposed such that light projected from a projection lens 12 of the optical system described above is emitted to the outside. In the window portion 13, a distance sensor deriving a distance up to a projection medium, for example, using an infrared ray, an ultrasonic wave, or the like is disposed. In addition, the drum unit 10 includes an intake/exhaust hole 22a that performs air in-taking/exhausting for heat rejection using a fan.

Inside the base 20, various substrates of the circuit unit, a power supply unit, a drive unit used for driving the drum unit 10 to be rotated, and the like are disposed. The rotary drive of the drum unit 10 that is performed by this drive unit will be described later. On the first face side of the base 20, an operation unit 14 used for inputting various operations for controlling the projector device 1 and a reception unit 15 that receives a signal transmitted from a remote control commander not illustrated in the figure when the projector device 1 is remotely controlled by a user using the remote control commander are disposed. The operation unit 14 includes various operators receiving user's operation inputs, a display unit used for displaying the state of the projector device 1, and the like.

On the first face side and the second face side of the base 20, the intake/exhaust holes 16a and 16b are respectively disposed. Thus, even in a case where the intake/exhaust hole 22a of the drum unit 10 that is driven to be rotated takes a posture toward the base 20 side, air in-taking or air exhaust can be performed so as not to decrease the rejection efficiency of the inside of the drum unit 10. In addition, the intake/exhaust hole 17 disposed on the side face of the casing performs air in-taking and air exhaust for heat rejection of the circuit unit.

Rotary Drive of Drum Unit

Figure 2A:
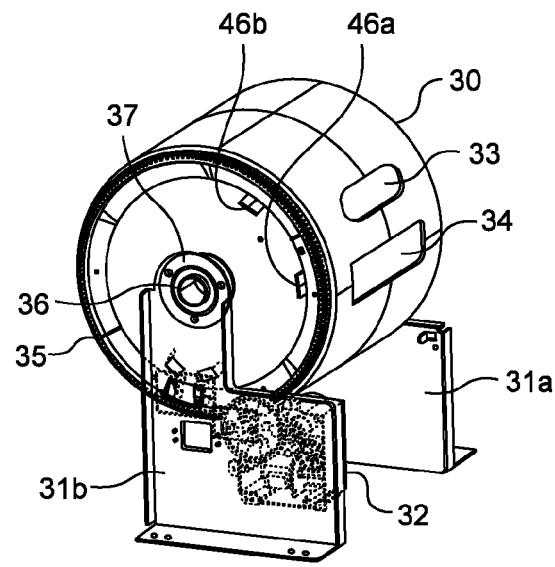
FIG. 2A is a schematic diagram that illustrates an example of the configuration for performing rotary drive of a drum unit according to the first embodiment.
Figure 2B:
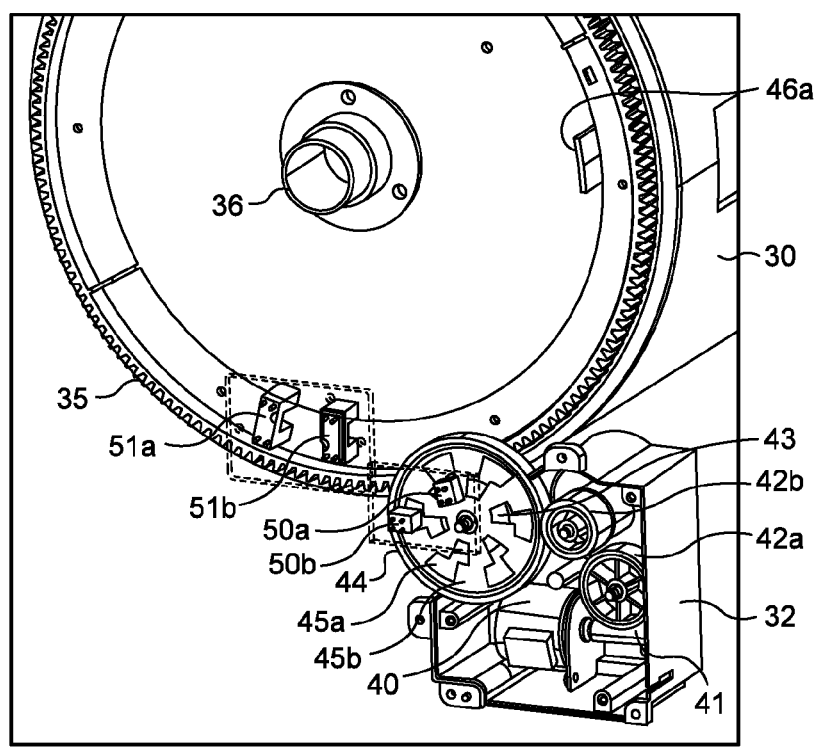
FIG. 2B is a schematic diagram that illustrates an example of the configuration for performing rotary drive of the drum unit according to the first embodiment.

FIGS. 2A and 2B are diagrams that illustrate the rotary drive of the drum unit 10 that is performed by a drive unit 32 disposed in the base 20. FIG. 2A is a diagram that illustrates the configuration of a drum 30 in a state in which a cover and the like of the drum unit 10 are removed and the drive unit 32 disposed in the base 20. In the drum 30, a window portion 34 corresponding to the window portion 11 described above and a window portion 33 corresponding to the window portion 13 are disposed. The drum 30 includes a rotation shaft 36 and is attached to a bearing 37 using bearings disposed in support portions 31a and 31b to be driven to rotate by the rotation shaft 36.

On one face of the drum 30, a gear 35 is disposed on the circumference. The drum 30 is driven to be rotated through the gear 35 by the drive unit 32 disposed in the support portion 31b. Here, protrusions 46a and 46b disposed in the inner circumference portion of the gear 35 are disposed so as to detect a start point and an end point at the time of the rotation operation of the drum 30.

FIG. 2B is an enlarged diagram that illustrates the configuration of the drum 30 and the drive unit 32 disposed in the base 20 in more detail. The drive unit 32 includes a motor 40 and a gear group including a worm gear 41 that is directly driven by the rotation shaft of the motor 40, gears 42a and 42b that transfer rotation according to the worm gear 41, and a gear 43 that transfers the rotation transferred from the gear 42b to the gear 35 of the drum 30. By transferring the rotation of the motor 40 to the gear 35 using the gear group, the drum 30 can be rotated in accordance with the rotation of the motor 40. As the motor 40, for example, a stepping motor performing rotation control for each predetermined angle using a drive pulse may be used.

In addition, photo interrupters 51a and 51b are disposed on the support portion 31b. The photo interrupters 51a and 51b respectively detect the protrusions 46b and 46a disposed in the inner circumference portion of the gear 35. Output signals of the photo interrupters 51a and 51b are supplied to a rotation control unit 104 to be described later. In the embodiment, by detecting the protrusion 46b using the photo interrupter 51a, the rotation control unit 104 determines that the posture of the drum 30 is a posture arriving at an end point of the rotation operation. In addition, by detecting the protrusion 46a using the photo interrupter 51b, the rotation control unit 104 determines that the posture of the drum 30 is a posture arriving at a start point of the rotation operation.

Hereinafter, a direction in which the drum 30 rotates from a position at which the protrusion 46a is detected by the photo interrupter 51b to a position at which the protrusion 46b is detected by the photo interrupter 51a through a longer arc in the circumference of the drum 30 will be represented as a forward direction. In other words, the rotation angle of the drum 30 increases toward the forward direction.

In addition, the photo interrupters 51a and 51b and the protrusions 46a and 46b are arranged such that an angle formed with the rotation shaft 36 is 270° between the detection position at which the photo interrupter 51b detects the protrusion 46a and the detection position at which the photo interrupter 51a detects the protrusion 46b.

For example, in a case where a stepping motor is used as the motor 40, by specifying the posture of the drum 30 based on timing at which the protrusion 46a is detected by the photo interrupter 51b and the number of drive pulses used for driving the motor 40, a projection angle according to the projection lens 12 can be acquired.

Here, the motor 40 is not limited to the stepping motor but, for example, a DC motor may be used. In such a case, for example, as illustrated in FIG. 2B, a code wheel 44 rotating together with the gear 43 on the same shaft as that of the gear 43 is disposed, and photo reflectors 50a and 50b are disposed in the support portion 31b, whereby a rotary encoder is configured.

In the code wheel 44, for example, a transmission unit 45a and a reflection unit 45b having phases changing in the radial direction are disposed. By receiving reflected light having each phase from the code wheel 44 using the photo reflectors 50a and 50b, the rotation speed and the rotation direction of the gear 43 can be detected. Then, based on the rotation speed and the rotation direction of the gear 43 that have been detected, the rotation speed and the rotation direction of the drum 30 are derived. Based on the rotation speed and the rotation direction of the drum 30 that have been derived and a result of the detection of the protrusion 46b that is performed by the photo interrupter 51a, the posture of the drum 30 is specified, whereby the projection angle according to the projection lens 12 can be acquired.

In the configuration as described above, a state in which the projection direction according to the projection lens 12 is in the vertical direction, and the projection lens 12 is completely hidden by the base 20 will be referred to as a housed state (or housing posture). FIG. 3 is a schematic diagram that illustrates each posture of the drum unit 10. In FIG. 3, State 500 illustrates the appearance of the drum unit 10 that is in the housed state. In the embodiment, the protrusion 46a is detected by the photo interrupter 51b in the housed state, and it is determined that the drum 30 arrives at the start point of the rotation operation by the rotation control unit 104 to be described later.

Hereinafter, unless otherwise mentioned, the "direction of the drum unit 10" and the "angle of the drum unit 10" have the same meanings as the "projection direction according to the projection lens 12" and the "projection angle according to the projection lens 12".

For example, when the projector device 1 is started up, the drive unit 32 starts to rotate the drum unit 10 such that the projection direction according to the projection lens 12 faces the above-described first face side. Thereafter, the drum unit 10, for example, is assumed to rotate up to a position at which the direction of the drum unit 10, in other words, the projection direction according to the projection lens 12 is horizontal on the first face side and temporarily stop. The projection angle of the projection lens 12 of a case where the projection direction according to the projection lens 12 is horizontal on the first face side is defined as a projection angle of 0°. In FIG. 3, State 501 illustrates the appearance of the posture of the drum unit 10 (projection lens 12) when the projection angle is 0°. Hereinafter, the posture of the drum unit 10 (projection lens 12) at which the projection angle is θ with respect to the posture having a projection angle of 0° used as the reference will be referred to as a θ posture. In addition, the state of the posture having a projection angle of 0° (in other words, a 0° posture) will be referred to as an initial state.

For example, at the 0° posture, it is assumed that image data is input, and the light source is turned on. In the drum unit 10, light emitted from the light source is modulated based on the image data by the display element driven by the drive circuit and is incident to the optical system. Then, the light modulated based on the image data is projected from the projection lens 12 in a horizontal direction and is emitted to the projection face of the projection medium such as a screen or a wall face.

By operating the operation unit 14 and the like, the user can rotate the drum unit 10 around the rotation shaft 36 as its center while projection is performed from the projection lens 12 based on the image data. For example, by getting the rotation angle to be 90° (90° posture) by rotating the drum unit 10 from the 0° posture in the forward direction, light emitted from the projection lens 12 can be projected vertically upwardly with respect to the bottom face of the base 20. In FIG. 3, State 502 illustrates the appearance of the drum unit 10 at the posture having a projection angle θ of 90°, in other words, a 90° posture.

The drum unit 10 can be rotated further in the forward direction from the 90° posture. In such a case, the projection direction of the projection lens 12 changes from the vertically upward direction with respect to the bottom face of the base 20 to the direction of the second face side. In FIG. 3, State 503 illustrates an appearance acquired when a posture having a projection angle θ of 180°, in other words, a 180° posture is formed as the drum unit 10 further rotates in the forward direction from the 90° posture of State 502. In the projector device 1 according to this embodiment, the protrusion 46b is detected by the photo interrupter 51a in this 180° posture, and it is determined that the drum has arrived at the end point of the rotation operation of the drum 30 by the rotation control unit 104 to be described later.

As will be described later, the projector device 1 according to this embodiment rotates the drum unit 10, for example, as illustrated in States 501 to 503, while an image is projected, whereby the projection area in the image data can be changed (moved) in accordance with a projection angle according to the projection lens 12. In this way, a content of a projected image and a change in the projection position of the projected image on the projection medium and a content and a change in the position of an image area cut out as an image to be projected from the whole image area relating to input image data can be associated with each other. Accordingly, a user can intuitively recognize a projected area of the whole image area relating to the input image data based on the position of the projected image on the projection medium and can intuitively perform an operation of changing the content of the projected image.

In addition, the optical system includes an optical zoom mechanism and can enlarge or reduce the size at the time of projecting a projection image to the projection medium by operating the operation unit 14. Hereinafter, the enlarging or reducing of the size at the time of projecting the projection image to the projection medium according to the optical system may be simply referred to as "zooming". For example, in a case where the optical system performs zooming, the projection image is enlarged or reduced with respect to the optical axis of the optical system as its center at the time point of performing zooming.

When the user ends the projection of the projection image using the projector device 1 and stops the projector device 1 by performing an operation for instructing the operation unit 14 to stop the projector device 1, first, rotation control is performed such that the drum unit 10 is returned to be in the housed state. When the drum unit 10 is positioned toward the vertical direction, and the return of the drum unit 10 into the housed state is detected, the light source is turned off, and, after a predetermined time required for cooling the light source, the power is turned off. By turning the power off after the drum unit 10 is positioned toward the vertical direction, the projection lens 12 can be prevented from getting dirty when the projection lend is not used.

Functional Configuration of Projector Device 1

Figure 4:
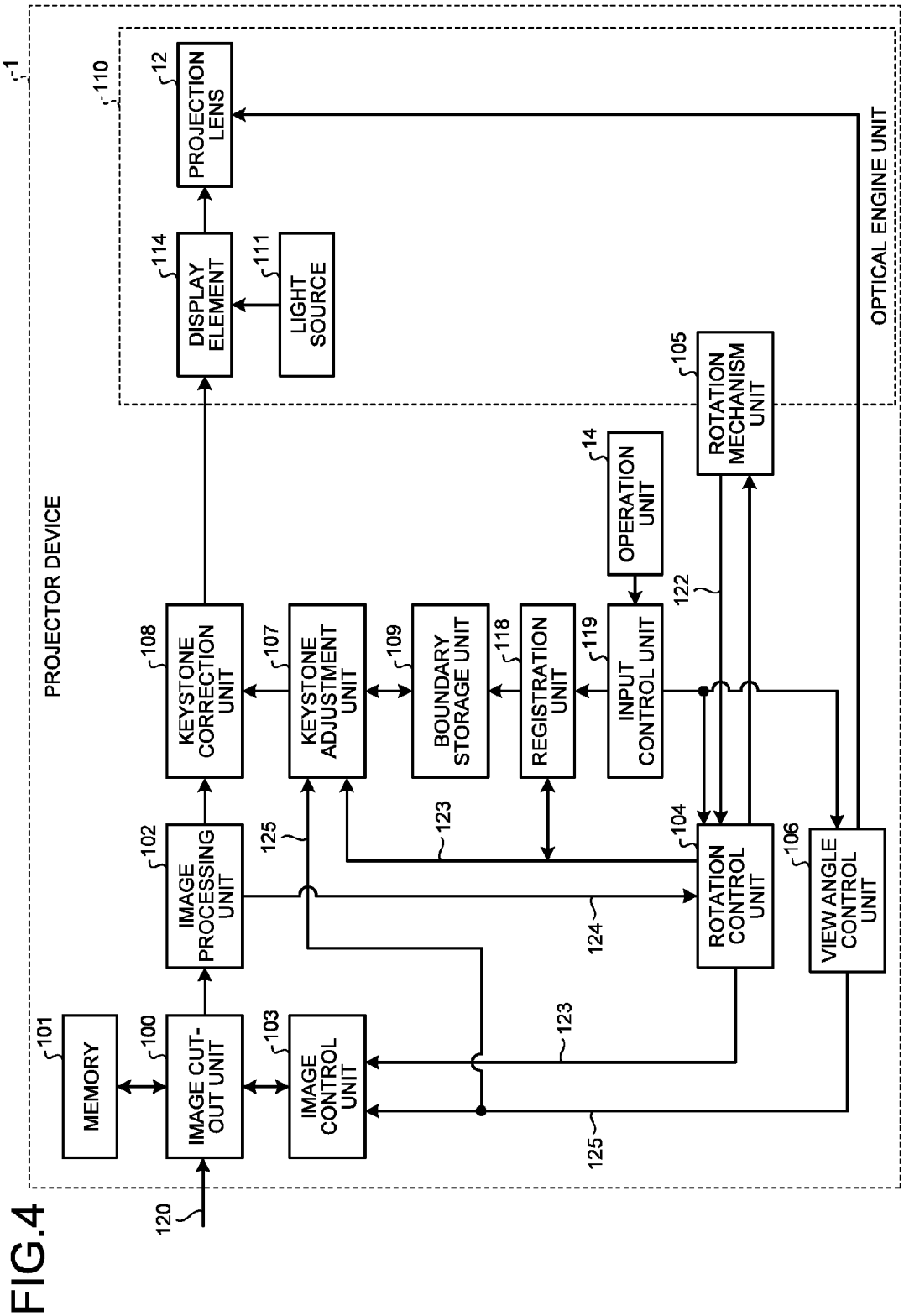
FIG. 4 is a block diagram that illustrates the functional configuration of the projector device according to the first embodiment.

Next, a configuration for realizing each function or operation of the projector device 1 according to this embodiment, as described above, will be described. FIG. 4 is a block diagram that illustrates the functional configuration of the projector device 1.

As illustrated in FIG. 4, the projector device 1 mainly includes: an optical engine unit 110, a rotation mechanism unit 105; a rotation control unit 104; a view angle control unit 106; an image control unit 103; an image processing unit 102; an image cut-out unit 100; a keystone correction unit 108; a keystone adjustment unit 107; a registration unit 118; an input control unit 119; a memory 101; a boundary storage unit 109; and an operation unit 14.

Here, the optical engine unit 110 is disposed inside the drum unit 10. In addition, the rotation control unit 104, the view angle control unit 106, the image control unit 103, the image processing unit 102, the image cut-out unit 100, the keystone correction unit 108, the keystone adjustment unit 107, the memory 101, the boundary storage unit 109, the registration unit 118, the input control unit 119 are mounted on a substrate of the base 20 as circuit units.

The optical engine unit 110 includes a light source 111, a display element 114, and a projection lens 12. The light source 111, for example, includes three light emitting diodes (LEDs) respectively emitting red (R) light, green (G) light, and blue (B) light. Luminous fluxes of colors RGB that are emitted from the light source 111 irradiate the display element 114 through an optical system not illustrated in the figure.

In description presented below, the display element 114 is assumed to be a transmission-type liquid crystal display device and, for example, to have a size of horizontal 1280 pixels×vertical 800 pixels. However, the size of the display element 114 is not limited to this example. The display element 114 is driven by a drive circuit not illustrated in the figure and modulates luminous fluxes of the colors RGB based on image data and emits the modulated luminous fluxes. The luminous fluxes of the colors RGB that are emitted from the display element 114 and are modulated based on the image data are incident to the projection lens 12 through the optical system not illustrated in the figure and are projected to the outside of the projector device 1.

In addition, the display element 114, for example, may be configured by a reflection-type liquid crystal display device using liquid crystal on silicon (LCOS) or a digital micromirror device (DMD). In such a case, the projector device is configured by an optical system and a drive circuit that correspond to the used display element.

The projection lens 12 includes a plurality of lenses that are combined together and a lens driving unit that drives the lenses according to a control signal. For example, the lens driving unit drives a lens included in the projection lens 12 based on a result of distance measurement that is acquired based on an output signal output from a distance sensor disposed in the window portion 13, thereby performing focus control. In addition, the lens driving unit changes the view angle by driving the lens in accordance with a zoom instruction supplied from the view angle control unit 106 to be described later, thereby controlling the optical zoom.

As described above, the optical engine unit 110 is disposed inside the drum unit 10 that can be rotated by 360° by the rotation mechanism unit 105. The rotation mechanism unit 105 includes the drive unit 32 and the gear 35 that is a configuration of the drum unit 10 side described with reference to FIGS. 2A and 2B, and rotates the drum unit 10 in a predetermined manner using the rotation of the motor 40. In other words, the projection direction of the projection lens 12 is changed by the rotation mechanism unit 105.

Input image data 120 of a still image or a moving image is input to the projector device 1 and is supplied to the image cut-out unit 100. The image cut-out unit 100 stores the supplied input image data 120 in the memory 101. The memory 101 stores the input image data 120 in units of images. In other words, for each still image in a case where the input image data 120 is still image data, or for each frame image configuring moving image data in a case where the input image data 120 is the moving image data, corresponding data is stored. The memory 101, for example, is in compliance with the standards of digital high vision broadcasting and can store one or a plurality of frame images of 1920 pixels×1080 pixels. The image cut-out unit 100 cuts out (extracts) an image area designated by the image control unit 103 from the whole area of the frame image relating to the input image data 120 that is stored in the memory 101 and outputs the cut image area as image data.

In addition, it is preferable that the size of the input image data 120 is shaped in advance into a size corresponding to the storage unit of the image data in the memory 101, and resultant input image data is input to the projector device 1. In this example, the size of the input image data 120 is shaped in advance into 1920 pixels×1080 pixels, and resultant input image is input to the projector device 1. However, the configuration is not limited thereto, but an image shaping unit that shapes the input image data 120 input with an arbitrary size into image data of a size of 1920 pixels and 1080 pixels may be disposed in a prior stage of the image cut-out unit 100 in the projector device 1.

The image data output from the image cut-out unit 100 is supplied to the image processing unit 102. The image processing unit 102, for example, by using a memory not illustrated in the figure, performs image processing for the supplied image data. The image processing unit 102 outputs the image data for which the image processing has been performed based on timing represented in a vertical synchronization signal 124 supplied from a timing generator not illustrated in the figure. The image processing unit 102, for example, performs a size converting process for the image data supplied from the image cut-out unit 100 such that the size matches the size of the display element 114. In addition, other than the process, the image processing unit 102 may perform various kinds of image processing. For example, the image processing unit 102 may perform the size converting process for the image data using a general linear transformation process. In addition, in a case where the size of the image data supplied from the image cut-out unit 100 matches the size of the display element 114, the image data may be directly output.

In addition, by performing interpolation (over sampling) with the aspect ratio of the image being maintained to be constant, a part or the whole of the image may be enlarged through an interpolation filter having a predetermined characteristic, in order to extract an aliasing distortion, by thinning out (sub sampling) the image through a low pass filter according to a reduction rate, a part or the whole of the image may be reduced, or the image may maintain the size without passing through a filter.

Furthermore, when an image is projected in an inclined direction, in order to prevent an image from being blurred due to out-of-focus on the periphery portion, an edge enhancement process using an operator such as Laplacian or an edge enhancement process applying one-dimensional filters in horizontal and vertical directions may be performed. Through this edge enhancement process, the edge of a blurred image portion that is projected can be enhanced.

In addition, in order to prevent the brightness of the whole screen from being changed due to a change in the projection size (area) according to a trapezoidal correction or the like that is performed by the keystone correction unit 108 to be described later, the image processing unit 102 may perform adaptive luminance adjustment for the image data so as to uniformly maintain the brightness. Furthermore, in a case where a periphery portion of a projected image texture includes a diagonal line, in order not to allow an edge jag to be visually noticed, by mixing a local halftone or applying a local low pass filter using the image processing unit 102, the edge jag is shaded off, whereby the diagonal line can be prevented from being observed as a jagged line.

The image data output from the image processing unit 102 is supplied to the keystone correction unit 108. The keystone correction unit 108 performs a trapezoidal distortion correction (hereinafter, also simply referred to as a trapezoidal correction) for the supplied image data and supplies the image data after the trapezoidal correction to the display element 114. Actually, this image data is supplied to the drive circuit that drives the display element 114. The drive circuit drives the display element 114 based on the supplied image data. The trapezoidal correction will be described later in detail.

The input control unit 119 receives a user operation input from the operation unit 14 as an event.

The rotation control unit 104, for example, receives an instruction according to a user operation for the operation unit 14 through the input control unit 119 and instructs the rotation mechanism unit 105 based on the instruction according to the user operation. The rotation mechanism unit 105 includes the drive unit 32 and the photo interrupters 51a and 51b described above. The rotation mechanism unit 105 controls the drive unit 32 according to an instruction supplied from the rotation control unit 104, thereby controlling the rotation operation of the drum unit 10 (drum 30). For example, the rotation mechanism unit 105 generates a drive pulse 122 according to an instruction supplied from the rotation control unit 104 and drives the motor 40 that is, for example, a stepping motor.

Meanwhile, outputs of the photo interrupters 51a and 51b described above and the drive pulse 122 used for driving the motor 40 are supplied from the rotation mechanism unit 105 to the rotation control unit 104. The rotation control unit 104, for example, includes a counter and counts the pulse number of the drive pulses 122. The rotation control unit 104 acquires the timing of detection of the protrusion 46a based on the output of the photo interrupter 51b and resets the pulse number counted by the counter at the timing of the detection of the protrusion 46a. The rotation control unit 104, based on the pulse number counted by the counter, can sequentially acquire the angle of the drum unit 10 (drum 30), thereby deriving the posture (in other words, the projection angle of the projection lens 12) of the drum unit 10. In this way, in a case where the projection direction of the projection lens 12 is changed, the rotation control unit 104 can derive an angle between a projection direction before change and a projection angle after the change. The derived projection angle 123 of the projection lens 12 is supplied to the image control unit 103.

The view angle control unit 106, for example, receives an instruction according to a user operation for the operation unit 14 through the input control unit 119 and gives a zoom instruction, in other words, an instruction for changing the view angle to the projection lens 12 based on an instruction according to the user operation. The lens driving unit of the projection lens 12 drives the lens based on the zoom instruction, thereby performing zoom control. The view angle control unit 106 supplies the zoom instruction and a view angle 125 derived based on a zoom magnification relating to the zoom instruction and the like to the image control unit 103.

The image control unit 103 designates an image cut out area using the image cut-out unit 100 based on the projection angle 123 supplied from the rotation control unit 104 and the view angle 125 supplied from the view angle control unit 106. At this time, the image control unit 103 designates a cut out area of the image data based on a line position according to the angle between the projection directions before and after the change of the projection lens 12.

The registration unit 118 receives the projection angle 123 at a time point when a predetermined key is pressed using the operation unit 14 from the input control unit 119 and stores the received projection angle 123 in the boundary storage unit 109. The boundary storage unit 109 is a memory medium such as a memory or a hard disk drive device (HDD).

The keystone adjustment unit 107 calculates and adjusts correction coefficients (to be described later) used for a trapezoidal correction based on the projection angle 123 input from the rotation control unit 104 and the view angle 125 input from the view angle control unit 106. The keystone correction unit 108 performs a trapezoidal correction of which the correction amount is adjusted based on the calculated correction coefficients for the image data output from the image processing unit 102.

The registration unit 118, the boundary storage unit 109, the keystone adjustment unit 107, and the keystone correction unit 108 will be described later in detail.

Cutting Out Process of Image Data

Figure 5:
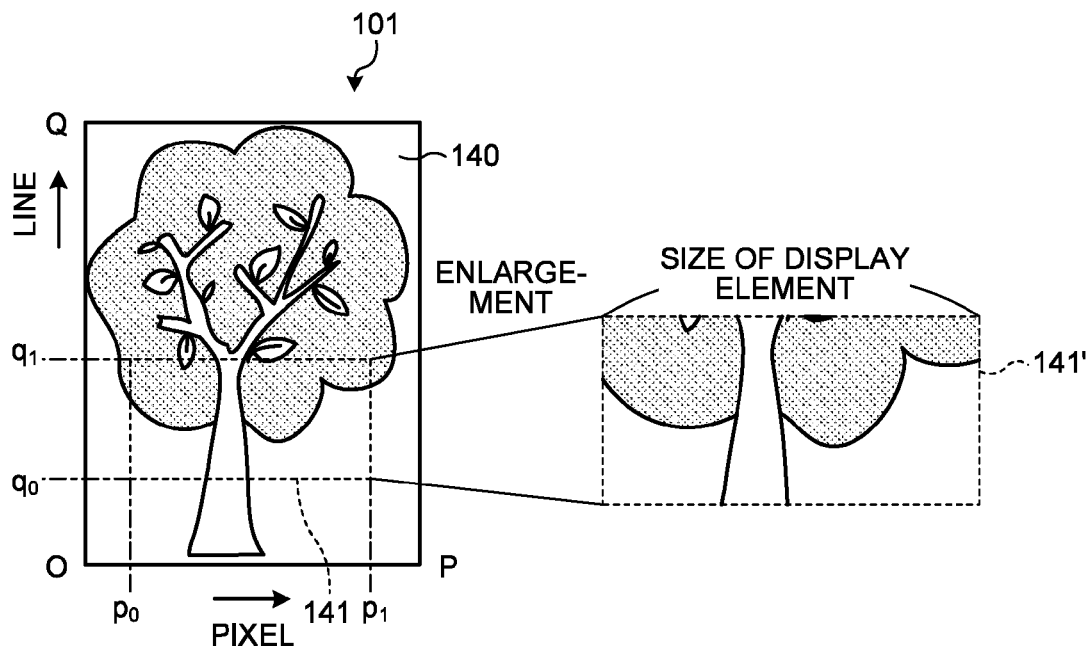
FIG. 5 is a conceptual diagram that illustrates a cutting out process of image data stored in a memory according to the first embodiment.

Next, a cutting out process of image data stored in the memory 101 that is performed by the image control unit 103 and the image cut-out unit 100 according to this embodiment will be described. FIG. 5 is a conceptual diagram that illustrates the cutting out process of image data stored in the memory 101 according to the first embodiment. An example of cutting out a image data 141 of a designated cut out area from a image data 140 stored in the memory 101 will be described with reference to a left diagram in FIG. 5.

In the memory 101, for example, addresses are set in the vertical direction in units of lines and are set in the horizontal direction in units of pixels. In addition, it is assumed that the address of a line increases from the lower end of an image (screen) toward the upper end thereof, and the address of a pixel increases from the left end of the image toward the right end thereof.

The image control unit 103, for the image cut-out unit 100, designates addresses of lines $q_0$ and $q_1$ in the vertical direction and designates addresses of pixels $p_0$ and $p_1$ in the horizontal direction as a cut out area of the image data 140 of Q lines×P pixels stored in the memory 101. The image cut-out unit 100 reads lines within the range of the lines $q_0$ and $q_1$ over the pixels $p_0$ and $p_1$ from the memory 101 in accordance with the designation of the addresses. At this time, as the sequence of reading, for example, it is assumed that the lines are read from the upper end toward the lower end of the image, and the pixels are read from the left end toward the right end of the image. The access control for the memory 101 will be described in detail later.

The image cut-out unit 100 supplies the image data 141 of the range of the lines $q_0$ and $q_1$ and the pixels $p_0$ and $p_1$, which has been read from the memory 101, to the image processing unit 102. The image processing unit 102 performs a size conversion process in which the size of an image according to the supplied image data 141 is adjusted to the size of the display element 114. As an example, in a case where the size of the display element 114 is V lines×H pixels, a maximum multiplication m satisfying both Equations (1) and (2) as represented below is acquired. Then, the image processing unit 102 enlarges the image data 141 with this multiplication m and, as illustrated in a diagram illustrated on the right side in FIG. 5 as an example, size-converted image data 141' is acquired.

$$m \times (p_1 - p_0) \leq H \quad (1)$$

$$m \times (q_1 - q_0) \leq V \quad (2)$$

Figure 6:
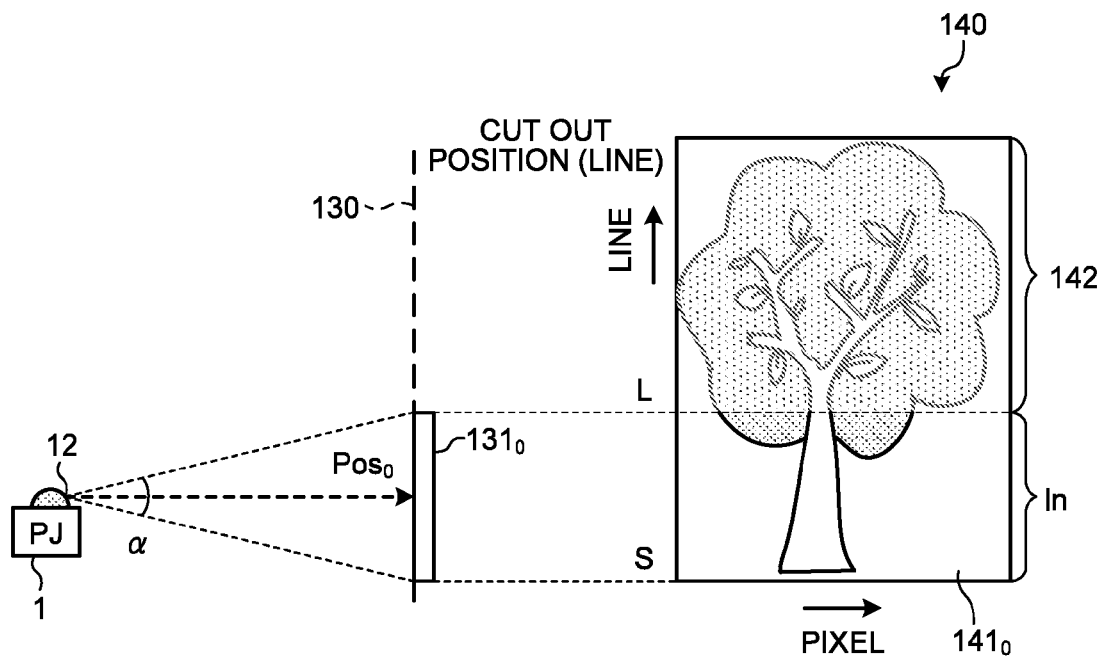
FIG. 6 is a schematic diagram that illustrates an example of designation of a cut out area of a case where the drum unit according to the first embodiment is located at an initial position.

Next, the designation (update) of a cut out area according to the projection angle according to this embodiment will be described. FIG. 6 illustrates an example of designation of a cut out area of a case where the drum unit 10 is at the 0° posture, in other words, in a case where the projection angle is 0°.

Figure 7:
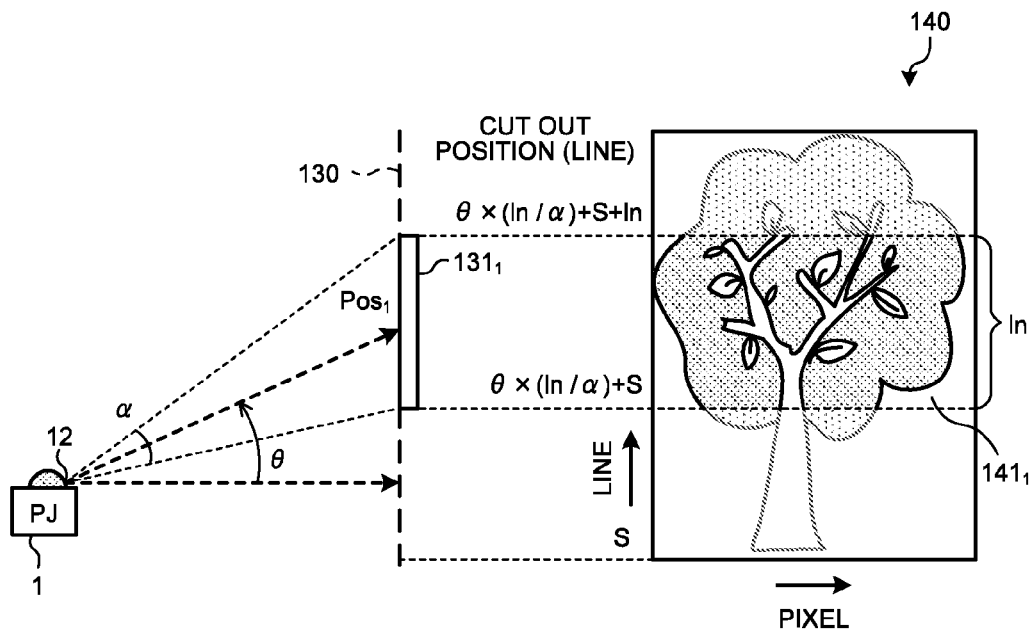
FIG. 7 is a schematic diagram that illustrates setting of a cut out area for a projection angle θ according to the first embodiment.
Figure 8:
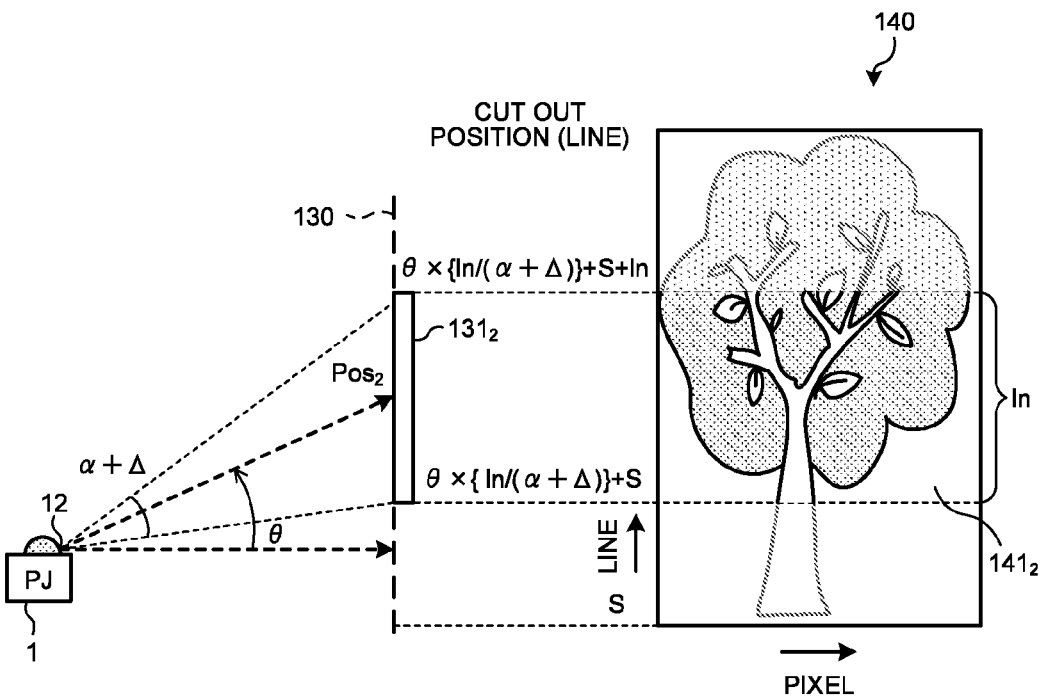
FIG. 8 is a schematic diagram that illustrates designation of a cut out area of a case where optical zooming is performed in accordance with the first embodiment.

In FIG. 5 described above, a case has been described as an example in which the image data 141 of the range of the pixels $p_0$ and $p_1$ that is a partial range of pixels of one line of the image data 140 of Q lines×P pixels stored in the memory 101 is cut out. Also in examples illustrated in FIGS. 6 to 8, actually, pixels of a partial range of one line of the image data 140 stored in the memory 101 may be cut out. However, in order to simplify the description of the designation (update) of a cut out area according to the projection angle, in the examples represented in FIGS. 6 to 8 illustrated below, all the pixels of one line are assumed to be cut out.

In the projector device (PJ) 1, a projection position of a case where an image $131_0$ is projected with a projection angle of 0° onto a projection face 130 that is a projection medium such as a screen by using a projection lens 12 having a view angle α is assumed to be a position $Pos_0$ corresponding to the luminous flux center of light projected from the projection lens 12. In addition, at the projection angle of 0°, an image according to image data from the S-th line that is the lower end of an area designated in advance to the L-th line is assumed to be projected such that the image data stored in the memory 101 is projected at the posture of a projection angle of 0°. In the area formed by lines of the S-th line to the L-th line, lines corresponding to the line number ln are included. In addition, a value representing a line position such as the S-th line or the L-th line, for example, is a value increasing from the lower end toward the upper end of the display element 114 with the line positioned at the lower end of the display element 114 set as the 0-th line.

Here, the line number ln is the number of lines of a maximal effective area of the display element 114. In addition, the view angle α is an angle for viewing a projection image in the vertical direction from the projection lens 12 in a case where the image is projected when an effective area in the vertical direction, in which the display is effective in the display element 114, has a maximum value, in other words, in a case where an image of the line number ln is projected.

The view angle α and the effective area of the display element 114 will be described using a more specific example. The display element 114 is assumed to have a vertical size of 800 lines. For example, in a case where the vertical size of the projection image data is 800 lines, and projection image data is projected using all the lines of the display element 114, the effective area of the display element 114 in the vertical direction has a maximum value of 800 lines (=line number ln). In this case, the view angle α is an angle for viewing 1st to 800th lines of the projection image from the projection lens 12.

In addition, a case may be also considered in which the vertical size of projection image data is 600 lines, and the projection image data is projected using only 600 lines out of 800 lines (=line number ln) of the display element 114. In such a case, the effective area of the display element 114 in the vertical direction is 600 lines. In this case, only a portion of the effective area according to the projection image data with respect to a maximal value of the effective area of the view angle α is projected.

The image control unit 103 instructs the image cut-out unit 100 to cut out and read the S-th line to L-th line of the image data 140 stored in the memory 101. Here, in the horizontal direction, all the image data 140 of the left end to the right end is read. The image cut-out unit 100 sets an area of the S-th line to the L-th line of the image data 140 as a cut out area in accordance with an instruction from the image control unit 103, reads the image data 141 of the set cut out area, and supplies the read image data to the image processing unit 102. In the example illustrated in FIG. 6, onto the projection face 130, an image $131_0$ according to image data $141_0$ of the line number ln from the S-th line to the L-th line of the image data 140 is projected. In such a case, an image according to image data 142 of an area relating to the L-th line to the upper-end line out of the whole area of the image data 140 is not projected.

Next, a case will be described in which the drum unit 10 is rotated, for example, according to a user operation for the operation unit 14, and the projection angle of the projection lens 12 becomes an angle θ. In this embodiment, in a case where the drum unit 10 is rotated, and the projection angle according to the projection lens 12 is changed, the cut out area from the memory 101 of the image data 140 is changed in accordance with the projection angle θ.

The setting of a cut out area for the projection angle θ will be described more specifically with reference to FIG. 7. For example, a case will be considered in which the drum unit 10 is rotated in the forward direction from a projection position of the 0° posture according to the projection lens 12, and the projection angle of the projection lens 12 becomes an angle θ (>0°). In such a case, the projection position for the projection face 130 moves to a projection position $Pos_1$ that is located on the upper side of a projection position $Pos_0$ corresponding to a projection angle of 0°. At this time, the image control unit 103, for the image cut-out unit 100, designates a cut out area for the image data 140 stored in the memory 101 based on the following Equations (3) and (4). Equation (3) represents an $R_S$-th line located at the lower end of the cut out area, and Equation (4) represents an $R_L$-th line located at the upper end of the cut out area.

$$R_S = \theta \times (\ln/\alpha) + S \quad (3)$$

$$R_L = \theta \times (\ln/\alpha) + S + \ln \quad (4)$$

In Equations (3) and (4), a value ln represents the number of lines (for example, the number of lines of the display element 114) included within the projection area. In addition, a value α represents a view angle of the projection lens 12, and a value S represents a position of a line located at the lower end of the cut out area at the 0° posture described with reference to FIG. 6.

In Equations (3) and (4), (ln/α) represents the number of lines (including a concept of an approximately averaged number of lines changing in accordance with the shape of the projection face) per unit angle of a case where the view angle α projects the line number ln. Accordingly, θ×(ln/α) represents the number of lines corresponding to the projection angle θ according to the projection lens 12 in the projector device 1. This means that, when the projection angle changes by an angle Δθ, the position of the projection image is moved by a distance corresponding to the number of lines {Δθ×(ln/α)} in the projection image. Accordingly, Equations (3) and (4) respectively represent the positions of lines located at the lower end and the upper end of the image data 140 in the projection image of a case where the projection angle is the angle θ. This corresponds to a read address for the image data 140 on the memory 101 at the projection angle θ.

In this way, in this embodiment, an address at the time of reading the image data 140 from the memory 101 is designated in accordance with the projection angle θ. Accordingly, for example, in the example illustrated in FIG. 7, image data $141_1$ of the image data 140 that is located at a position corresponding to the projection angle θ is read from the memory 101, and an image $131_1$ relating to the read image data $141_1$ is projected to the projection position $Pos_1$ corresponding to the projection angle θ of the projection face 130.

Thus, according to this embodiment, in a case where the image data 140 having a size larger than the size of the display element 114 is projected, a correspondence relation between the position within the projected image and the position within the image data is maintained. In addition, since the projection angle θ is acquired based on a drive pulse of the motor 40 used for driving the drum 30 to be rotated, the projection angle θ can be acquired in a state in which there is substantially no delay with respect to the rotation of the drum unit 10, and the projection angle θ can be acquired without being influenced by the projection image or the surrounding environment.

Next, the setting of a cut out area of a case where optical zooming according to the projection lens 12 is performed will be described. As described above, in the case of the projector device 1, the view angle α of the projection lens 12 is increased or decreased by driving the lens driving unit, whereby optical zooming is performed. An increase in the view angle according to the optical zooming is assumed to be an angle Δ, and the view angle of the projection lens 12 after the optical zooming is assumed to be a view angle (α+Δ).

In such a case, even when the view angle is increased according to the optical zooming, the cut out area for the memory 101 does not change. In other words, the number of lines included in a projection image according to the view angle α before the optical zooming and the number of lines included in a projection image according to the view angle (α+Δ) after the optical zooming are the same. Accordingly, after the optical zooming, the number of lines included per unit angle is changed from that before the optical zooming.

The setting of a cut out area of a case where optical zooming is performed will be described more specifically with reference to FIG. 8. In the example illustrated in FIG. 8, optical zooming is performed in which the view angle α is increased by an amount corresponding to the view angle Δ in the state of the projection angle θ. By performing the optical zooming, for example, a projection image projected onto the projection face 130, as illustrated as an image $131_2$, is enlarged by an amount corresponding to the view angle Δ with respect to that of a case where the optical zooming is not performed with the center (the projection position $Pos_2$) of the luminous fluxes of light projected from the projection lens 12 in common.

In a case where optical zooming corresponding to the view angle Δ is performed, when the number of lines designated as a cut out area for the image data 140 is ln, the number of lines included per unit angle is represented by {ln/(α+Δ)}. Accordingly, the cut out area for the image data 140 is designated based on the following Equations (5) and (6). The meaning of each variable in Equations (5) and (6) is common to that in Equations (3) and (4) described above.

$$R_S = \theta \times \{ln/(\alpha+\Delta)\} + S \quad (5)$$

$$R_L = \theta \times \{ln/(\alpha+\Delta)\} + S + ln \quad (6)$$

Image data $141_2$ of an area represented in Equations (5) and (6) is read from the image data 140, and an image $131_2$ relating to the read image data $141_2$ is projected to a projection position $Pos_2$ of the projection face 130 by the projection lens 12.

In this way, in a case where optical zooming is performed, the number of lines included per unit angle is changed with respect to a case where the optical zooming is not performed, and the amount of change in the number of lines with respect to a change in the projection angle θ is different from that of a case where the optical zooming is not performed. This is a state in which a gain corresponding to the view angle Δ increased according to the optical zooming is changed in the designation of a read address according to the projection angle θ for the memory 101.

In this embodiment, an address at the time of reading the image data 140 from the memory 101 is designated in accordance with the projection angle θ and the view angle α of the projection lens 12. In this way, even in a case where optical zooming is performed, the address of the image data $141_2$ to be projected can be appropriately designated for the memory 101. Accordingly, even in a case where the optical zooming is performed, when the image data 140 of a size larger than the size of the display element 114 is projected, a correspondence relation between the position within the projected image and the position within the image data is maintained.

Figure 9:
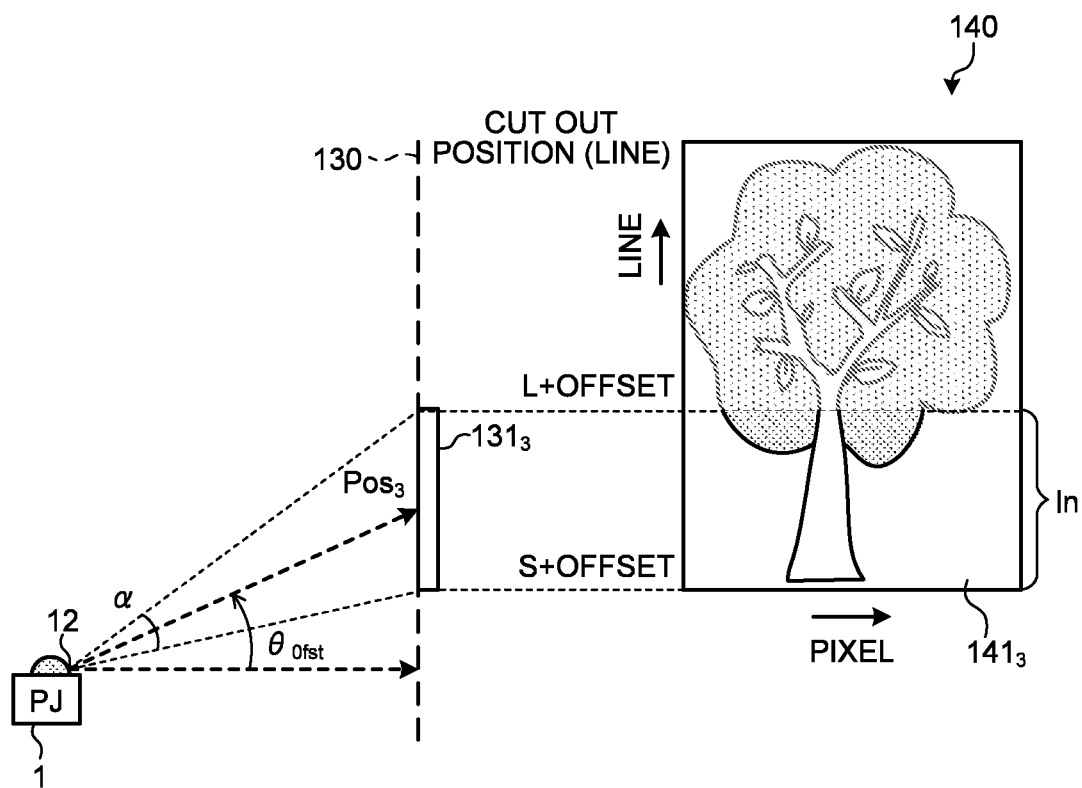
FIG. 9 is a schematic diagram that illustrates a case where an offset is given for a projection position of an image according to the first embodiment.

Next, a case will be described with reference to FIG. 9 in which an offset is given to the projection position of the image. When the projector device 1 is used, it cannot be determined that the 0° posture (projection angle 0°) is necessarily the lowest end of the projection position. For example, as illustrated in FIG. 9, a case may be considered in which a projection position $Pos_3$ according to a predetermined projection angle $\theta_{ofst}$ is set as the projection position located at the lowest end. In such a case, a image $131_3$ according to a image data $141_3$ is projected to a position shifted to the upper side by a height corresponding to the projection angle $\theta_{ofst}$ compared to a case where the offset is not given. The projection angle θ at the time of projecting an image having a line located at the lowest end of the image data 140 as its lowest end is set as the offset angle $\theta_{ofst}$ according to the offset.

In such a case, for example, a case may be considered in which the offset angle $\theta_{ofst}$ is regarded as the projection angle 0°, and a cut out area for the image memory 101 is designated. By applying Equations (3) and (4) described above, the following Equations (7) and (8) are formed. The meaning of each variable in Equations (7) and (8) is common to that in Equations (3) and (4) described above.

$$R_S = (\theta - \theta_{ofst}) \times (ln/\alpha) + S \quad (7)$$

$$R_L = (\theta - \theta_{ofst}) \times (ln/\alpha) + S + ln \quad (8)$$

The image data $141_3$ of the area represented in Equations (7) and (8) is read from the image data 140, and the image $131_3$ relating to the read image data $141_3$ is projected to the projection position $Pos_3$ of the projection face 130 by the projection lens 12.

The method of designating a cut out area using Equations (3) and (4) described above is based on a cylindrical model in which the projection face 130, for which projection is performed by the projection lens 12, is assumed to be a cylinder having the rotation shaft 36 of the drum unit 10 as its center. However, actually, the projection face 130 is frequently considered to be a perpendicular face (hereinafter, simply referred to as a "perpendicular face") forming an angle of 90° with respect to the projection angle θ=0°. In a case where image data of the same number of lines is cut out from the image data 140 and is projected to the perpendicular face, as the projection angle θ increases, an image projected to the perpendicular face grows in the vertical direction. Thus, after the cut-out unit, image processing to be described next is performed by the image processing unit.

Figure 10:
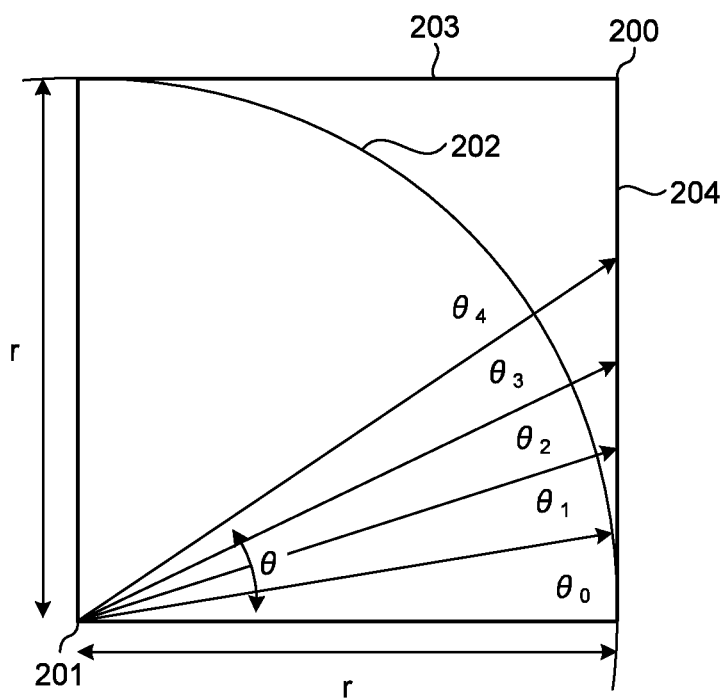
FIG. 10 is a schematic diagram that illustrates an image projected to a perpendicular face according to the first embodiment.

The image projected to the perpendicular face will be described with reference to FIGS. 10 and 11. As illustrated in FIG. 10, a case will be considered in which an image is projected from the projection lens 12 onto a projection face 204 that is disposed to be separate from a position 201, which is the position of the rotation shaft 36 of the drum unit 10, by a distance r.

In the cylindrical model described above, a projection image is projected with an arc 202 that has the position 201 as its center and has a radius r being the projection face. Each point on the arc 202 has the same distance from the position 201, and the center of the luminous fluxes of light projected from the projection lens 12 is a radius of a circle including the arc 202. Accordingly, even when the projection angle θ is increased from an angle $\theta_0$ of 0° to an angle $\theta_1$, an angle $\theta_2$, . . . , the projection image is projected to the projection face with the same size all the time.

On the other hand, in a case where an image is projected from the projection lens 12 onto the projection face 204 that is a perpendicular face, when the projection angle θ is increased from an angle $\theta_0$ to an angle $\theta_1$, an angle $\theta_2$, . . . , a position on the projection face 204 to which the center of luminous fluxes of light emitted from the projection lens 12 is projected changes according to the characteristics of a tangent function as a function of the angle θ. Accordingly, the projection image grows upwardly in accordance with a ratio M represented in the following Equation (9) as the projection angle θ increases.

$$M = (180 \times \tan\theta)/(\theta \times \pi) \quad (9)$$

According to Equation (9) described above, for example, in the case of the projection angle θ=45°, the projection image grows at the ratio of about 1.27 times. In addition, in a case where the projection face W is much higher than the length of the radius r, and projection at the projection angle θ=60° can be performed, in the case of the projection angle θ=60°, the projection image grows at the ratio of about 1.65 times.

Figure 11:
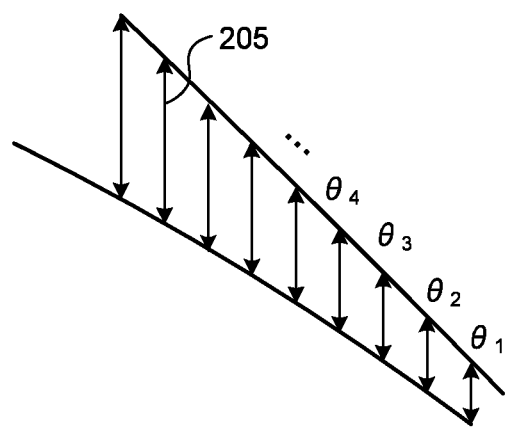
FIG. 11 is a schematic diagram that illustrates an image projected to a perpendicular face according to the first embodiment.

In addition, as illustrated in FIG. 11 as an example, a line gap 205 in the projection image on the projection face 204 is widened as the projection angle θ increases. In this case, the line gap 205 is widened based on Equation (9) described above in accordance with the position on the projection face 204 within one projection image.

Thus, the projector device 1, in accordance with the projection angle θ of the projection lens 12, performs a reduction process for the image data of an image to be projected at the ratio of the reciprocal of Equation (9) described above. In this reduction process, image data is preferably larger than the image data cut out based on the cylinder model. In other words, while the image data depends on the height of the projection face 204 that is a perpendicular face, in the case of the projection angle θ=45°, the projected image grows at the ratio of about 1.27 times, and accordingly, the image data is reduced at the ratio of the reciprocal thereof that is about 78%.

For example, when image data input to the projector device 1 is stored in the memory 101 by the image cut-out unit 100, the image control unit 103 performs a reduction process for the image data in advance for each line of an image at the time of projecting the image data by using a ratio of the reciprocal of Equation (9) described above. In the reduction process, a low pass filter process is performed for lines (pixels in the vertical direction) at a reduction rate depending on the projection angle θ by using a low pass filter having several taps, whereby the line is thinned out. More precisely, in the low pass filter process, it is preferable that the limit value of the band of the low pass filter is also changed depending on the projection angle θ. However, the low pass filter process is not limited thereto, but a general linear interpolation for uniformly determining the characteristics of the filter at a reduction rate corresponding to a maximal projection angle θ or a general linear interpolation for uniformly determining the characteristics of the filter at a reduction rate corresponding to an about half of the maximum projection angle θ may be used. In addition, after the filter process, it is preferable to perform sub sampling of the line to be thinned out depending on the projection angle θ within the screen.

However, the process is not limited thereto, but a process for uniformly thinning-out at a reduction rate corresponding to a maximum projection angle θ, a process for uniformly thinning out at a reduction rate corresponding to an almost half of the maximum projection angle θ, or the like may be performed. In a case where the low pass filter process and the thinning-out process are to be performed more precisely, by dividing image data into several areas in the line direction and uniformly applying the processes for each divided area, further improved characteristics can be acquired.

In addition, in this embodiment, the image processing using Equation (9) is not limited to be performed by the image cut-out unit 100 when the image data is stored in the memory 101. For example, the image processing using Equation (9) may be configured to be performed by the image processing unit 102.

Furthermore, in an environment in which the projector device 1 is actually used, there is a limitation on the height of the projection face 204, and it is considered that there are many cases where a face 203 is formed by being turned by 90° at a position 200 of a certain height. This face 203 may be used as a projection face of the projector device 1 as well. In such a case, as the projection angle θ of an image projected onto the projection face 203 is further increased, and, the projection position passes the position 200 and is directed toward the right upward direction (the projection angle θ=90°, the projected image is reduced according to a characteristic that is opposite to that of the image projected onto the projection face 204 described above.

Accordingly, in a case where an image according to the image data is projected with a projection angle of 0° or 90°, the reduction process using Equation (9) is not performed for the image data to be projected. In addition, in a case where the length (height) of the projection face 204 and the length of the projection face 203 are approximately the same, the reduction process using Equation (9) for the image data to be projected is performed by a reduction process from a projection angle of 0° to the position 200 of the uppermost portion of the projection face W and a reduction process from the position 200 to a projection angle of 90° as processes symmetrical to each other. Accordingly, the load of the image control unit 103 for the reduction process can be reduced.

In the example described above, the perpendicular face forming an angle of 90° with respect to the projection angle θ=0° has been considered for the description. Depending on the rotation angle of the drum unit 10, a case may be considered in which image data is projected onto a plane forming an angle of 180° with respect to the projection angle θ=0°. In a case where image data corresponding to the same number of lines is cut out from the image data 140 and is projected to the face, as the projection angle θ increases, the projected image is reduced in the vertical direction. Thus, after the image cut-out unit 100, the image processing unit 102 performs image processing that is opposite to that described above.

In other words, when the projection angle θ is increased from an angle $θ_0$ to an angle $θ_1$, an angle $θ_2$, ..., a distance from the projection unit to the projection face changes to be decreased. Thus, the projector device 1, in accordance with the projection angle θ of the projection lens 12, opposite to the description presented above, performs an enlargement process of the image data of an image to be projected.

As described above, in a case where a distance from the projection lens 12 to the projection face decreases according to a change in the projection direction from the first projection direction to the second projection direction, the image cut-out unit of the projector device 1 may be configured to perform an enlargement process based on the projection angle θ for each pixel of the cut out image data.

Hereinafter, unless otherwise described, the description of the angle is assumed to be based on the cylinder model, and, as is necessary as in the case of projection for the perpendicular face or the like, a correction that is based on Equation (9) is performed as is appropriate.

Memory Control

Next, access control of the memory 101 will be described with reference to FIGS. 12 to 15. In the image data, for each vertical synchronization signal 124, pixels are sequentially transmitted from the left end toward the right end of an image for each line in the horizontal direction on a screen, and lines are sequentially transmitted from upper end toward the lower end of the image. Hereinafter, a case will be described as an example in which the image data has a size of horizontal 1920 pixels×vertical 1080 pixels (lines) corresponding to the digital high vision standard. In addition, hereinafter, unless otherwise described, the vertical synchronization signal 124 will be described as a vertical synchronization signal VD.

Figure 12:
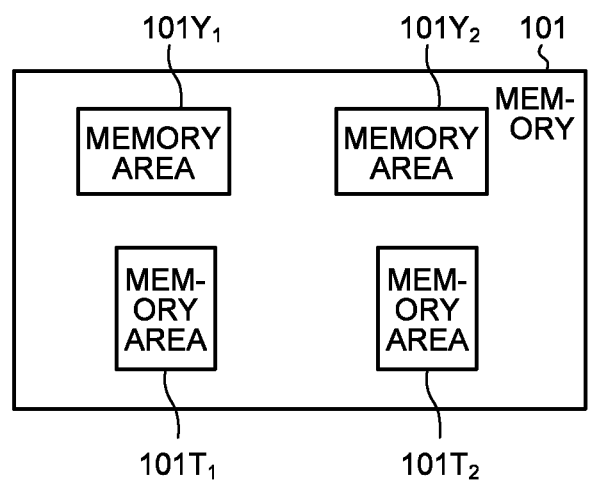
FIG. 12 is a schematic diagram that illustrates access control of a memory according to the first embodiment.

Hereinafter, an example of the access control of a case where the memory 101 includes four memory areas for which the access control can be independently performed will be described. In other words, as illustrated in FIG. 12, in the memory 101, areas of memories $101Y_1$ and $101Y_2$ used for writing and reading image data with a size of horizontal 1920 pixels and vertical 1080 pixels (lines) and areas of memories $101T_1$ and $101T_2$ used for writing and reading image data with a size of horizontal 1080 pixels× vertical 1920 pixels (lines) are arranged. Hereinafter, the memories $101Y_1$, $101Y_2$, $101T_1$, and $101T_2$ will be described as memories $Y_1$, $Y_2$, $T_1$, and $T_2$.

Figure 13:
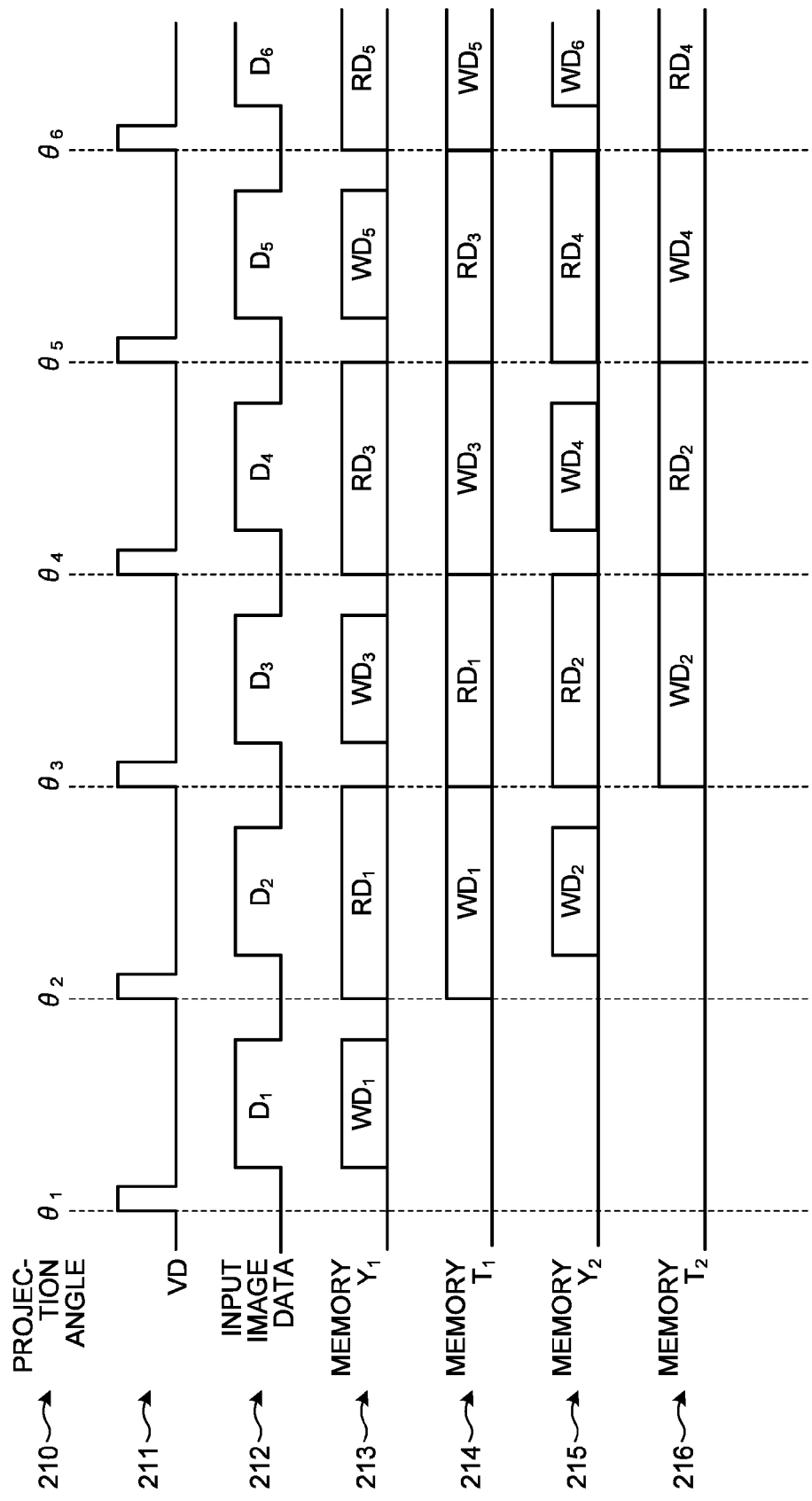
FIG. 13 is a schematic diagram that illustrates access control of a memory according to the first embodiment.

FIG. 13 is a timing diagram that illustrates access control of the memory 101 using the image cut-out unit 100 according to the first embodiment. In FIG. 13, Chart 210 represents the projection angle θ of the projection lens 12, and Chart 211 represents the vertical synchronization signal VD. In addition, Chart 212 represents input timings of image data $D_1$, $D_2$, and . . . input to the image cut-out unit 100, and Charts 213 to 216 represent examples of accesses to the memories $Y_1$, $Y_2$, $T_1$, and $T_2$ from the image cut-out unit 100. In addition, in Charts 213 to 216, each block to which "R" is attached represents reading, and each block to which "W" is attached represents writing.

For every vertical synchronization signal VD, image data $D_1$, $D_2$, $D_3$, $D_4$, $D_5$, $D_6$, . . . each having an image size of 1920 pixels×1080 lines are input to the image cut-out unit 100. Each of the image data $D_1$, $D_2$, . . . is synchronized with the vertical synchronization signal VD and is input after the vertical synchronization signal VD. In addition, the projection angles of the projection lens 12 corresponding to the vertical synchronization signals VD are denoted as projection angles $θ_1$, $θ_2$, $θ_3$, $θ_4$, $θ_5$, $θ_6$, . . . . The projection angle θ is acquired for every vertical synchronization signal VD as described above.

First, the image data $D_1$ is input to the image cut-out unit 100. As described above, the projector device 1 according to this embodiment changes the projection angle θ according to the projection lens 12 by rotating the drum unit 10 so as to move the projection position of the projection image and designates a read position for the image data in accordance with the projection angle θ. Accordingly, it is preferable that the image data is longer in the vertical direction. Generally, image data frequently has a horizontal size longer than a vertical size. Thus, for example, it may be considered for a user to rotate the camera by 90° in an imaging process and input image data acquired by the imaging process to the projector device 1.

Figure 14A:
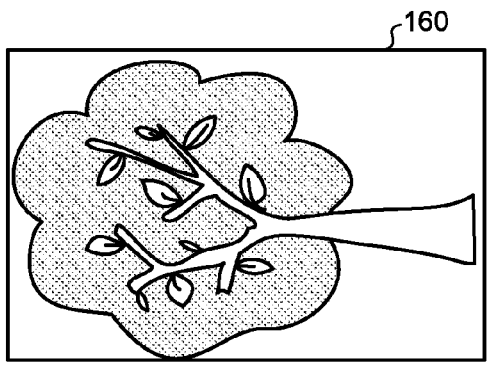
FIG. 14A is a schematic diagram that illustrates access control of a memory according to the first embodiment.
Figure 14B:
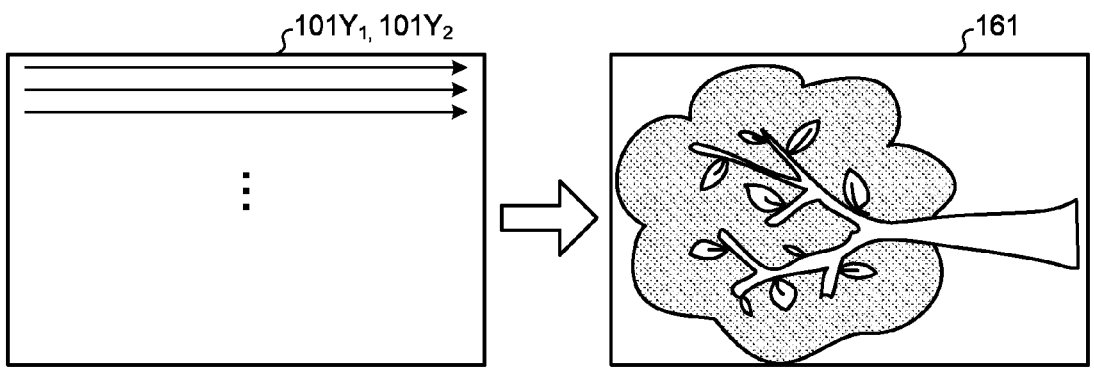
FIG. 14B is a schematic diagram that illustrates access control of a memory according to the first embodiment.

In other words, an image according to the image data $D_1$, $D_2$, . . . input to the image cut-out unit 100, similarly to an image 160 illustrated as an image in FIG. 14A, is an image facing the side acquired by rotating a right-direction image by 90° that is determined based on the content of the image.

The image cut-out unit 100 first writes the input image data $D_1$ into the memory $Y_1$ at timing $WD_1$ corresponding to the input timing of the image data $D_1$ (timing $WD_1$ represented in Chart 213). The image cut-out unit 100 writes the image data $D_1$ into the memory $Y_1$, as illustrated on the left side of FIG. 14B, in the sequence of lines toward the horizontal direction. On the right side of FIG. 14B, an image 161 according to the image data $D_1$ written into the memory $Y_1$ as such is illustrated as an image. The image data $D_1$ is written into the memory $Y_1$ as the image 161 that is the same as the input image 160.

Figure 14C:
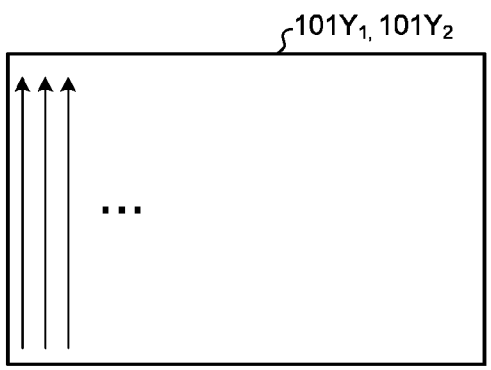
FIG. 14C is a schematic diagram that illustrates access control of a memory according to the first embodiment.

The image cut-out unit 100, as illustrated in FIG. 14C, reads the image data $D_1$ written into the memory $Y_1$ from the memory $Y_1$ at timing $RD_1$ that is the same as the timing of start of a next vertical synchronization signal VD after the vertical synchronization signal VD for writing the image data $D_1$ (timing $RD_1$ represented in Chart 213).

At this time, the image cut-out unit 100 sequentially reads the image data $D_1$ in the vertical direction over the lines for each pixel with a pixel positioned on the lower left corner of the image being set as a reading start pixel. When pixels positioned at the upper end of the image are read, next, pixels are read in the vertical direction with a pixel positioned on the right side neighboring to the pixel positioned at the reading start position of the vertical direction being set as a reading start pixel. This operation is repeated until the reading of a pixel positioned on the upper right corner of the image is completed.

In other words, the image cut-out unit 100 sequentially reads the image data $D_1$ from the memory $Y_1$ for each line in the vertical direction from the left end toward the right end of the image for each pixel with the line direction being set as the vertical direction from the lower end toward the upper end of the image.

Figure 15A:
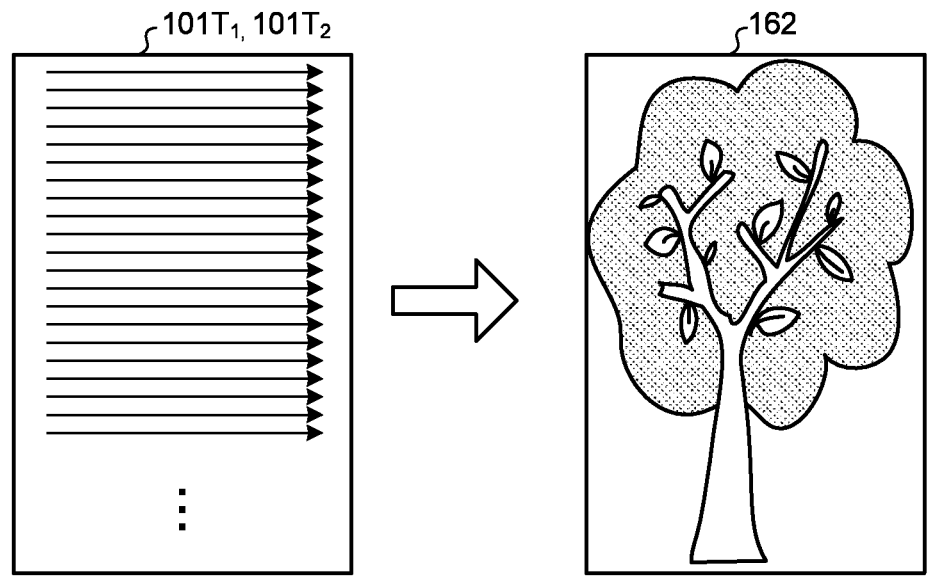
FIG. 15A is a schematic diagram that illustrates access control of a memory according to the first embodiment.

The image cut-out unit 100 sequentially writes the pixels of the image data $D_1$ read from the memory $Y_1$ in this way, as illustrated on the left side in FIG. 15A, into the memory $T_1$ toward the line direction for each pixel (timing $WD_1$ represented in Chart 214). In other words, for example, every time when one pixel is read from the memory $Y_1$, the image cut-out unit 100 writes one pixel that has been read into the memory $T_1$.

On the right side in FIG. 15A, an image 162 according to the image data $D_1$ written into the memory $T_1$ in this way is illustrated. The image data $D_1$ is written into the memory $T_1$ with a size of horizontal 1080 pixels×vertical 1920 pixels (lines) and is the image 162 acquired by rotating the input image 160 by 90° in the clockwise direction and interchanging the horizontal direction and the vertical direction.

The image cut-out unit 100 designates an address of the cut out area that is designated by the image control unit 103 to the memory $T_1$ and reads image data of the area designated as the cut out area from the memory $T_1$. The timing of this reading process, as represented by timing $RD_1$ in Chart 214, is delayed from the timing at which the image data $D_1$ is input to the image cut-out unit 100 by two vertical synchronization signals VD.

The projector device 1 according to this embodiment, as described above, moves the projection position of the projection image by rotating the drum unit 10 so as to change the projection angle θ according to the projection lens 12 and designates a reading position for image data in accordance with the projection angle θ. For example, the image data $D_1$ is input to the image cut-out unit 100 at the timing of the projection angle $θ_1$. The projection angle θ at the timing when an image according to the image data $D_1$ is actually projected may be changed from the projection angle $θ_1$ to a projection angle $θ_3$ different from the projection angle $θ_1$.

Accordingly, the cut out area at the time of reading the image data $D_1$ from the memory $T_1$ is read from a range that is larger than the area of image data corresponding to the projected image in consideration of a change in the projection angle θ.

Figure 15B:
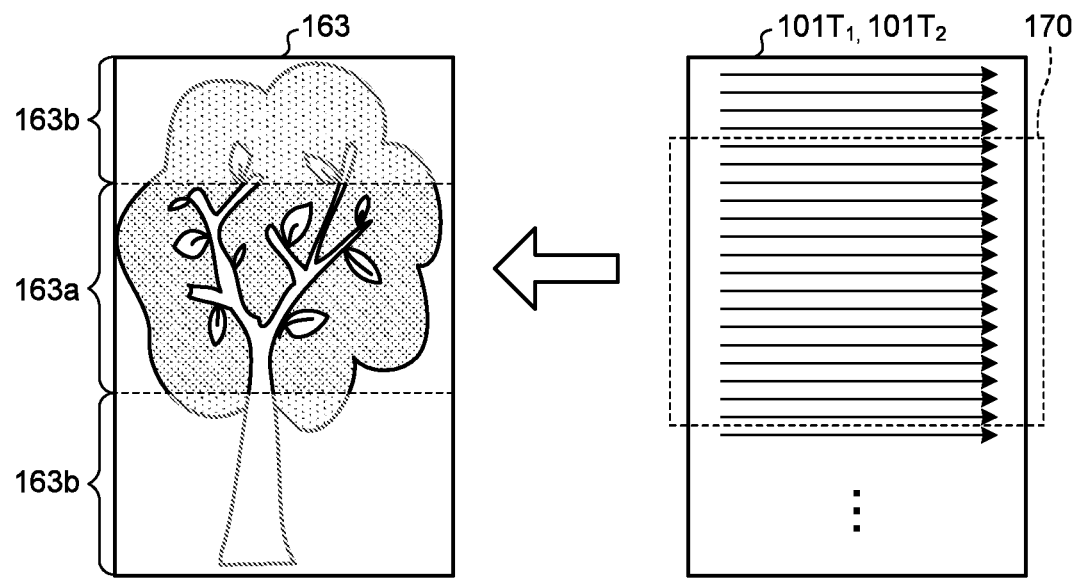
FIG. 15B is a schematic diagram that illustrates access control of a memory according to the first embodiment.

The description will be described more specifically with reference to FIG. 15B. The left side in FIG. 15B illustrates an image 163 according to the image data $D_1$ stored in the memory $T_1$. In this image 163, an area that is actually projected is represented as a projection area 163a, and the other area 163b is represented as a non-projection area. In this case, the image control unit 103 designates a cut out area 170 that is larger than the area of the image data corresponding to the image of the projection area 163 by at least the number of lines corresponding to a change of a case where the projection angle θ according to the projection lens 12 maximally changes during a period of two vertical synchronization signals VD for the memory $T_1$ (see the right side in FIG. 15B).

The image cut-out unit 100 reads the image data from this cut out area 170 at the timing of a next vertical synchronization signal VD after the vertical synchronization signal VD for writing the image data $D_1$ into the memory $T_1$. In this way, at the timing of the projection angle $\theta_3$, the image data to be projected is read from the memory $T_1$, is supplied to the display element 114 through the image processing unit 102 of a later stage, and is projected from the projection lens 12.

At the timing of the next vertical synchronization signal VD after the vertical synchronization signal VD for which the image data $D_1$ is input, the image data $D_2$ is input to the image cut-out unit 100. At this timing, the image data $D_1$ is written into the memory $Y_1$. Accordingly, the image cut-out unit 100 writes the image data $D_2$ into the memory $Y_2$ (timing $WD_2$ represented in Chart 215). The sequence of writing the image data $D_2$ into the memory $Y_2$ at this time is similar to the sequence of writing the image data $D_1$ described above into the memory $Y_1$, and the sequence for the image is similar to that described above (see FIG. 14B).

In other words, the image cut-out unit 100 sequentially reads the image data $D_2$ in the vertical direction over the lines for each pixel up to the pixel positioned at the upper end of the image with a pixel positioned on the lower left corner of the image being set as a reading start pixel, and next, pixels are read in the vertical direction with a pixel positioned on the right side neighboring to the pixel positioned at the reading start position of the vertical direction being set as a reading start pixel (timing $RD_2$ represented in Chart 215). This operation is repeated until the reading of a pixel positioned on the upper right corner of the image is completed. The image cut-out unit 100 sequentially writes (timing $WD_2$ represented in Chart 216) the pixel of the image data $D_2$ read from the memory $Y_2$ in this way into the memory $T_2$ toward the line direction for each pixel (see the left side in FIG. 15A).

The image cut-out unit 100 designates an address of the cut out area that is designated by the image control unit 103 to the memory $T_2$ and reads image data of the area designated as the cut out area from the memory $T_2$ at timing $RD_2$ represented in Chart 216. At this time, as described above, the image control unit 103 designates an area lager than the area of the image data corresponding to the projected image as the cut out area 170 in consideration of a change in the projection angle θ for the memory $T_2$ (see the right side in FIG. 15B).

The image cut-out unit 100 reads the image data from this cut out area 170 at the timing of a next vertical synchronization signal VD after the vertical synchronization signal VD for writing the image data $D_2$ into the memory $T_2$. In this way, the image data of the cut out area 170 of the image data $D_2$ input to the image cut-out unit 100 at the timing of the projection angle $\theta_2$ is read from the memory $T_2$ at the timing of the projection angle $\theta_4$, is supplied to the display element 114 through the image processing unit 102 of a later stage, and is projected from the projection lens 12.

Thereafter, similarly, for the image data $D_3$, $D_4$, $D_5$, . . . , the process is sequentially performed using a set of the memories $Y_1$ and $T_1$ and a set of the memories $Y_2$ and $T_2$ in an alternate manner.

As described above, according to this embodiment, in the memory 101, an area of the memories $Y_1$ and $Y_2$ used for writing and reading image data with the size of horizontal 1920 pixels×vertical 1080 pixels (lines) and an area of the memories $T_1$ and $T_2$ used for writing and reading image data with the size of horizontal 1080 pixels×vertical 1920 pixels (lines) are arranged. The reason for this is that, generally, a DRAM (Dynamic Random Access Memory) used for an image memory has an access speed for the vertical direction that is lower than an access speed for the horizontal direction. In a case where another memory, which is easily randomly accessible, having access speeds of the same level for the horizontal direction and the vertical direction is used, a configuration may be employed in which a memory having a capacity corresponding to the image data is used in both the cases.

Trapezoidal Correction

Figure 31A:
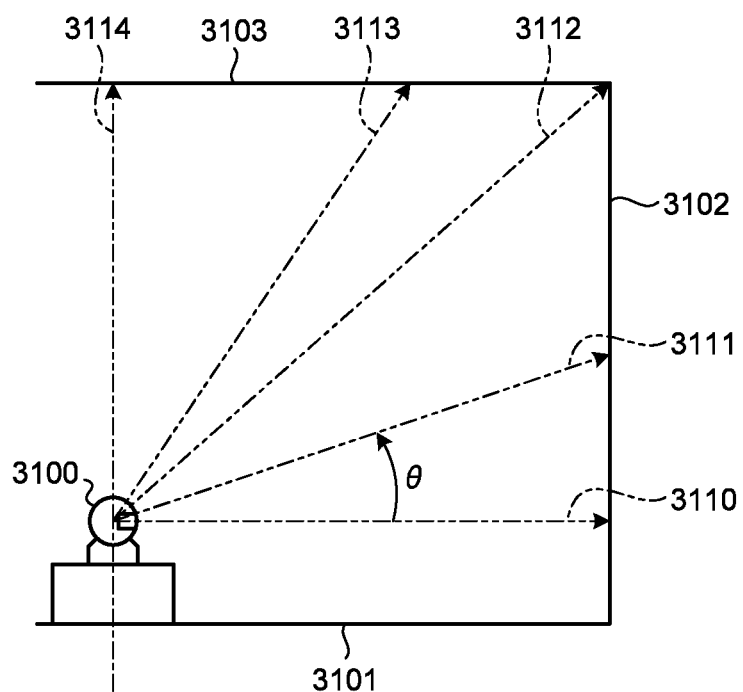
FIG. 31A is a diagram that illustrates a case where the keystone correction is not performed.
Figure 31B:
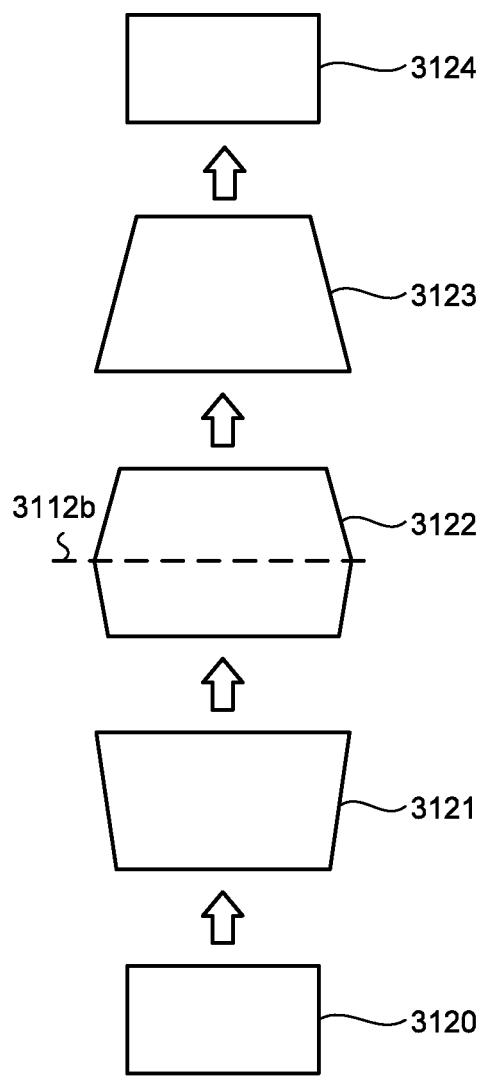
FIG. 31B is a diagram that illustrates a case where the keystone correction is not performed.

Next, the calculation of correction coefficients used for a trapezoidal correction performed by the keystone adjustment unit 107 and the trapezoidal correction performed by the keystone correction unit 108 based on the calculated correction coefficients will be described. First, a conventional trapezoidal correction will be described. FIGS. 31A and 31B are diagrams that illustrate a case where the trapezoidal correction is not performed.

FIG. 31A illustrates a conventional projector device 3100 and projection angles θ and projection directions of a case where a floor face 3101, a wall face 3102, and a ceiling 3103 are set as projection faces. FIG. 31B illustrates shapes of projection images that are projected to and are displayed on projection faces of the wall face 3102 and the ceiling 3103 for each projection direction illustrated in FIG. 31A. In FIG. 31B, a shape 3120 is a shape of a projection image displayed on the projection face in a projection direction 3110, a shape 3121 is a shape of a projection image displayed on the projection face in a projection direction 3111, a shape 3122 is a shape of a projection image displayed on the projection face in a projection direction 3112, a shape 3123 is a shape of a projection image displayed on the projection face in a projection direction 3113, and a shape 3124 is a shape of a projection image displayed on the projection face in a projection direction 3114.

Here, the projection direction 3110 is a projection direction of a case where an angle formed by the optical axis of the projection lens of the projector device 3100 and the wall face 3102 is a right angle, in other words, in a case where the projection direction is a horizontal direction. In such a case, generally, the projection image projected to the wall face 3102, as illustrated in the shape 3120, is designed to be a rectangular shape.

For the purpose of projection for the upper side of the wall face 3102, when the projection angle θ is increased by upwardly inclining the projection lens of the projector device 3100 such that the projection direction 3111 is set, in a case where a so-called trapezoidal correction is not performed, the shape of a projection image formed on the wall face 3102, as illustrated in the shape 3121, is a trapezoid in which the upper side is longer than the lower side due to a difference in the projection distances.

In a case where the projection direction of the projection lens is set to the direction 3112 of the boundary between the wall face 3102 and the ceiling 3103 by further increasing the projection angle θ, as illustrated in the shape 3122, the projection image is projected to both the wall face 3102 and the ceiling 3103. In other words, a projection image having a shape 3122 is projected which has a trapezoidal portion having the upper side longer than the lower side on the wall face 3102 and a trapezoidal portion having the upper side shorter than the lower side at the ceiling 3103 with the boundary (represented by a boundary 3112b in the shape 3122 illustrated in FIG. 31B) between the wall face 3102 and the ceiling 3103 formed as the boundary.

In a case where the projection direction of the projection lens is set to the projection direction 3113 toward the ceiling 3103 by further increasing the projection angle θ, the projection image, as illustrated in the shape 3123, is a trapezoid of which the relative lengths between the length of the upper side and the length of the lower side is reversed from those of the shape 3121 of the projection image on the wall face 3102 is formed.

Then, in a case where the angle formed by the optical axis of the projection lens of the projector device 3100 and the ceiling 3103 is a right angle, in other words, in a case where the projection direction is a vertical direction (denoted as the projection direction 3114 in FIG. 31A), the projection image projected to the ceiling, as illustrated in the shape 3124, is a rectangle. As above, in the conventional projector device, the shape of a projection image that is projected to and is displayed on the projection face is distorted to a shape such as a trapezoid due to a difference between projection distances except for the case of the projection directions 3110 and 3114.

Figure 32A:
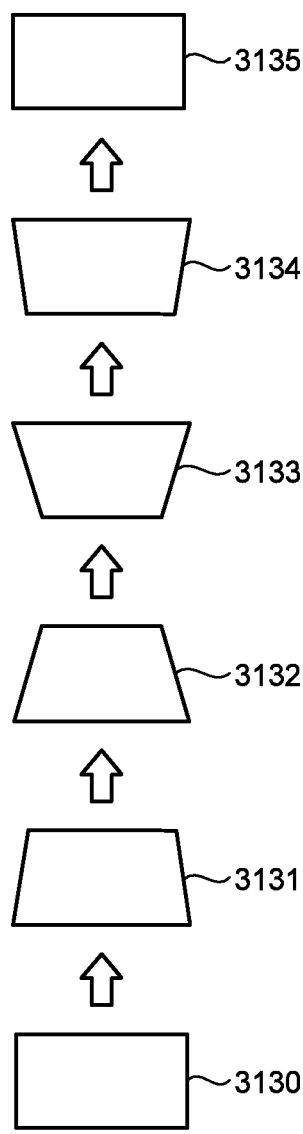
FIG. 32A is a diagram that illustrates a conventional keystone correction.

For this reason, in the conventional projector device 3100, a trapezoidal correction, as described below, may be further performed for the image data and the image data after the trapezoidal correction may be projected. FIG. 32A illustrates the shape of an image relating to image data after the trapezoidal correction, and FIG. 32B illustrates the shape of a projection image acquired by projecting the image data after the trapezoidal correction illustrated in FIG. 32A to the projection face.

A shape 3130 illustrated in FIG. 32A is the shape of an image relating to the image data after the trapezoidal correction at the time of the projection direction 3110 illustrated in FIG. 31A. A shape 3131 illustrated in FIG. 32A is the shape of an image relating to the image data after the trapezoidal correction at the time of the projection direction 3111 illustrated in FIG. 31A. A shape 3132 illustrated in FIG. 32A is the shape of an image relating to the image data after the trapezoidal correction at a time when the projection direction is in a range between the projection direction 3111 and the projection direction 3112 illustrated in FIG. 31A. A shape 3133 illustrated in FIG. 32A is the shape of an image relating to the image data after the trapezoidal correction at a time when the projection direction is in a range between the projection direction 3112 and the projection direction 3113 illustrated in FIG. 31A. A shape 3134 illustrated in FIG. 32A is the shape of an image relating to the image data after the trapezoidal correction at the time of the projection direction 3113 illustrated in FIG. 31A. In addition, a shape 3135 illustrated in FIG. 32A is the shape of an image relating to the image data after the trapezoidal correction at the time of the projection direction 3114 illustrated in FIG. 31A.

Figure 32B:
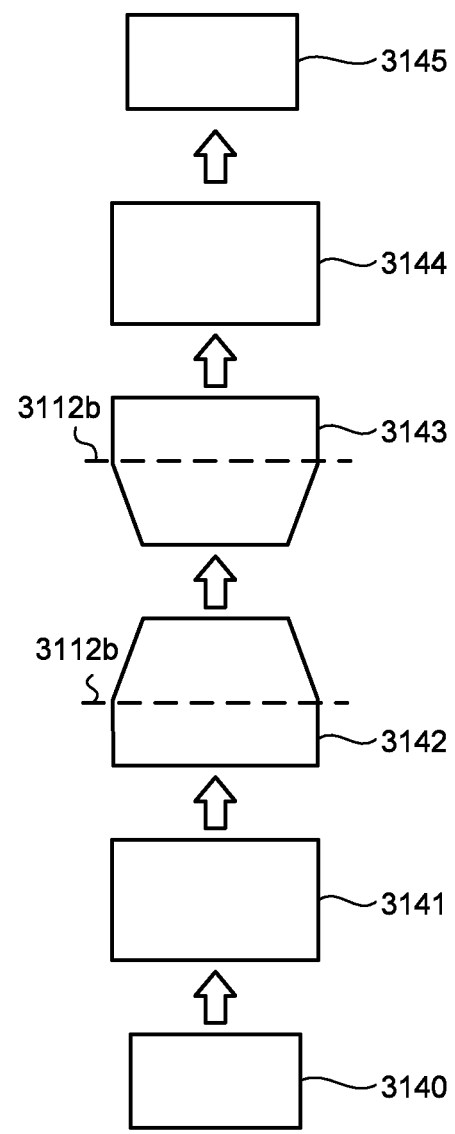
FIG. 32B is a diagram that illustrates a conventional keystone correction.

A shape 3140 illustrated in FIG. 32B is the shape of a projection image that is projected to the wall face 3102 so as to be displayed thereon after the trapezoidal correction at the time of the projection direction 3110 illustrated in FIG. 31A. A shape 3141 illustrated in FIG. 32B is the shape of a projection image that is projected to the wall face 3102 so as to be displayed thereon after the trapezoidal correction at the time of the projection direction 3111 illustrated in FIG. 31A. A shape 3142 illustrated in FIG. 32B is the shape of a projection image that is projected to the wall face 3102 and the ceiling 3103 so as to be displayed thereon after the trapezoidal correction at the time when the projection direction is in a range between the projection direction 3111 and the projection direction 3112 illustrated in FIG. 31A. A shape 3143 illustrated in FIG. 32B is the shape of a projection image that is projected to the wall face 3102 and the ceiling 3103 so as to be displayed thereon after the trapezoidal correction at the time when the projection direction is in a range between the projection direction 3112 and the projection direction 3113 illustrated in FIG. 31A. A shape 3144 illustrated in FIG. 32B is the shape of a projection image that is projected to the ceiling so as to be displayed thereon after the trapezoidal correction at the time of the projection direction 3113 illustrated in FIG. 31A. In addition, a shape 3145 illustrated in FIG. 32B is the shape of a projection image that is projected to the ceiling 3103 so as to be displayed thereon after the trapezoidal correction at the time of the projection direction 3114 illustrated in FIG. 31A.

In a case where the projection direction is the projection direction 3110, the projector device 3100 projects the shape 3130 of an image relating to image data to be projected to the wall face 3102 to the wall face with the shape not being changed to a trapezoidal shape but being maintained as a rectangular shape, in other words, with the correction amount of the trapezoidal correction being set to zero. Then, on the wall face 3102, the projection image is displayed in the shape 3140 of the rectangle.

In a case where the projection direction is the projection direction 3111, the projector device 3100 performs a correction shaping the shape of an image relating to image data to be projected to the wall face 3102 into the shape 3131 of an image that has a trapezoidal shape having the relation between the length of the upper side and the length of the lower side that is opposite to that of the trapezoidal shape of the shape 3121 illustrated in FIG. 31B and projects the image of the shape 3131 after the correction to the wall face. As a result of the trapezoidal correction, on the wall face, the projection image 3141 having no trapezoidal distortion is displayed.

Similarly, in a case where the projection direction is the projection direction 3113, the conventional projector device 3100 performs a correction shaping the shape of an image relating to image data to be projected to the ceiling 3103 into the shape 3134 that has a trapezoidal shape having the relation between the length of the upper side and the length of the lower side that is opposite to that of the trapezoidal shape of the shape 3123 illustrated in FIG. 31B and projects the image data of the shape 3134 after the correction to the ceiling 3103. As a result, on the ceiling 3103, the projection image having the shape 3144 having no trapezoidal distortion is displayed.

In a case where the projection direction is the projection direction 3114, the projector device 3100 projects the shape 3135 of an image relating to image data to be projected to the ceiling 3103 to the ceiling 3103 with the shape not being changed to a trapezoidal shape but being maintained as a rectangular shape, in other words, with the correction amount of the trapezoidal correction being set to zero. Then, on the ceiling 3103, the projection image having the shape 3145 of the rectangle is displayed.

Here, in the conventional projector device 3100, when the projection direction becomes a predetermined direction set based on the boundary between the wall face 3102 and the ceiling 3103, in other words, in a case where the projection angle θ becomes a predetermined displacement angle set in advance, by reversing the left side and the right side of the trapezoid for the shape of the image relating to the image data to be projected to the projection face, an appropriate trapezoidal correction is performed for the wall face 3102 and the ceiling 3103. In the example described above, for the projection direction 3112 and the projection direction 3113, the upper side and the lower side of the trapezoid are reversed between the shape 3131 of the image and the shape 3134 of the image.

However, when the operation performed at the boundary between the wall face 3102 and the ceiling 3103 and near the boundary is reviewed in detail, there are inconveniences as below. In other words, in a case where the predetermined direction described above is set to the projection direction 3112 or near the projection direction 3112, between before and after the projection direction becomes the predetermined direction, the shape of an image relating to the image data is switched from the shape 3132 to the shape 3133 illustrated in FIG. 32A, and the shape of a projection image displayed on the projection medium is switched from the shape 3142 to the shape 3143 illustrated in FIG. 32B. Accordingly, between before and after the projection direction becomes the predetermined direction, the shape of a projection image displayed on the projection medium is changed discontinuously.

In other words, for the shape 3132 of an image relating to the image data, the image is projected in the shape 3142 in which a portion projected onto the wall face 3102 is a rectangle, and a portion projected to the ceiling 3103 having the boundary as a border is a trapezoid. In addition, for the shape 3133 of an image relating to the image data, the image is projected in the shape 3143 in which a portion projected to the wall face 3102 is a trapezoid, and a portion projected to the ceiling 3103 having the boundary as a border is rectangle. The shape of the projection image is discontinuously changed to these shapes 3142 and 3143 different from each other.

In addition, by moving the projection lens of the projector device 3100, in a case where the projection image is caused to reciprocate near the boundary between the wall face 3102 and the ceiling 3103 or in a case where the movement of the projection image is stopped at the boundary limit, the switching between a positive/negative trapezoidal correction is repeatedly performed, and an unstable video is formed, whereby it is difficult to project a smooth and stable projection image that can be easily viewed.

For this reason, in the projector device 1 according to this first embodiment, by performing a trapezoidal correction of which the correction amount is adjusted in accordance with the projection angle θ as below, the projection of a smooth and stable projection image that can be easily viewed is realized.

Figure 16:
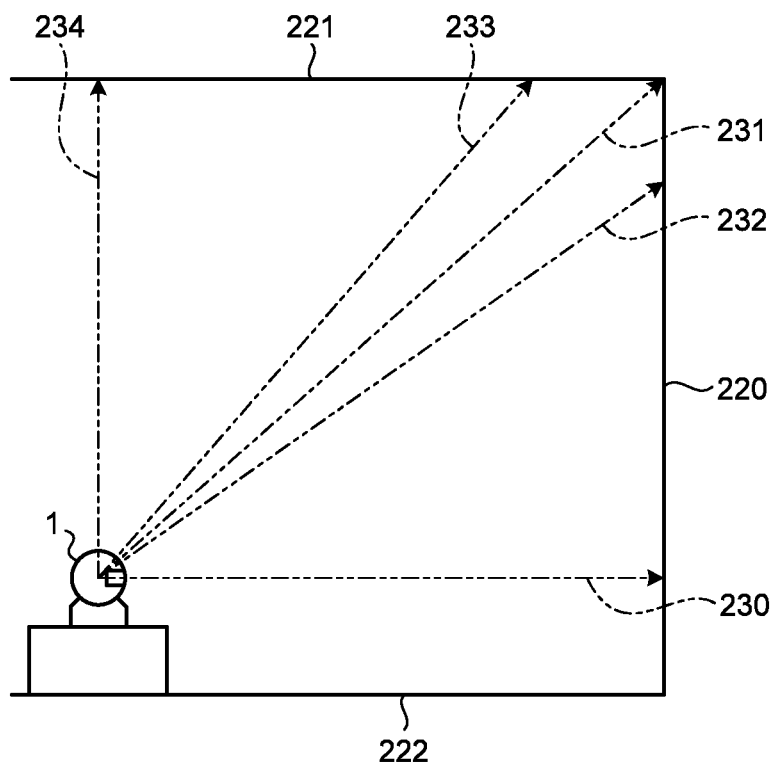
FIG. 16 is a diagram that illustrates a projector device 1 according to the first embodiment and major projection directions of a projection lens 12 in a case where a floor face, a wall face, and a ceiling are used as projection faces.

FIG. 16 is a diagram that illustrates the projector device 1 according to the first embodiment and major projection directions of the projection lens 12 in a case where a floor face, a wall face, and a ceiling are used as projection faces. Here, a projection direction 230 illustrates a case where the optical axis of the projection lens 12 of the projector device 1 and a wall face 220 form a right angle, in other words, the horizontal direction, and a projection angle at this time is defined as 0°.

A projection direction 231 is a direction of the boundary between the wall face 220 and a ceiling 221 that are two projection faces lined up to have a predetermined angle therebetween. In the example illustrated in FIG. 16, the predetermined angle is 90°. A projection direction 232 is the projection direction of the projection lens 12 of a case where, in a rectangular projection image that is projected to the wall face 220 so as to be projected thereon, the upper side corresponding to a first side out of one pair of sides in a direction perpendicular to the vertical direction that is the movement direction of the projection image almost coincides with the boundary between the wall face 220 and the ceiling 221.

A projection direction 233 is the projection direction of the projection lens 12 of a case where the lower side corresponding to a second side out of the one pair of sides of the projection image of the ceiling 221 almost coincides with the boundary between the wall face 220 and the ceiling 221. A projection direction 234 is the direction of the ceiling 221 disposed right above the projector device 1 and is in a state in which the optical axis of the projection lens 12 and the ceiling 221 form a right angle. The projection angle at this time is 90°.

The boundary storage unit 109 illustrated in FIG. 4 stores the projection angle at the time of the projection direction 232 as a first boundary start angle, stores the projection angle at the time of the projection direction 231 as a first boundary angle, and stores the projection angle at the time of the projection direction 233 as a first boundary end angle.

In this embodiment, before projecting an image relating to a desired content by starting the projector device 1, while a user, in a state in which a desired zoom magnification at the time of projecting the image relating to the desired content is set, projects an image relating to arbitrary image data, the user rotates the projection direction of the projection lens 12 from a floor face 222 to the wall face 220 and the ceiling 221.

Then, every time when the upper side corresponding to the first side out of one pair of sides disposed in a direction perpendicular to the vertical direction that is the movement direction of a projection image arrives at the projection direction 232 that almost coincides with the boundary between the wall face 220 and the ceiling 221, or the lower side corresponding to the second side out of one pair of sides of the projection image arrives at the projection direction 233 that almost coincides with the boundary between the wall face 220 and the ceiling 221 or arrives at the projection direction 231 in which the optical axis almost coincides with the boundary, when the registration unit 118 receives events of key pressing in accordance with the pressing of a predetermined key using the operation unit 14, projection angles at time points when the key is pressed are registered in the boundary storage unit 109 as a first boundary start angle, a first boundary angle, and a first boundary end angle.

Hereinafter, the rotation of the projection lens 12 and an operation of storing the first boundary start angle, the first boundary angle, and the first boundary end angle in the boundary storage unit 109, which are performed before the projection of a desired content, will be referred to as an initial setting operation.

In addition, in the initial setting operation, the user, similarly to the description presented above, designates a second boundary start angle that is a projection angle of a projection direction when the upper side of the projection image approximately coincides with the boundary between the floor face 222 and the wall face 220, a second boundary angle that is a projection angle of a projection direction that almost coincides with the boundary between the floor face 222 and the wall face 220, and a second boundary end angle that is a projection angle of a projection direction when the lower side of the projection image approximately coincides with the boundary between the floor face 222 and the wall face 220, and the registration unit 118 stores the second boundary start angle, the second boundary angle, and the second boundary end angle in the boundary storage unit 109 as well.

The keystone adjustment unit 107 illustrated in FIG. 4 sequentially receives derived current projection angles 123 from the rotation control unit 104. Then, the keystone adjustment unit 107, based on the information that is stored in the boundary storage unit 109, adjusts a correction amount for a trapezoidal distortion for each of an angle range for received projection angles 123 up to the first boundary start angle, an angle range from the first boundary start angle to the first boundary angle, an angle range from the first boundary angle to the first boundary end angle, and an angle range after the first boundary end angle. Similarly, the keystone adjustment unit 107, based on the information that is stored in the boundary storage unit 109, adjusts a correction amount for a trapezoidal distortion for each of an angle range for received projection angles 123 up to the second boundary start angle, an angle range from the second boundary start angle to the second boundary angle, an angle range from the second boundary angle to the second boundary end angle, and an angle range after the second boundary end angle.

Here, in shaping the shape of an image relating to the image data that is a projection target from a rectangle to a trapezoid, the correction amount for the trapezoidal distortion may be large in a case where a difference between the lengths of the upper side and the lower side of the shaped trapezoid is large, the correction amount for the trapezoidal distortion may be small in a case where a difference between lengths of the upper side and the lower side of the shaped trapezoid is small. The correction amount for the trapezoidal distortion may be increased in a case where the difference between the lengths of the upper side and the lower side of the shaped trapezoid increases, and the correction amount for the trapezoidal distortion may be decreased in a case where the difference between the lengths of the upper side and the lower side of the shaped trapezoid decreases.

The adjustment of the correction amount for the trapezoidal distortion that is performed by the keystone adjustment unit 107 is performed based on a correction coefficient derived in accordance with a projection angle of each time.

Here, the correction coefficient may be derived based on the reciprocal of the ratio between the length of the upper side and the length of the lower side of the projection image that is projected so as to be displayed in a case where a trapezoidal correction is not performed.

Here, a case where the correction coefficient is "1" represents that the correction amount for a trapezoidal distortion is zero, in other words, the trapezoidal correction is not performed. In addition, as the value of the correction coefficient becomes closer to "1", the correction amount for the trapezoidal distortion decreases, in other words, it represents that the degree of the trapezoidal correction decreases. To the contrary, as the value of the correction coefficient becomes farther from "1", the correction amount for the trapezoidal distortion increases, in other words, it represents that the degree of the trapezoidal correction increases. The process of adjusting the correction amount for the trapezoidal distortion based on the calculated correction coefficient will be described later in detail.

The keystone adjustment unit 107 of the projector device 1 according to this embodiment, for example, until the projection angle θ arrives at the first boundary start angle from 0°, maintains the shape of the projection image that is projected to the wall face 220 so as to be displayed thereon in an approximate rectangle and accordingly, an adjustment for increasing the correction amount for the trapezoidal distortion is performed based on the correction coefficient derived in accordance with the projection angle θ.

Next, the keystone adjustment unit 107 of the projector device 1, as the projection angle θ changes from the first boundary start angle to the first boundary angle, performs an adjustment for decreasing the correction amount for the trapezoidal distortion based on the correction coefficient derived in accordance with the projection angle θ. In addition, the keystone adjustment unit 107, as the projection angle θ changes from the first boundary angle to the first boundary end angle, performs an adjustment for increasing the correction amount for the trapezoidal distortion based on the correction coefficient derived in accordance with the projection angle θ. In this way, in an angle range of the projection angle θ from the first boundary start angle to the first boundary end angle, the continuity of the shape of the projection image that is projected to the wall face 220 so as to be displayed thereon is maintained.

Then, the keystone adjustment unit 107 of the projector device 1, as the projection angle θ increases to be larger than the first boundary end angle, in order to maintain the shape of the projection image that is projected to the wall face 220 so as to be displayed thereon in an approximate rectangle again, performs an adjustment for decreasing the correction amount for the trapezoidal distortion based on the correction coefficient derived in accordance with the projection angle θ.

Here, the keystone adjustment unit 107 determines the projection direction based on the projection angle θ and determines a correction direction of a trapezoidal correction performed for the trapezoidal distortion based on the determination of the projection direction. Here, the correction direction represents which one of the upper side and the lower side of the image data is to be compressed. Then, the keystone adjustment unit 107 derives each projection angle θ described above or a correction coefficient for the angle range thereof based on the correction direction.

More specifically, in a case where the projection direction is determined to be a direction of the floor face or a direction upwardly projecting the wall face depending on the projection angle θ, the upper side of the trapezoid of the projection image displayed on the projection face is longer than the lower side thereof, and accordingly, the keystone adjustment unit 107 determines the correction direction of the trapezoidal correction as a direction for compressing the upper side of the trapezoid. Then, in a case where the correction direction of the trapezoidal correction is determined as the direction for compressing the upper side of the trapezoid, the keystone adjustment unit 107 calculates the correction coefficient to be a positive value.

On the other hand, in a case where the projection direction is determined to be a direction downwardly projecting the wall face 220 or a direction for projecting the ceiling 221 based on the projection angle 123, the lower side of the trapezoid of the projection image displayed on the projection face is longer than the upper side thereof, and accordingly, the keystone adjustment unit 107 determines the correction direction of the trapezoidal correction as a direction for compressing the lower side of the trapezoid. Then, in a case where the correction direction of the trapezoidal correction is determined as the direction for compressing the lower side of the trapezoid, the keystone adjustment unit 107 calculates the correction coefficient of the keystone correction to be a negative value.

The keystone correction unit 108 changes the lengths of the upper side and the lower side of the image data corresponding to the upper side and the lower side of the projection image that is projected to the projection face so as to be displayed thereon based on the correction coefficient derived by the keystone adjustment unit 107 in accordance with the projection angle θ, thereby performing the trapezoidal correction.

More specifically, in a case where the calculated correction coefficient is positive, the keystone correction unit 108 multiplies the length of the upper side of the image data by the correction coefficient, thereby performing the trapezoidal correction for compressing the upper side. On the other hand, in a case where the calculated correction coefficient is negative, the keystone correction unit 108 multiplies the length of the lower side of the image data by the correction coefficient, thereby performing the trapezoidal correction for compressing the lower side.

Figure 17A:
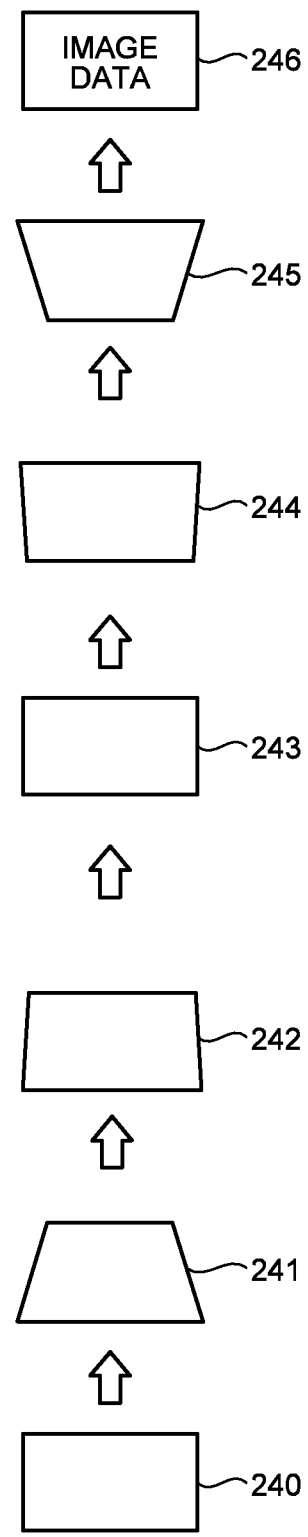
FIG. 17A is a diagram that illustrates a keystone correction according to the first embodiment that is performed in a case where image data is projected onto a projection face illustrated in FIG. 16.
Figure 17B:
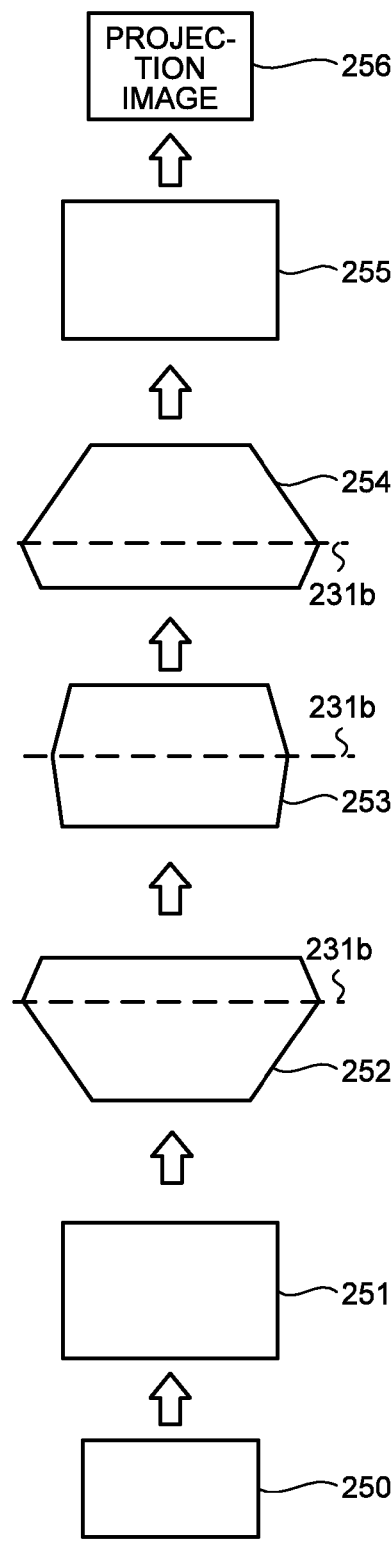
FIG. 17B is a diagram that illustrates a keystone correction according to the first embodiment that is performed in a case where image data is projected onto the projection face illustrated in FIG. 16.

FIGS. 17A and 17B are diagrams that illustrate a trapezoidal correction performed by the keystone correction unit 108 based on a correction amount for a trapezoidal distortion that is derived by the keystone adjustment unit 107 in a case where image data is projected to the projection face illustrated in FIG. 16. In the example illustrated in FIGS. 17A and 17B, for the simplification of description, a case where the projection angle is increased from 0° to the upper side, in other words, a case where the position at which the projection image is projected is moved from the wall face 220 to the ceiling 221 will be described as an example. Thus, description of a keystone correction according to the second boundary start angle, the second boundary angle, and the second boundary end angle will not be presented.

FIGS. 17A and 17B illustrate examples of the shapes of an image relating to image data after the correction for a trapezoidal distortion is performed by the keystone correction unit 108. Shapes 240, 241, 243, 245, and 246 represented in FIG. 17A respectively illustrate images relating to the image data that is projection target for the projection directions 230, 232, 231, 233, and 234 represented in FIG. 16. In addition, a shape 242 of an image illustrates the shape of an image relating to corresponding image data when the projection direction is between the projection direction 232 and the projection direction 231, and a shape 244 of an image illustrates the shape of an image relating to corresponding image data when the projection direction is between the projection direction 231 and the projection direction 233.

FIG. 17B illustrates an example of the shapes of a projection image that is projected to a projection medium so as to be displayed thereon based on image data after a correction for a trapezoidal distortion is performed by the keystone correction unit 108. Shapes 250, 251, 253, 255, and 256 represented in FIG. 17B respectively illustrate shapes of projection images projected to the projection medium in the projection directions 230, 232, 231, 233, and 234 represented in FIG. 16. In addition, a shape 252 illustrates the shape of a corresponding projection image when the projection direction is between the projection direction 232 and the projection direction 231, and a shape 254 illustrates the shape of a corresponding projection image when the projection direction is between the projection direction 231 and the projection direction 233.

The user, after the completion of the initial setting operation as described above, rotates the projection lens 12 from the housed state to the upper side while projecting an image relating to a desired content. In the case of the projection direction 230, which is in the initial state, of a projection angle of 0°, as the shape 240 of an image relating to image data, a rectangular shape for which the correction coefficient is "1", in other words, a correction amount for a trapezoidal distortion is zero is formed. Then, on the projection face, the projection image of the shape 250 that is a rectangle is displayed.

Thereafter, as the projection angle θ is increased, in order to maintain the projection image displayed on the projection face to be in a rectangle, the keystone adjustment unit 107 increases the correction amount for a trapezoidal distortion by gradually decreasing the correction coefficient from "1". In other words, as the projection angle θ is increased, the trapezoidal shape of the image relating to the image data is changed such that the length of the upper side is further shorter than the length of the lower side.

Then, in a case where the projection angle is in the projection direction 232 corresponding to the first boundary start angle at which the upper side of the projection image almost coincides with the boundary between the wall face 220 and the ceiling 221, the shape 241 of the image relating to the image data, which is a trapezoidal shape for which the correction amount is largest in an angle range until the projection angle arrives at the first boundary start angle from the initial state, in other words, a trapezoidal shape in which a difference between the length of the upper side and the length of the lower side is largest in the angle range, is formed.

Thereafter, the keystone adjustment unit 107 performs an adjustment for decreasing a correction amount for a trapezoidal distortion, compared to the case of the shape 241, by causing the correction coefficient to gradually approach "1", and a trapezoidal correction is performed by the keystone correction unit 108. In other words, the keystone correction unit 108 gradually cancels the trapezoidal correction for the image data by decreasing the correction amount by using the keystone adjustment unit 107 for a trapezoidal correction in the case of the first boundary start angle. In the example illustrated in FIGS. 17A and 17B, compared to the shape 241 of the image relating to the image data, the trapezoidal correction for the shape 242 of the image relating to the image data is canceled, whereby a difference between the length of the upper side and the length of the lower side is decreased.

Then, in a case where the projection angle θ is the first boundary angle corresponding to the projection direction 231, in other words, the direction of the boundary (the boundary 231b in each of shapes 252 to 254 in FIG. 17B) between the wall face 220 and the ceiling 221, the keystone adjustment unit 107 sets the correction amount for a trapezoidal distortion to zero by setting the correction coefficient to "1" ("−1"), in other words, completely cancels the trapezoidal correction for the image data and projects an image having the shape 243 relating to the image data having a rectangular shape again.

Thereafter, as the projection angle θ passes through the first boundary angle and is increased, the keystone adjustment unit 107 gradually increases the correction amount for a trapezoidal distortion by gradually increasing the correction coefficient from "−1". In other words, in a trapezoidal shape of an image relating to the image data, as the projection angle θ increases, the length of the lower side changes to be longer than the length of the upper side. In addition, at this time, since the correction coefficient is gradually increased from "−1", the keystone correction unit 108 performs a trapezoidal correction based on a correction direction that is opposite to that of the trapezoidal correction used for a projection image to be projected to the wall face.

Then, in a case where the projection angle θ is in the projection direction 233 corresponding to the first boundary end angle at which the lower side (a side disposed farther from the projector device 1) of the projection image almost coincides with the boundary between the wall face 220 and the ceiling 221, the shape 241 of the image relating to the image data, which has a trapezoidal shape for which the correction amount is largest in an angle range until the projection angle θ arrives at 90° from the first boundary end angle, in other words, a trapezoidal shape in which a difference between the length of the upper side and the length of the lower side is largest in the range, is formed.

In the way described above, in the angle range in which the projection angle θ is larger than the first boundary start angle and is smaller than the first boundary end angle, the shape of the projection image that is projected to the projection medium so as to be displayed thereon can be continuously changed. In other words, in this angle range, a projection image is displayed in which, while a shape having a trapezoidal portion of which the upper side is longer than the lower side on the wall face and having a trapezoidal portion of which the upper side is shorter than the lower side at the ceiling is maintained, only the lengths of lower side of the trapezoidal portion formed on the wall face and the upper side of the trapezoidal portion formed at the ceiling, and the height of each trapezoid are continuously changed.

Then, in a case where the projection angle becomes 90° corresponding to the projection direction 234, in other words, a direction right above the projector device 1 of the ceiling 221, a rectangular shape for which the correction coefficient is "1", in other words, the correction amount for a trapezoidal distortion is zero is formed as the shape 246 of the image relating to the image data. Then, on the projection face, a projection image having the shape 256 of the rectangle is displayed.

In addition, the projection lens 12 may be rotated toward the rear face, and, as the correction operation, a correction opposite to the correction of the projection direction 230 to the projection direction 234 may be performed.

In the way described above, according to the projector device 1, even in a case where the display position of the projection image that is projected so as to be displayed passes through the boundary of the first projection face and the second projection face lined up to have a predetermined angle therebetween and changes, a smooth and stable image that can be easily viewed can be displayed to an observer.

In addition, in the above-described example, the process has been described in which, in the angle range of the projection direction 232 in which the projection angle θ is the first boundary start angle to the projection direction 231 in which the projection angle θ is an angle corresponding to the boundary, the correction amount for a trapezoidal distortion is gradually decreased as the projection angle θ increases, and, in the angle range of the projection direction 231 in which the projection angle θ is an angle (first boundary angle) corresponding to the boundary to the projection direction 233 in which the projection angle θ is the first boundary end angle, the correction amount for a trapezoidal distortion is gradually increased as the projection angle θ increases.

Meanwhile, when the projection angle θ is in an angle range of the first boundary start angle to the first boundary end angle, the keystone adjustment unit 107 may completely cancel the trapezoidal correction by setting the correction amount to zero. Also in such a case, in the angle range of the projection angle θ from the first boundary start angle to the first boundary end angle, the shape of the projection image displayed on the projection face that is formed by the wall face and the ceiling can be continuously changed. In addition, in the angle range of the projection angle θ from the first boundary start angle to the first boundary end angle, the correction amount may be a correction amount for one of the first boundary start angle and the first boundary end angle. Also in such a case, in the angle range of the projection angle θ from the first boundary start angle to the first boundary end angle, the shape of the projection image displayed on the projection face that is formed by the wall face and the ceiling can be continuously changed.

Figure 18:
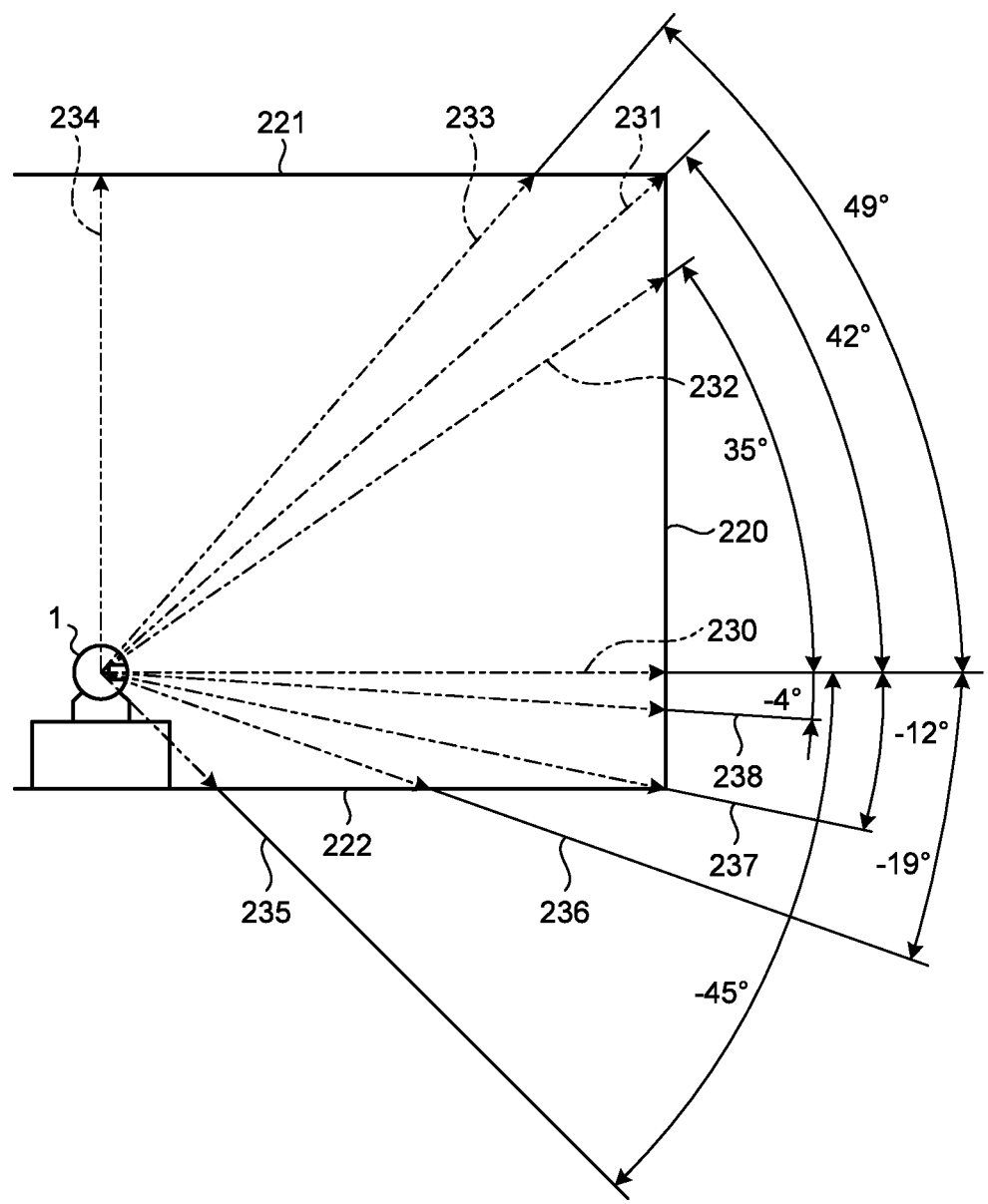
FIG. 18 is a diagram that illustrates major projection directions and projection angles of the projection face according to the first embodiment.

Next, the relation between the projection angle and the correction coefficient and the correction coefficient and the correction amount for a trapezoidal distortion that are derived in accordance with the projection angle will be described in detail. FIG. 18 is a diagram that illustrates major projection directions and projection angles θ according to the first embodiment. Here, the projection directions 230, 232, 231, 233, and 234 are common to FIGS. 18 and 16.

Here, the projection angle θ is an inclination angle of the optical axis of projection light emitted from the projection lens 12 with respect to the horizontal direction. Hereinafter, an inclination angle of a case where the optical axis of the projection light is in the horizontal direction is set as 0°, a case where the drum unit 10 including the projection lens 12 is rotated to the upper side, in other words, the elevation angle side will be defined as positive, and a case where the drum unit 10 is rotated to the lower side, in other words, the depression angle side will be defined as negative. In such a case, a housed state in which the optical axis of the projection lens 12 faces a floor face disposed right below corresponds to a projection angle of −90°, and a horizontal state in which the projection direction faces the front side of a wall face 220 corresponds to a projection angle of 0°, and a state in which the projection direction faces a ceiling 221 disposed right above corresponds to a projection angle of +90°.

In the example illustrated in FIG. 18, the projection angle θ at the time of the projection direction 230 is 0°, the projection angle θ at the time of the projection direction 232 is 35°, the projection angle θ at the time of the projection direction 231 is 42°, and, the projection angle θ at the time of the projection direction 233 is 49°.

A projection direction 235 is a direction in which projection is started by the projector device 1 that is acquired by rotating the projection lens from a state in which the projection lens is positioned toward the right below side) (−90°, and the projection angle θ at this time is −45°. A projection direction 236 is the projection direction of the projection lens in a case where an upper face, which corresponds to a first side, of one pair of sides disposed in a direction perpendicular to the moving direction of a projection image approximately coincides with a boundary between the floor face 222 and the wall face 220 in the projection image on the floor face 222. The projection angle θ at this time will be referred to as a second boundary start angle, and the second boundary start angle is −19°.

A projection direction 237 is a direction of a boundary between the floor face 222 and the wall face 220 that are two projection faces adjacent to each other. The projection angle θ at this time will be referred to as a second boundary angle, and the second boundary angle is −12°.

A projection direction 238 is the projection direction of the projection lens in a case where a lower face, which corresponds to a second side, of the above-described one pair of sides of the projection image on the wall face 220 approximately coincides with a boundary between the floor face 222 and the wall face 220. The projection angle θ at this time will be referred to as a second boundary end angle, and the second boundary end angle is −4°.

Figure 19:
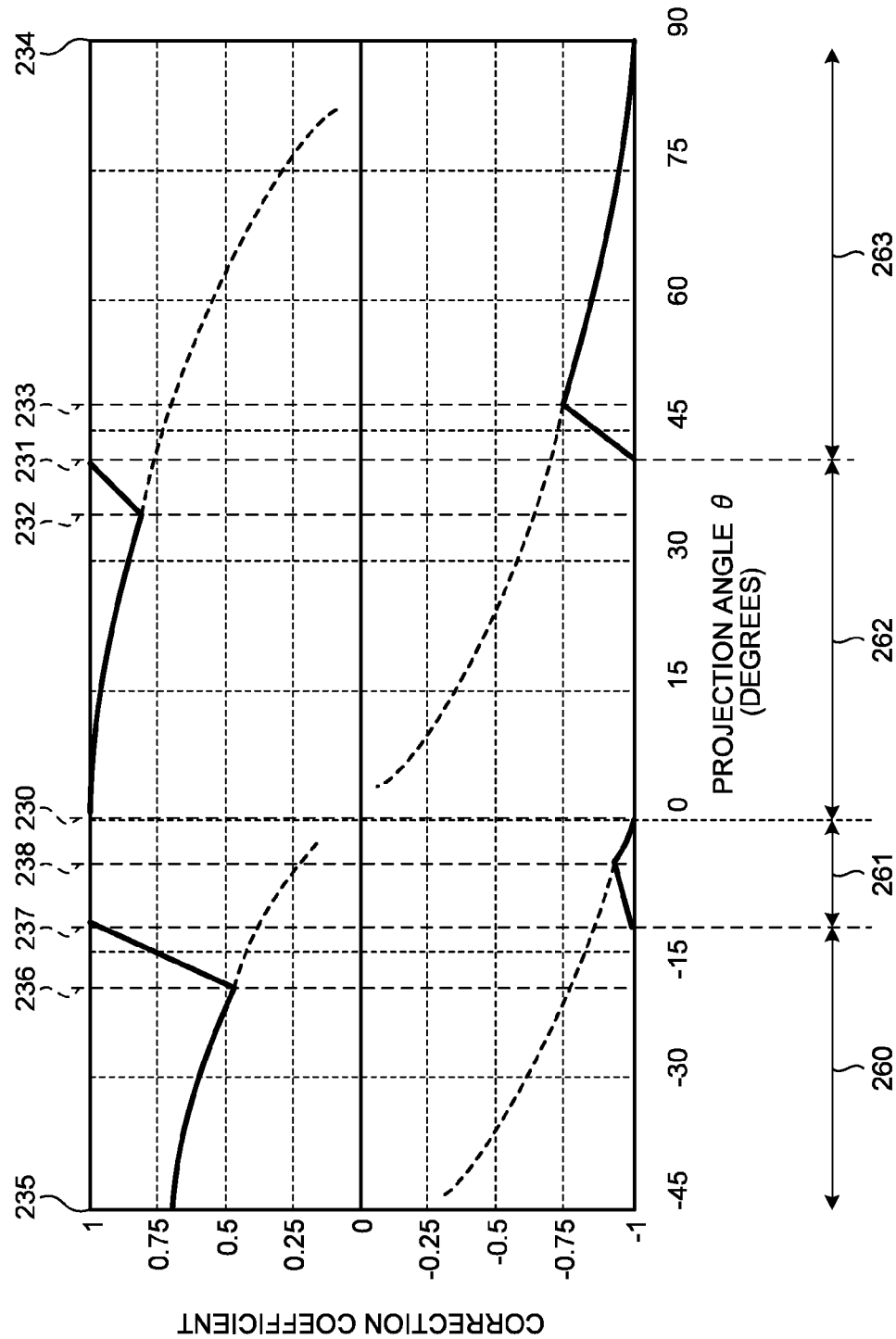
FIG. 19 is a graph that illustrates a relation between a projection angle and a correction coefficient according to the first embodiment.

FIG. 19 is a graph that illustrates a relation between the projection angle and the correction coefficient according to the first embodiment. In FIG. 19, the horizontal axis represents the projection angle θ, and the vertical axis represents the correction coefficient. The correction coefficient takes a positive value or a negative value. As described above, in a case where the correction coefficient is positive, it represents a correction direction for compressing the length of the upper side of the trapezoid of the image data. On the other hand, in a case where the correction coefficient is negative, it represents a correction direction for compressing the length of the lower side of the trapezoid of the image data. In addition, as described above, in a case where the correction coefficient is "1" or "−1", the correction amount for the trapezoidal distortion is zero, whereby the trapezoidal correction is completely canceled.

In FIG. 19, the projection directions 235, 236, 237, 238, 230, 232, 231, 233, and 234 illustrated in FIG. 18 are illustrated in association with projection angles θ thereof. As illustrated in FIG. 19, in a range 260 from a projection angle (−45°) for the projection direction 235 to a projection angle (−12°) for the projection direction 237, the projection lens projects the floor face 222.

In addition, as illustrated in FIG. 19, in a range 261 from a projection angle (−12°) for the projection direction 237 to a projection angle (0°) for the projection direction 230, the projection lens projects the wall face 220 downward. Furthermore, as illustrated in FIG. 19, in a range 262 from a projection angle (0°) for the projection direction 230 to a projection angle (42°) for the projection direction 231, the projection lens projects the wall face 220 upward.

In addition, as illustrated in FIG. 19, in a range 263 from a projection angle (42°) for the projection direction 231 to a projection angle (90°) for the projection direction 234, the projection lens projects the ceiling 221.

The keystone adjustment unit 107 derives a trapezoidal distortion correction amount based on a correction coefficient according to each projection angle θ denoted by a solid line in FIG. 19 and performs a trapezoidal correction for the image data based on the calculated correction amount. In other words, the keystone adjustment unit 107, based on the projection angle, determines whether the projection direction of the projection lens 12 is the projection direction that is an upward projection direction with respect to the wall face 220, the projection direction toward the face of the ceiling 221, the projection direction that is a downward direction for the wall face 220, or the projection direction toward the floor face 222 and determines a correction direction for the image data in accordance with the projection direction. Then, the keystone adjustment unit 107 derives a correction coefficient corresponding to the projection angle 123 that is output from the rotation control unit 104.

Here, as illustrated in FIG. 19, between a projection angle (−45°) at the time of the projection direction 235 and the second boundary start angle (−19°) that is the projection angle at the time of the projection direction 236 and between a projection angle (0°) at the time of the projection direction 230 and the first boundary start angle (35°) that is the projection angle at the time of the projection direction 232, the correction coefficient is positive and gradually decreases, and the correction amount for the trapezoidal distortion gradually increases. Here, the correction coefficient or the correction amount therebetween is used for maintaining the shape of the projection image projected onto the projection face to be a rectangle.

On the other hand, as illustrated in FIG. 19, between the second boundary start angle (−19°) that is the projection angle at the time of the projection direction 236 and the second boundary angle (−12°) that is the projection angle at the time of the projection direction 237 and between the first boundary start angle (35°) that is the projection angle of the projection direction 232 and the first boundary angle (42°) that is the projection angle at the time of the projection direction 231, the correction coefficient is positive and gradually increases, and a correction amount for a trapezoidal distortion is gradually decreased.

The correction coefficient of the conventional projector device 3100 described above therebetween is denoted by broken lines in FIG. 19. In the conventional projector device 3100, also after the second boundary angle (−19°) that is the projection angle at the time of the projection direction 236 or the first boundary angle (35°) that is the projection angle at the time of the projection direction 232, in a case where the projection medium is formed not by two projection faces having a predetermined angle therebetween but by only one projection face, in order to maintain the shape of the projection image projected to the projection face to be a rectangle, the correction coefficient is set to be positive and gradually decreases, and the correction amount for a trapezoidal distortion is gradually increased.

In contrast to this, in the projector device 1 according to this embodiment, as described above, the correction coefficient is positive and gradually increases, and the correction amount for a trapezoidal distortion gradually decreases. Here, this increase may not be a gradual linear increase as illustrated in FIG. 19 but may be an exponential increase or a geometric increase as long as the increase is a continuous gradual increase therebetween.

In addition, as illustrated in FIG. 19, between the second boundary angle (−12°) that is the projection angle at the time of the projection direction 237 and the second boundary end angle (−4°) that is the projection angle at the time of the projection direction 238 and between the first boundary angle (42°) that is the projection angle of the projection direction 231 and the first boundary end angle (49°) that is the projection angle θ at the time of the projection direction 233, the correction coefficient is negative and gradually increases, and the correction amount for the trapezoidal distortion is gradually increased.

The correction coefficient of the conventional projector device 3100 described above therebetween is denoted by broken lines in FIG. 19. In the conventional projector device 3100, also after the second boundary angle (−12°) that is the projection angle at the time of the projection direction 237 or the first boundary angle (42°) that is the projection angle at the time of the projection direction 231, in a case where the projection medium is formed not by two projection faces having a predetermined angle therebetween but by only one projection face, in order to maintain the shape of the projection image projected to the projection face to be a rectangle, the correction coefficient is set to be negative and gradually decreases, and the correction amount for a trapezoidal distortion is gradually decreased.

In contrast to this, in the projector device 1 according to this embodiment, as described above, the correction coefficient is negative and is gradually increased, and the correction amount for a trapezoidal distortion is gradually increased. Here, this increase may not be a gradual linear increase as illustrated in FIG. 19 but may be an exponential increase or a geometric increase as long as the increase is a continuous gradual increase therebetween.

On the other hand, as illustrated in FIG. 19, between the second boundary end angle (−4°) that is the projection angle at the time of the projection direction 238 and the projection angle (0°) at the time of the projection direction 230 and between the first boundary end angle (49°) that is the projection angle of the projection direction 233 and the projection angle (90°) at the time of the projection direction 234, the correction coefficient is negative and gradually decreases, and a correction amount for a trapezoidal distortion is gradually decreased. Here, the correction coefficient or the correction amount therebetween is used for maintaining the shape of the projection image projected onto the projection face to be a rectangle.

Figure 20:
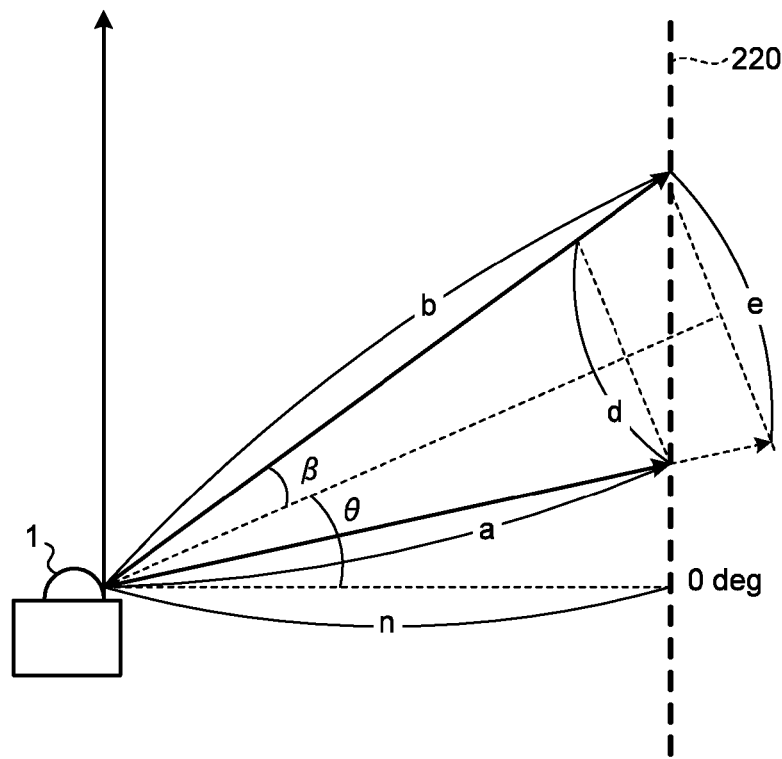
FIG. 20 is a diagram that illustrates the calculation of the correction coefficient according to the first embodiment.

Here, a technique for calculating the correction coefficient will be described. FIG. 20 is a diagram that illustrates the calculation of the correction coefficient. The correction coefficient is the reciprocal of a ratio between the upper side and the lower side of a projection image that is projected to the projection medium so as to be displayed thereon and is the same as d/e that is a ratio between lengths d and e in FIG. 20. Accordingly, in the trapezoidal distortion correction, the upper side or the lower side of the image data is reduced by d/e times.

Here, as illustrated in FIG. 20, when a ratio of a distance a from the projector device 1 to a lower side of the projection image that is projected to the projection medium so as to be displayed thereon to a distance b from the projector device 1 to an upper side of the projection image is represented as a/b, d/e is represented in the following Equation (10).

$$\frac{d}{e} = \frac{a}{b} \tag{10}$$

Then, in FIG. 20, when a value $\theta$ is the projection angle, a value $\beta$ is a half of the view angle $\alpha$, and a value n is a projection distance from the projector device 1 to the wall face in the horizontal direction, the following Equation (11) is formed.

$$n=b\,\cos(\theta+\beta)=a\,\cos(\theta-\beta) \tag{11}$$

By transforming Equation (11), Equation (12) is derived. Accordingly, based on Equation (12), the correction coefficient is determined based on the angle $\beta$ that is a half of the view angle $\alpha$ and the projection angle $\theta$.

$$\frac{a}{b} = \frac{\cos(\theta + \beta)}{\cos(\theta - \beta)} \tag{12}$$
$$= k(\theta, \beta)$$

Based on this Equation (12), in a case where the projection angle $\theta$ is 0°, in other words, in a case where the projection image is projected onto the wall face 220 in a horizontal direction, the correction coefficient is "1", and, in such a case, the trapezoidal distortion correction amount is zero.

In addition, based on Equation (12), the correction coefficient decreases as the projection angle $\theta$ increases, and the correction amount for a trapezoidal distortion increases according to the value of the correction coefficient. Accordingly, the trapezoidal distortion of the projection image that becomes remarkable according to an increase in the projection angle $\theta$ can be appropriately corrected.

Furthermore, in a case where the projection image is projected to the ceiling 221, the correction direction of the keystone correction changes, and accordingly, the correction coefficient is b/a. In addition, as described above, the sign of the correction coefficient is negative.

In the conventional technology, the correction coefficients for all the projection angles are calculated using Equation (12). The correction coefficient denoted by the dotted lines in FIG. 19 is based on this Equation (12). The calculation of the correction coefficient according to the conventional technology will be described in detail with reference to FIG. 33.

Figure 33:
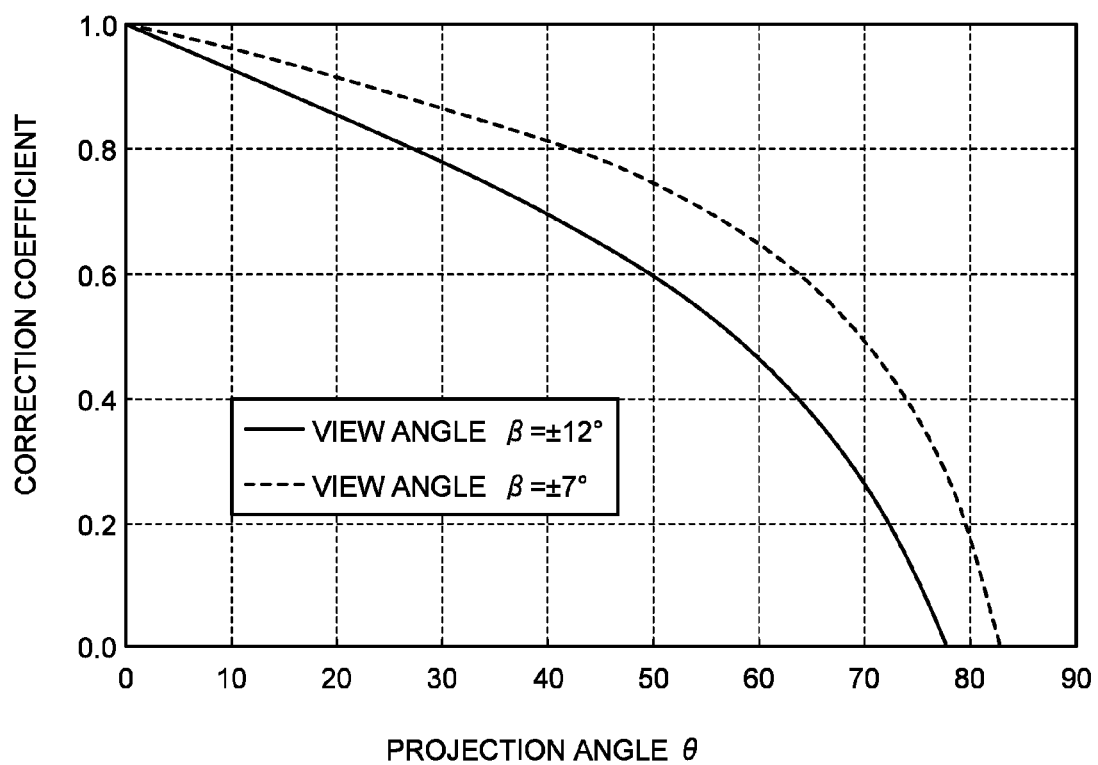
FIG. 33 is a graph that illustrates a relation among a projection angle, a view angle, and a correction coefficient according to a conventional technology.

FIG. 33 is a graph that illustrates a relation among the projection angle, the view angle, and the correction coefficient according to a conventional technology that is based on Equation (12). For example, in the case of a view angle of 14 degrees ($\beta=\pm7$ degrees), in the conventional projector device, a correction coefficient is acquired according to a curve of a view angle $\beta$ of $\pm7$ degrees illustrated in FIG. 33, and a keystone correction is performed for the image data.

In the projector device 1 according to this embodiment, the keystone adjustment unit 107 calculates a correction coefficient using Equation (12) in the range of a part of projection angles, and, in a range other than the part, Equation (12) is not used, and a correction coefficient is derived so as to be gradually increased or gradually decreased continuously in the range.

In this embodiment, the keystone adjustment unit 107 calculates the correction coefficient based on Equation (12) when the projection angle is between the projection angle (−45°) at the time of the projection direction 235 and the second boundary start angle (−19°) that is the projection angle at the time of the projection direction 236, between the projection angle (0°) at the time of the projection direction 230 and the first boundary start angle (35°) that is the projection angle at the time of the projection direction 232, between the second boundary end angle (−4°) that is the projection angle at the time of the projection direction 238 and the projection angle (0°) at the time of the projection direction 230, or between the first boundary end angle (49°) that is the projection angle of the projection direction 233 and the projection angle (90°) at the time of the projection direction 234, described above.

On the other hand, the keystone adjustment unit 107 derives the correction coefficient so as to gradually increase within the range without using Equation (12) when the projection angle is between the second boundary start angle (−19°) that is the projection angle at the time of the projection direction 236 and the second boundary angle (−12°) that is the projection angle at the time of the projection direction 237 or between the first boundary start angle (35°) that is the projection angle of the projection direction 232 and the first boundary angle (42°) that is the projection angle at the time of the projection direction 231. In such a case, the correction amount is gradually decreased.

In addition, the keystone adjustment unit 107 derives the correction coefficient so as to continuously gradually increase in the range without using Equation (12) also when the projection angle is between the second boundary angle (−12°) that is the projection angle at the time of the projection direction 237 and the second boundary end angle (−4°) that is the projection angle at the time of the projection direction 238 or between the first boundary angle (42°) that is the projection angle at the time of the projection direction 231 and the first boundary end angle (49°) that is the projection angle at the time of the projection direction 233. In such a case, the correction amount is gradually increased.

The keystone correction unit 108 multiplies the length $H_{act}$ of the line of the upper side of the image data by a correction coefficient $k(\theta, \beta)$ represented in Equation (12) and calculates the length $H_{act}(\theta)$ of the line of the upper side after the correction using the following Equation (13).

$$H_{act}(\theta)=k(\theta,\beta)\times H_{act} \tag{13}$$

Figure 21:
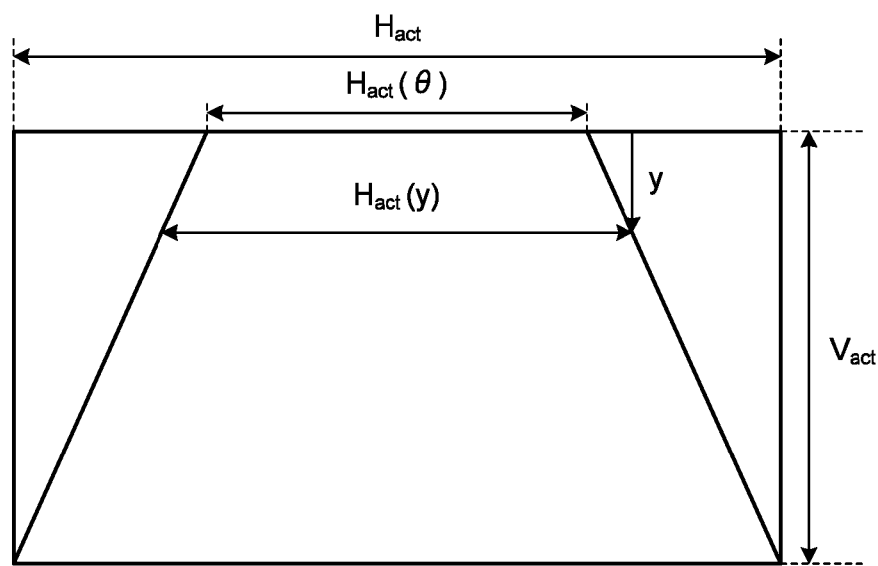
FIG. 21 is a diagram that illustrates the calculation of lengths of lines from the upper side to the lower side according to the first embodiment.

The keystone correction unit 108, in addition to the length of the upper side of the image data, calculates the length of each line in a range from the line of the upper side to the line of the lower side and performs a correction. FIG. 21 is a diagram that illustrates the calculation of lengths of lines from the upper side to the lower side.

As illustrated in FIG. 21, the keystone correction unit 108 calculates and corrects the length $H_{act}(y)$ of each line from the upper side to the lower side of the image data so as to be linear using the following Equation (14). Here, $V_{act}$ is the height of the image data, in other words, the number of lines, and Equation (14) is an equation for calculating the length $H_{act}(y)$ of the line at a position y from the upper side.

$$H_{act}(y) = \left\{1 - (1 - k(\theta, \beta)) \times \frac{V_{act} - y}{V_{act}}\right\} \times H_{act} \qquad (14)$$

Flow of Process for Projecting Image Data

Figure 22:
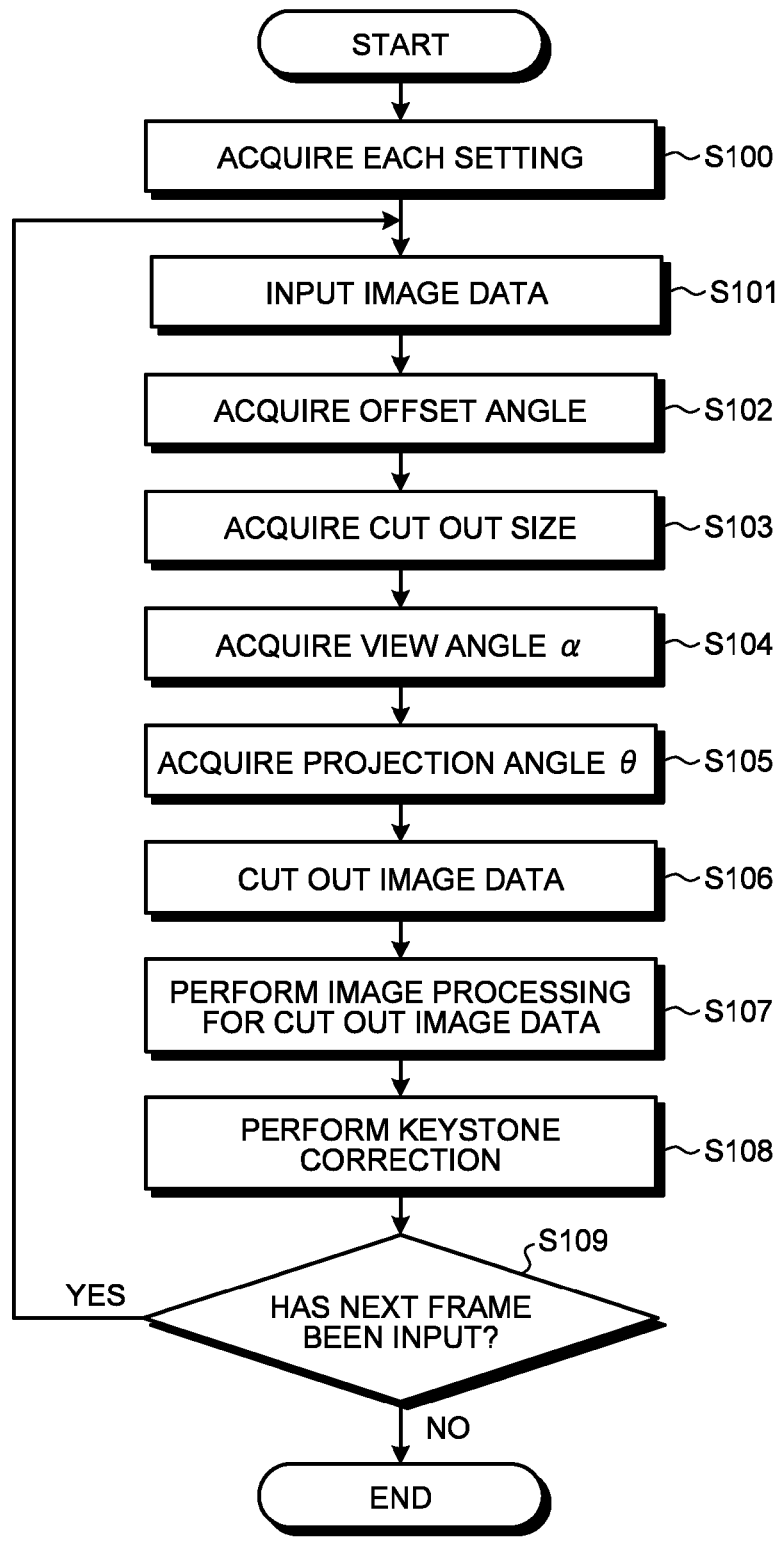
FIG. 22 is a flowchart that illustrates the sequence of an image projection process according to the first embodiment.

Next, the flow of the process performed when an image according to the image data is projected by the projector device 1 will be described. FIG. 22 is a flowchart that illustrates the sequence of an image projection process according to the first embodiment.

In step S100, in accordance with input of image data, various setting values relating to the projection of an image according to the image data are input to the projector device 1. The input various setting values, for example, are acquired by the input control unit 119 and the like. The various setting values acquired here, for example, include a value representing whether or not the image according to the image data is rotated, in other words, whether or not the horizontal direction and the vertical direction of the image are interchanged, an enlargement rate of the image, and an offset angle $\theta_{ofst}$ at the time of projection. The various setting values may be input to the projector device 1 as data in accordance with the input of the image data to the projector device 1 or may be input by operating the operation unit 14.

In next step S101, image data corresponding to one frame is input to the projector device 1, and the input image data is acquired by the image cut-out unit 100. The acquired image data is written into the memory 101.

In next step S102, the image control unit 103 acquires the offset angle $\theta_{ofst}$. In next step S103, the image control unit 103 acquires the cut out size, in other words, the size of the cut out area of the input image data. The image control unit 103 may acquire the size of the cut out area based on a setting value acquired from step S100 or may acquire the size of the cut out area in accordance with an operation for the operation unit 14. In next step S104, the image control unit 103 acquires the view angle α of the projection lens 12. The image control unit 103 acquires the view angle α of the projection lens 12, for example, from the view angle control unit 106. In addition, in next step S105, the image control unit 103 acquires the projection angle θ of the projection lens 12, for example, from the rotation control unit 104.

In the next step S106, the image control unit 103 acquires the cut out area for the input image data based on the offset angle $\theta_{ofst}$, the size of the cut out area, the view angle α, and the projection angle θ acquired in steps S102 to S105 by using Equations (3) to (8) described above. The image control unit 103 instructs the image cut-out unit 100 to read image data from the acquired cut out area. The image cut-out unit 100 reads image data within the cut out area from the image data stored in the memory 101 in accordance with the instruction from the image control unit 103. The image cut-out unit 100 supplies the image data of the cut out area read from the memory 101 to the image processing unit 102.

In step S107, the image processing unit 102, for example, performs a size converting process according to Equations (1) and (2) described above for the image data supplied from the image cut-out unit 100. Then, in step S108, a trapezoidal correction is performed for the image data for which the size converting process has been performed by the image processing unit 102. More specifically, as described above, the keystone adjustment unit 107 derives the correction coefficient in accordance with the projection angle, and the keystone correction unit 108 multiplies the length of the upper side or the lower side of the image data output from the image processing unit 102 by the derived correction coefficient, whereby the trapezoidal correction is performed.

The image data for which the trapezoidal correction has been performed by the keystone correction unit 108 is supplied to the display element 114. The display element 114 modulates light emitted from the light source 111 in accordance with the image data and emits modulated light. The emitted light is projected from the projection lens 12.

In next step S109, the image cut-out unit 100 determines whether or not an input of image data of a next frame after the image data input in step S101 described above is present. In a case where the input of the image data of the next frame is determined to be present, the image cut-out unit 100 returns the process to step S101 and performs the process of steps S101 to S108 described above for the image data of the next frame. In other words, the process of steps S101 to S108 is repeated in units of frames of the image data, for example, in accordance with a vertical synchronization signal VD of the image data. Accordingly, the projector device 1 can cause each process to follow a change in the projection angle θ in units of frames.

On the other hand, in step S109, in a case where the image data of the next frame is determined not to have been input, a control unit (not illustrated in the figure) controlling the overall operation of the device stops the image projection operation in the projector device 1. For example, the control unit (not illustrated in the figure) controls the light source 111 so as to be turned off and issues a command for returning the posture of the drum unit 10 to be in the housed state to the rotation mechanism unit 105. Then, after the posture of the drum unit 10 is returned to be in the housed state, the control unit (not illustrated in the figure) stops the fan cooling the light source 111 and the like.

Here, a specific trapezoidal correction operation will be described. It is assumed that the initial setting operation has been completed in advance, and the first boundary start angle, the first boundary angle, the first boundary end angle, the second boundary start angle, the second boundary angle, and the second boundary end angle are registered in the boundary storage unit 109.

When power is input to the projector device 1, the projection lens 12 is rotated, and a projection image is projected onto the floor face from the projection direction 235 (−45°), and the trapezoidal correction is performed. The projection angle passes through the second boundary start angle (−19°) that is the projection angle for the projection direction 236 at the time when the upper side of the projection image arrives at the boundary between the floor face 222 and the wall face 220 and the second boundary angle (−12°) that is the projection angle for the projection direction 237 of the boundary between the floor face 222 and the wall face 220 and arrives at the second boundary end angle (−4°) that is the projection angle for the projection direction 238 at the time when the lower side of the projection image arrives at the boundary between the floor face 222 and the wall face 220.

During the period, the keystone adjustment unit 107 and the keystone correction unit 108 gradually decrease the correction amount for a trapezoidal distortion from the second boundary start angle at which the projection angle θ corresponds to the projection direction 236, and the correction amount for a trapezoidal distortion is set to zero when the projection angle θ is the second boundary angle corresponding to the projection direction 237.

The keystone adjustment unit 107 and the keystone correction unit 108 set the correction coefficient to "−1" from when the projection angle θ exceeds the second boundary angle and gradually increase the correction amount for a trapezoidal distortion, and the projection angle arrives at the second boundary end angle corresponding to the projection direction 238. The keystone adjustment unit 107 and the keystone correction unit 108 decrease the correction amount for a trapezoidal distortion such that the projection image is maintained to be in a rectangular shape from when the projection angle θ is the second boundary end angle corresponding to the projection direction 238 to when the projection angle θ is a projection angle (0°) corresponding to the projection direction 230 and set the correction amount for a trapezoidal distortion to zero when the projection angle becomes the projection angle θ corresponding to the projection direction 230.

The keystone adjustment unit 107 and the keystone correction unit 108 increase the correction amount for a trapezoidal distortion from a time point when the projection angle θ exceeds a projection angle (0°) corresponding to the projection direction 230 such that the projection image is maintained to be in a rectangular shape, and the projection angle arrives at the first boundary start angle (35°) that is the projection angle θ corresponding to the projection direction 232 when the upper side of the projection image arrives at the boundary between the wall face 220 and the ceiling 221. The keystone adjustment unit 107 and the keystone correction unit 108 gradually decrease the correction amount for a trapezoidal distortion from when the projection angle θ is the first boundary start angle corresponding to the projection direction 232 and set the correction amount for a trapezoidal distortion to zero when the projection angle θ becomes the first boundary angle (42°) corresponding to the projection direction 231 toward the boundary between the wall face 220 and the ceiling 221.

The keystone adjustment unit 107 and the keystone correction unit 108 set the correction coefficient to "−1" from when the projection angle θ exceeds the first boundary angle and gradually increase the correction amount for a trapezoidal distortion, and the projection angle arrives at the first boundary end angle (49°) corresponding to the projection direction 233 at the time when the lower side of the projection image arrives at the boundary between the wall face 220 and the ceiling 221. The keystone adjustment unit 107 and the keystone correction unit 108 decrease the correction amount for a trapezoidal distortion such that the projection image is maintained to be in a rectangular shape from the first boundary end angle corresponding to the projection direction 233 to a projection angle (90°) corresponding to the projection direction 234 and set the correction amount for a trapezoidal distortion to zero at a projection angle (90°) corresponding to the projection direction 234.

Thereafter, the keystone adjustment unit 107 and the keystone correction unit 108 may perform the same correction until the projection angle becomes a projection angle of 225° exceeding the projection angle θ corresponding to the projection direction 234 or may additionally vertically reverse the projection image.

As above, according to this embodiment, the keystone adjustment unit 107 and the keystone correction unit 108 gradually decrease the correction amount for a trapezoidal distortion when the projection angle θ of the projection lens 12 is between the boundary start angle of the projection direction at which the upper side of the projection image approximately coincides with the boundary of two projection faces adjacent to each other and the boundary angle of the projection direction toward the boundary. Then, when the projection angle is between the boundary angle and the boundary end angle corresponding to the projection direction in which the lower side of the projection image approximately coincides with the above-described boundary, the correction amount for a trapezoidal distortion is gradually increased. Accordingly, the shape of the projection image that is projected is continuously changed, and also at the boundary between the two projection faces, the smooth and stable projection image that can be easily viewed can be displayed.

First Modified Example of First Embodiment

In the first embodiment, in a case where the projection direction of the projection lens 12 corresponds to the first boundary angle corresponding to the projection direction 231 toward the boundary between the wall face 220 and the ceiling 221 or the second boundary angle corresponding to the projection direction 237 toward the boundary between the floor face 222 and the wall face 220, the correction coefficient is set to "1" or "−1", whereby the trapezoidal distortion correction is canceled.

However, in a first modified example of the first embodiment, the trapezoidal distortion correction is configured to be canceled by setting the correction coefficient to "1" or "−1" in a case where the projection angle θ becomes an angle near the first boundary angle or an angle near the second boundary angle instead of at a time point when the projection angle θ becomes precisely the first boundary angle or the second boundary angle.

Figure 23:
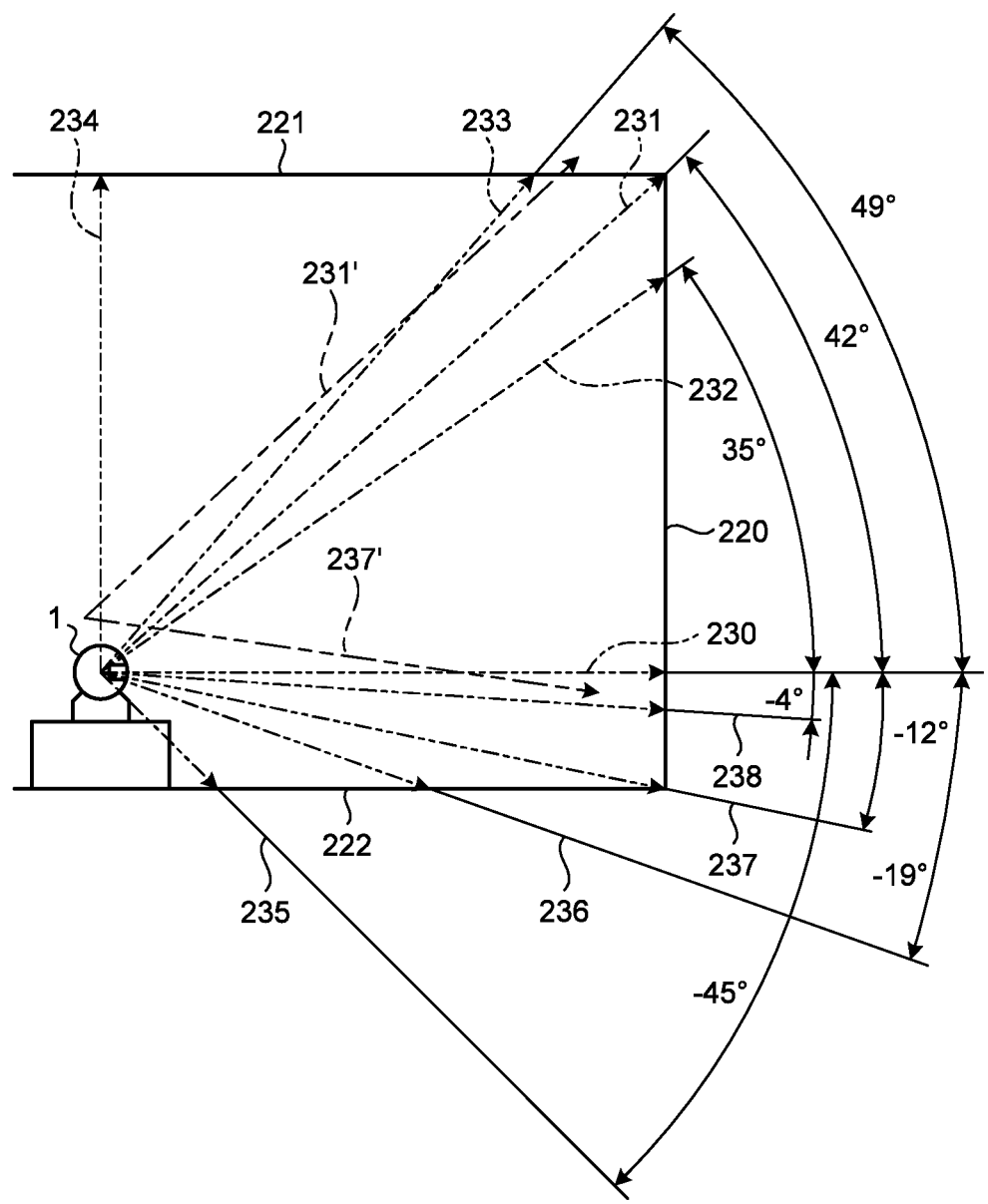
FIG. 23 is a diagram that illustrates major projection directions and projection angles of a projection face according to a first modified example relating to the first embodiment.
Figure 24:
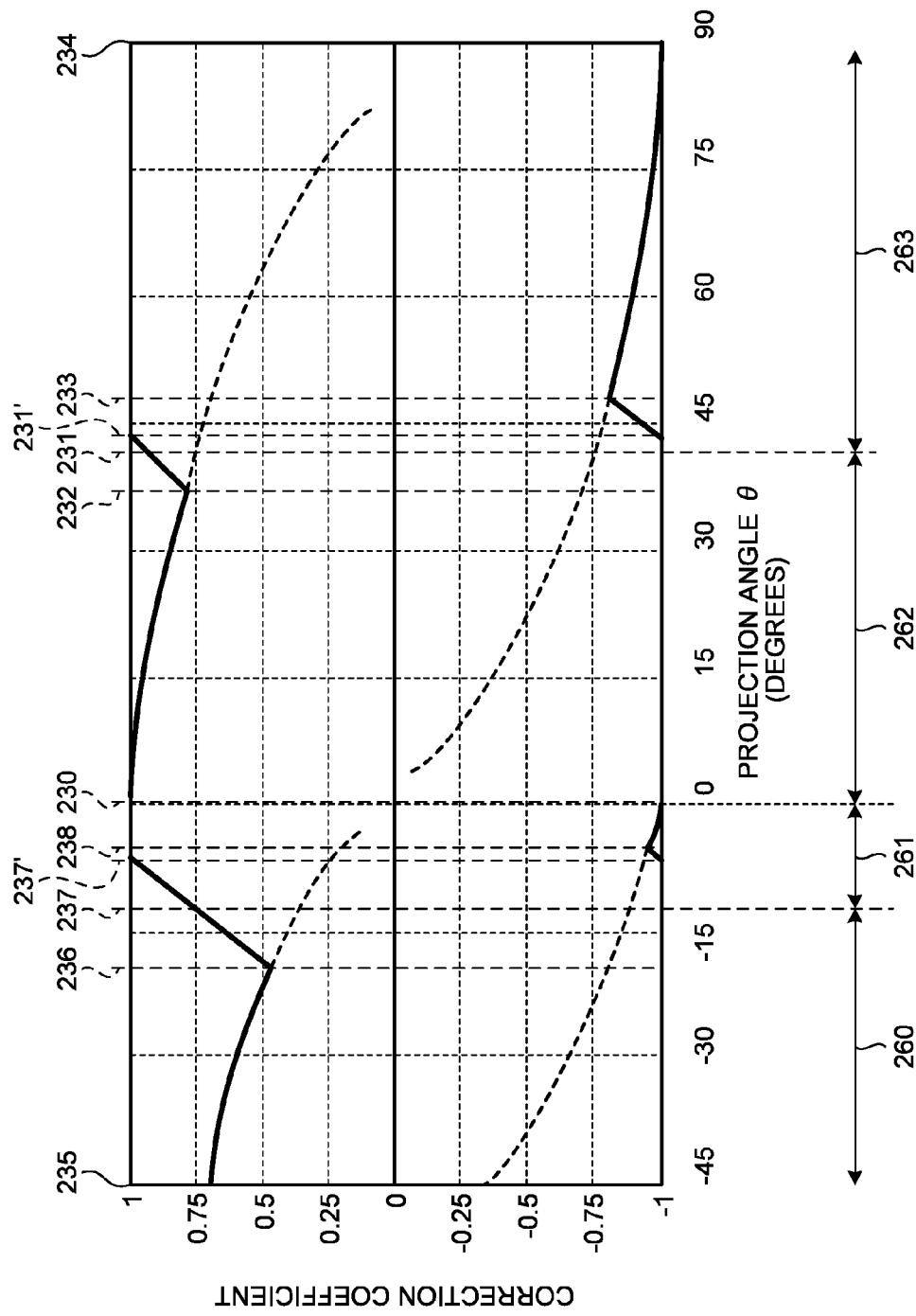
FIG. 24 is a graph that illustrates a relation between a projection angle and a correction coefficient according to the first modified example relating to the first embodiment.

FIG. 23 is a diagram that illustrates major projection directions and projection angles θ of a projection face according to the first modified example. FIG. 24 is a graph that illustrates a relation between a projection angle θ and a correction coefficient according to the first modified example. In this modified example, the keystone adjustment unit 107, as illustrated in FIGS. 23 and 24, the correction coefficient is set to "1" or "−1" at a projection angle θ corresponding to a projection direction 231' toward a position slightly deviated from the boundary between the wall face 220 and the ceiling 221 and a projection angle θ corresponding to a projection direction 237' toward a position slightly deviated from the boundary between the floor face 222 and the wall face 220.

In other words, the keystone adjustment unit 107, as illustrated in FIG. 24, in a range of the projection angle θ from the projection direction 236 to the projection direction 238 and a range from the projection direction 232 to the projection direction 233, is configured to gradually increase the correction coefficient in accordance with an increase in the projection angle θ. By setting the correction coefficient to "1" or "−1" at a position near the boundary that is not precisely located at the boundary, the same advantages as those of the first embodiment can be acquired.

Second Modified Example of First Embodiment

According to the first embodiment, in the initial setting operation, the first boundary start angle, the first boundary angle, the first boundary end angle, the second boundary start angle, the second boundary angle, and the second boundary end angle are designated by the user and are stored in the boundary storage unit 109 by the registration unit 118.

However, by allowing the user to designate some of all the angles, the other angles may be calculated using the view angle α of the projection image.

As such a second modified example, for example, in the initial setting operation, a first boundary start angle at a time when the upper side of the projection image approximately coincides with the boundary between the wall face 220 and the ceiling 221 and a second boundary start angle at a time when the upper side of the projection image approximately coincides with the boundary between the floor face 222 and the wall face 220 are designated by the user pressing keys of the operation unit 14, and the other projection angles θ are not designated by the user.

Accordingly, the registration unit 118 stores the first boundary start angle and the second boundary start angle in the boundary storage unit 109. In addition, since the view angle α is an angle that is formed by the upper side of the projection image, the projection lens 12, and the lower side of the projection image, the registration unit 118, by using the view angle α, can calculate the first boundary angle at which the boundary between the wall face 220 and the ceiling 221 is the projection direction 231 and the first boundary end angle corresponding to the projection direction 233 in which the lower side of the projection image approximately coincides with the boundary between the wall face 220 and the ceiling face 221 based on the first boundary start angle and store the calculated angles in the boundary storage unit 109. To the contrary, by allowing the user to designate the first boundary end angle, the registration unit 118 may be configured to calculate the first boundary start angle based on the first boundary end angle and the view angle α.

Similarly, the registration unit 118, by using the view angle α, can calculate the second boundary angle at which the boundary between the floor face 222 and the wall face 220 is the projection direction 237 and the second boundary end angle corresponding to the projection direction 238 in which the lower side of the projection image approximately coincides with the boundary between the floor face 222 and the wall face 220 based on the second boundary start angle and store the calculated angles in the boundary storage unit 109. To the contrary, by allowing the user to designate the second boundary end angle, the registration unit 118 may be configured to calculate the second boundary start angle based on the second boundary end angle and the view angle α.

In addition, in the initial setting operation, the user is allowed to designate two angles including the first boundary start angle and the first boundary end angle, and the two angles are registered in the boundary storage unit 109, and, the registration unit 118 may be configured to calculate the first boundary angle by using one of the angles and the view angle α and store the calculated first boundary angle in the boundary storage unit 109. The calculation of the second boundary angle may be similarly performed.

Alternatively, in the initial setting operation, only the first boundary angle is designated by the user and is registered in the boundary storage unit 109, and the registration unit 118 may be configured to calculate the first boundary start angle and the first boundary end angle based on the first boundary angle and the view angle α and store the calculated angles in the boundary storage unit 109. The calculation of the second boundary start angle and the second boundary end angle may be similarly performed.

According to this second modified example, the same advantages as those of the first embodiment are acquired. In addition, in the initial setting operation, all the projection angles θ of the first boundary start angle, the first boundary angle, the first boundary end angle, the second boundary start angle, the second boundary angle, and the second boundary end angle do not need to be registered by the user, whereby user convenience is improved.

In addition, similarly to the first modified example, in a case where the correction coefficient is adjusted to "1" or "−1" at a position slightly deviated from the boundary, it may be configured such that only the first boundary start angle is designated by the user, and the first boundary end angle is calculated by the registration unit 118 based on the first boundary start angle and the view angle α.

Second Embodiment

In the first embodiment and the modified examples thereof, while the drum unit 10 is rotated in the vertical direction, and the projection area is changed in the vertical direction in accordance with the projection angle θ according to the projection lens 12, the present invention is not limited thereto. In a second embodiment, the projection area according to the projection lens 12 can be changed in the horizontal direction.

Figure 25:
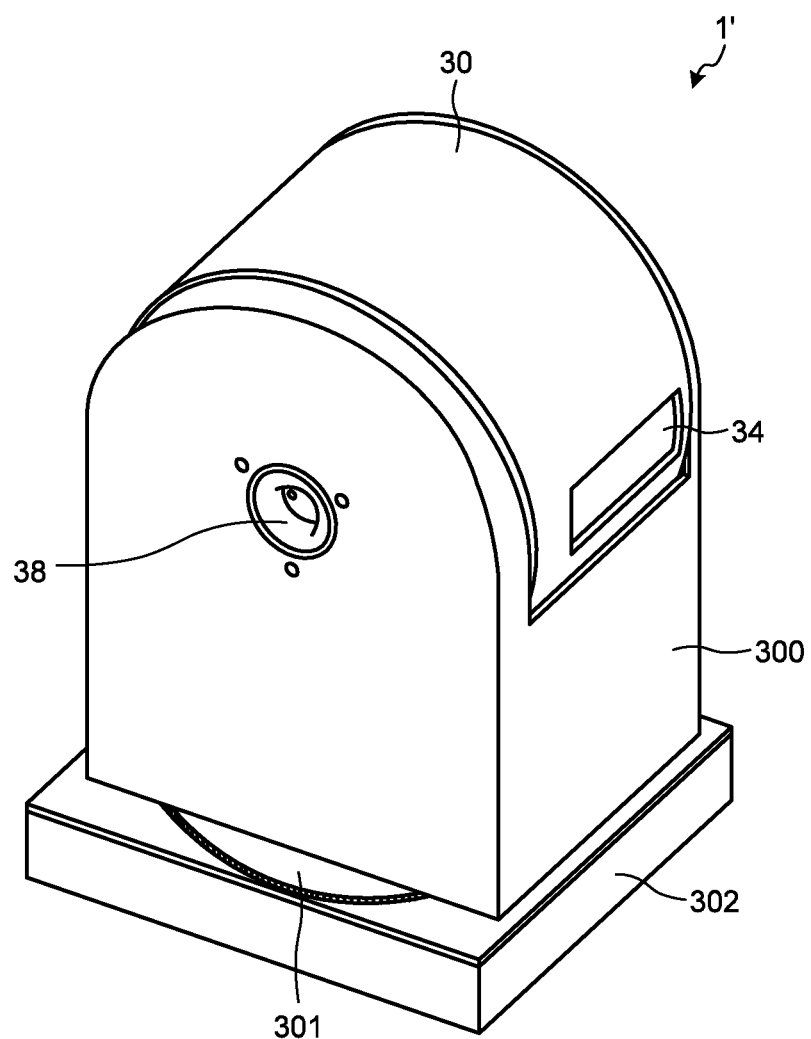
FIG. 25 is a diagram that illustrates an example of an external view of a projector device according to a second embodiment.

FIG. 25 is a diagram that illustrates an example of an external view of a projection device (projector device) 1' according to the second embodiment. FIG. 25 illustrates a state in which a cover and the like of the projection device 1' are removed. The same reference numeral is assigned to each portion common to FIGS. 1A and 1B and FIGS. 2A and 2B described above, and detailed description thereof will not be presented.

In the projector device 1', a horizontal rotation casing 300 is attached to a turntable 301. To the horizontal rotation casing 300, a drum 30 having a projection lens 12 on the inside thereof is attached to be rotatable around a shaft unit 38 as its center in the vertical direction. In accordance with the rotation of the turntable 301, the horizontal rotation casing 300 is rotated in the horizontal direction, and, in accordance therewith, a projection direction according to the projection lens 12 is changed in the horizontal direction.

Figure 26:
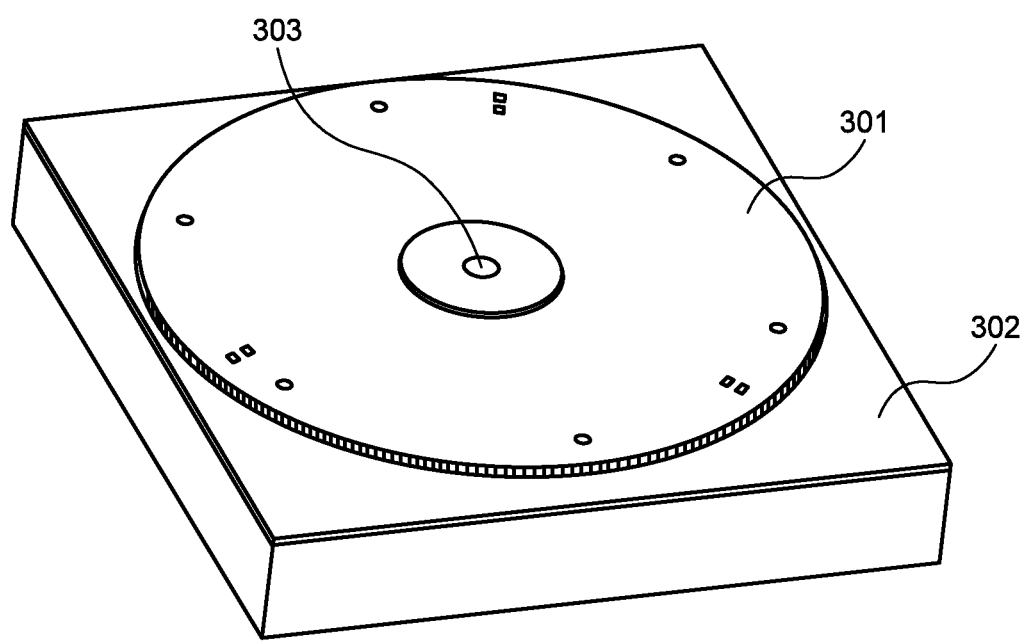
FIG. 26 illustrates an example of the external view of a base according to the second embodiment.

FIG. 26 illustrates an example of the external view of a base 302. The base 302 includes the turntable 301. A gear 304 is attached to the rear side of the turntable 301. The turntable 301 is configured to be rotated around a shaft 303 as its center in the horizontal direction in accordance with rotation that is transferred from a drive unit to be described later through the gear 304. In addition, inside the base 302, various substrates of a circuit unit, a power supply unit, and the like are disposed. Furthermore, on one of side faces of the base 302, an operation unit (not illustrated in the figure) is disposed. The side face of the base 302 on which the operation unit is disposed will be referred to as a first face.

Figure 27:
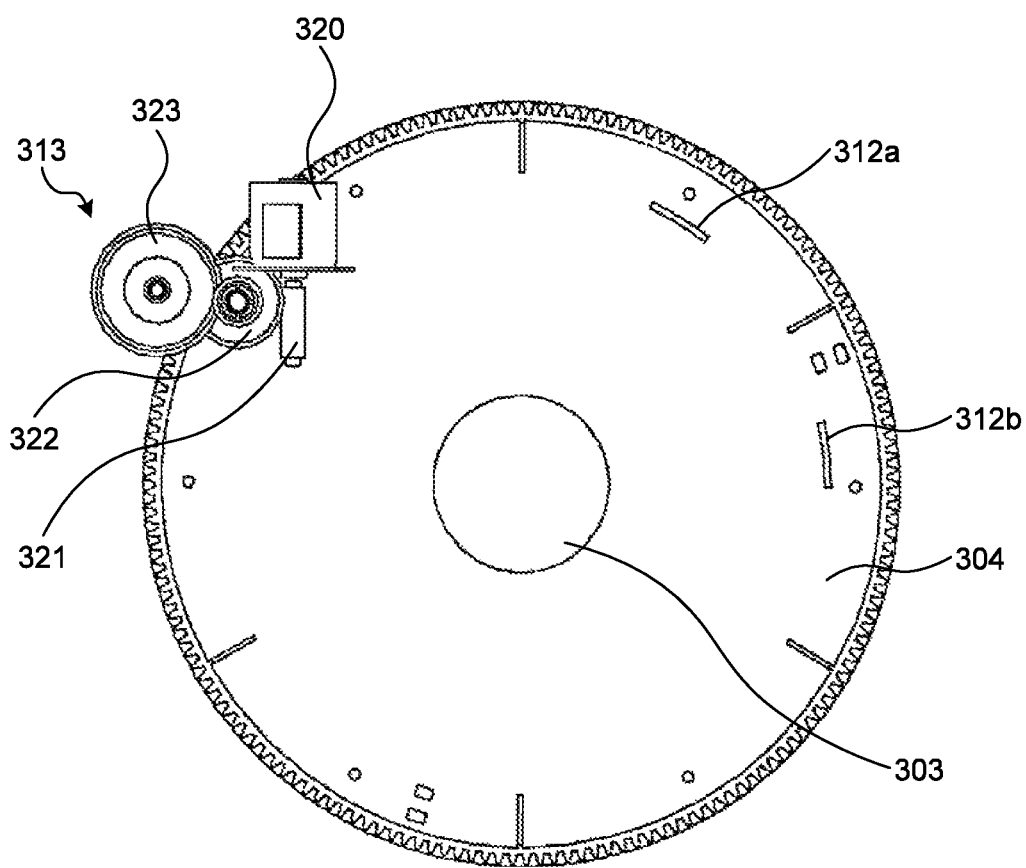
FIG. 27 is a diagram that illustrates a turntable according to the second embodiment seen from the rear face side.

FIG. 27 is a diagram that illustrates the turntable 301 seen from the rear face side. A drive unit 313 transfers rotation to the gear 304, thereby rotating the turntable 301. More specifically, the drive unit 313 includes a motor 320 that is, for example, a stepping motor and a gear group including a worm gear 321 that is directly driven by the rotation shaft of the motor 320, a gear 322 that transfers rotation according to the worm gear 321, and a gear 323 that transfers the rotation transferred from the gear 322 to the gear 304 of the turntable 301. By transferring the rotation of the motor 320 to the gear 304 using the gear group, the turntable 301 can be rotated in accordance with the rotation of the motor 320. The rotation speed of the turntable 301 is determined based on the rotation speed of the motor 320 and the gear ratio of the gear group.

In the turntable 301, protrusions 312a and 312b are disposed. By detecting the protrusions 312a and 312b using a photo interrupter not illustrated in the figure or the like, the direction of the turntable 301 with respect to a reference direction can be acquired.

In this second embodiment, for the convenience of description and easy understanding, it is assumed that the drum 30 is not rotated in the vertical direction, and the projection lens 12 is rotated in the horizontal direction in accordance with the rotation of the turntable 301. In a case where the projection direction of the projection lens 12 faces toward the vertical direction with respect to the side face (first face) having the operation unit of the base 302, the projection angle according to the projection lens 12 in the horizontal direction is 0°, and the posture having a projection angle of 0° forms the initial state. The projection angle according to the projection lens 12 increases in the counterclockwise direction when seen from the upper face side of the turntable 301. In addition, in this second embodiment, the projection angle of the projection lens 12 in the horizontal direction will be denoted by a projection angle $\theta_H$ so as to be discriminated from the projection angle θ used in the first embodiment.

The functional configuration of the projector device 1' and the configuration of an optical system including the projection lens 12 are common to the circuit unit and the optical engine unit 110 illustrated in FIG. 4 described above, and thus, description thereof will not be presented. Here, in the second embodiment, the rotation mechanism unit 105 illustrated in FIG. 4 includes the drive unit 313, the protrusion 312a and 312b described with reference to FIG. 27 and the photo interrupter not illustrated in the figure. The output of the photo interrupter is supplied to the rotation control unit 104 illustrated in FIG. 4. In addition, the motor 320 of the drive unit 313 is driven in accordance with the drive pulse 122 supplied from the rotation control unit 104 illustrated in FIG. 4. Furthermore, the rotation control unit 104 counts the drive pulses 122, thereby deriving the projection angle θ of the projection lens 12 in the horizontal direction.

The operation of the projector device 1' according to the second embodiment will be schematically described with reference to the configuration illustrated in FIG. 4. Hereinafter, the drum 30 will be described not to rotate in the vertical direction.

Figure 28A:
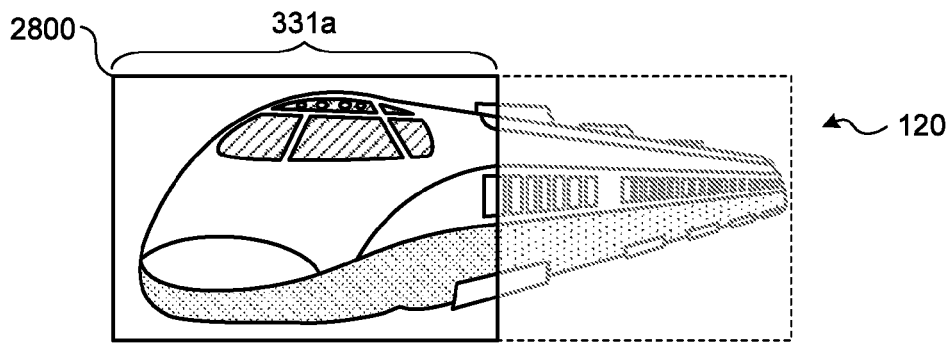
FIG. 28A is a diagram that illustrates an example of a relation between input image data and projection image data acquired by cutting out the input image data according to the second embodiment.
Figure 28B:
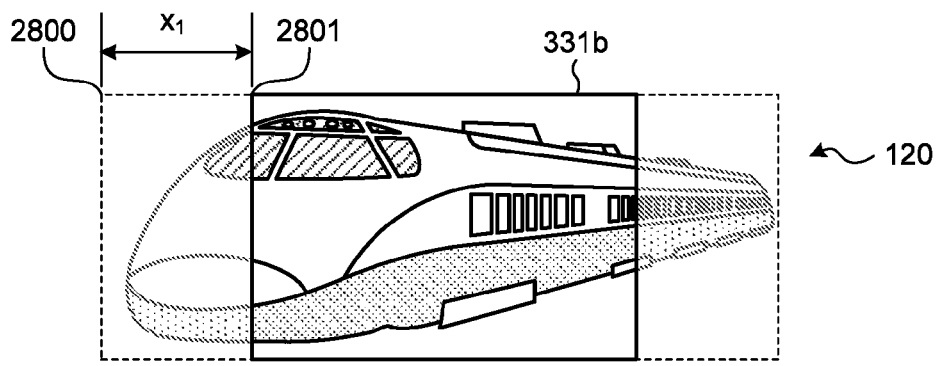
FIG. 28B is a diagram that illustrates an example of a relation between input image data and projection image data acquired by cutting out the input image data according to the second embodiment.
Figure 28C:
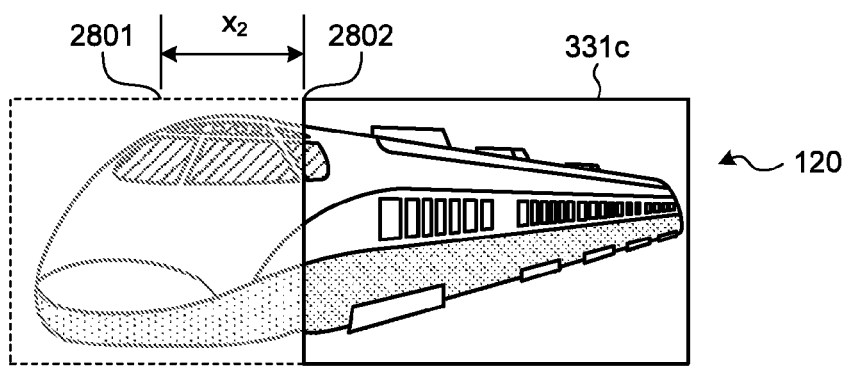
FIG. 28C is a diagram that illustrates an example of a relation between input image data and projection image data acquired by cutting out the input image data according to the second embodiment.

For example, image data shaped into a predetermined image size is input to the projector device 1' as the input image data 120. Here, it is assumed that the image size of the input image data 120 has a width larger than the width of the display element 114. This input image data 120 is stored in a memory 101 through an image cut-out unit 100. FIGS. 28A, 28B, and 28C schematically illustrate an example of a relation according to the second embodiment between the input image data 120 stored in the memory 101 and projection image data 331a, 331b, and 331c acquired by cutting out the input image data 120 using the image cut-out unit 100 in accordance with designation performed by the image control unit 103.

At a projection angle of 0°, the image control unit 103 designates a cut out area of the input image data 120 stored in the memory 101 for the image cut-out unit 100 based on information of the projection angle θ acquired from the rotation control unit 104. For example, at the projection angle of 0°, the image control unit 103 designates the image area 331a having a width corresponding to the effective display area of the display element 114 from a position 2800 located at a left end of the input image data 120 as the cut out area for the image cut-out unit 100.

The image cut-out unit 100 cuts out the image area 331a designated as the cut out area from the input image data 120 stored in the memory 101 and outputs the image area 331a as image data. This image data is supplied to a drive circuit that drives the display element 114 through an image processing unit 102. The drive circuit drives the display element 114 based on the supplied image data. Accordingly, a projection image of the image area 331a is projected to a projection medium such as a wall or a screen.

For example, when being instructed to change the projection angle θ through a user operation for the operation unit, the rotation control unit 104 receives this change instruction through an input control unit 119 as a command of a change instruction, generates a drive pulse 122 used for driving the motor 320 in accordance with the command of a change instruction, and supplies the generated drive pulse to the rotation mechanism unit 105. In the rotation mechanism unit 105, the motor 320 is driven in accordance with the supplied drive pulse 122, and the turntable 301 is rotated by an angle corresponding to the drive pulse 122.

The drive pulse 122 is supplied from the rotation control unit 104 to the image control unit 103 as well. The image control unit 103 designates a cut out area for the input image data 120 stored in the memory 101 in accordance with the drive pulse 122. Here, in response to a change in the projection angle $\theta_H$ according to the drive pulse, the image control unit 103 designates an image area 331b having a position 2801 acquired by moving the image area 331a by an $x_1$ pixel in the horizontal direction as the left end as the cut out area.

The image cut-out unit 100 cuts out the image area 331b from the input image data 120 stored in the memory 101 and outputs the image area 331b as the image data. This image data is supplied to the drive circuit of the display element 114 through the image processing unit 102, whereby the display element 114 is driven. In this way, for the projection medium, the projection image of the image area 331b is projected to a position acquired by moving the projection image of the image area 331a by a change in the projection angle $\theta_H$.

When being instructed to further change the projection angle θ, similarly, the turntable 301 is rotated by an angle corresponding to the drive pulse 122 under the control of the rotation control unit 104, and the projection angle $\theta_H$ is changed. In addition, in response to a change in the projection angle $\theta_H$, for example, the image area 331c having a position 2802 acquired by further moving the image area 331b by $x_2$ pixels in the horizontal direction as the left end is designated as the cut out area by the image control unit 103. A projection image that is based on the image data of this image area 331c is projected to the projection medium.

As above, according to the projector device 1' of the second embodiment, all the input image data 120 having a width larger than the display element 114 can be projected while a predetermined area within the input image data 120 is moved in the horizontal direction.

Figure 29:
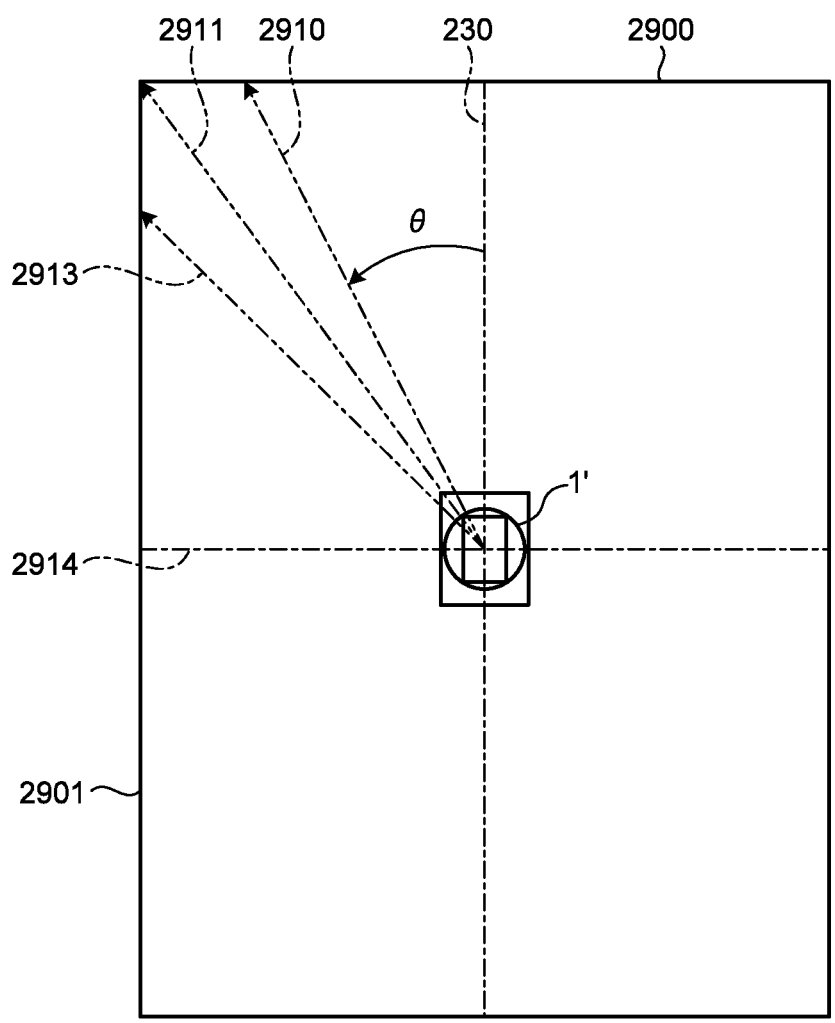
FIG. 29 is a diagram that illustrates the projector device and major projection directions of a projection lens according to the second embodiment in a case where two wall faces are used as the projection faces.

Next, a keystone correction performed by the projector device 1' according to this embodiment will be described. FIG. 29 is a diagram that illustrates the projector device 1' and major projection directions of the projection lens 12 according to the second embodiment in a case where wall faces 2900 and 2901 are used as the projection faces.

Here, a projection direction 230 represents a direction of a case where an angle formed by the optical axis of the projection lens 12 of the projector device 1' and the wall face 2900 is a right angle, and the projection angle $\theta_H$ at this time is defined as 0°. As illustrated in FIG. 29, the projection angle θ of the projection lens 12 of the projector device 1' increases to be positive in the counterclockwise direction in FIG. 29.

A projection direction 2911 is the direction of the boundary between the wall face 2900 and the wall face 2901 that are projection faces lined up to have a predetermined angle therebetween. In the example illustrated in FIG. 29, the predetermined angle is 90°. A projection direction 2910 is a projection direction of the projection lens 12 in a case where, in a rectangular projection image that is projected to the wall face 2900 so as to be displayed thereon, a left side, which corresponds to the first side, of one pair of sides disposed in a direction perpendicular to the horizontal direction that is the movement direction of the projection image almost coincides with the boundary between the wall face 2900 and the wall face 2901.

A projection direction 2913 is a projection direction of the projection lens 12 in a case where a right side, which corresponds to the second side, of the one pair of sides of the projection image of the wall face 2901 almost coincides with the boundary between the wall face 2900 and the wall face 2901. A projection direction 2914 is the direction of the wall face 2901 of the projector device 1' that horizontally faces toward the left side, and the optical axis of the projection lens 12 and the wall face 2901 are in the state of crossing each other at the right angle at this time. The projection angle $\theta_H$ at this time is 90°.

A boundary storage unit 109 illustrated in FIG. 4 stores the projection angle at the time of the projection direction 2910 as a boundary start angle, stores the projection angle at the time of a projection direction 2911 as a boundary angle, and stores the projection angle at the time of the projection direction 2913 as a boundary end angle.

In this embodiment, similarly to the first embodiment, before the projection of an image relating to a desired content is performed by starting the projector device 1', a user performs an initial setting operation. In this initial setting operation, the user, in a state in which a desired zoom magnification at the time of projecting the image relating to the desired content is set, rotates the projection direction of the projection lens 12 from the state of the projection direction 230 for the wall face 2900 toward the wall face 2901 while projecting an image relating to arbitrary image data.

Then, each time point when the projection direction arrives at the projection direction 2910 in which the left side, which corresponds to the first side, of the one pair of sides disposed in the direction perpendicular to the horizontal direction that is the movement direction of the projection image almost coincides with the boundary between the wall face 2900 and the wall face 2901, the projection direction 2913 in which the right side, which corresponds to the second side, of the one pair of sides of the projection image almost coincides with the boundary between the wall face 2900 and the wall face 2901, and the projection direction 2911 in which the optical axis almost coincides with the boundary, when the registration unit 118 receives an event of key pressing according to pressing of a predetermined key using the operation unit 14 or the like, the projection angles $\theta_H$ at the time points of pressing the key are registered in the boundary storage unit 109 as the boundary start angle, the boundary angle, and the boundary end angle.

A keystone adjustment unit 107 according to this embodiment, similarly to the first embodiment, sequentially receives current projection angles $\theta_H$ from the rotation control unit 104. Then, the keystone adjustment unit 107, based on the information that is stored in the boundary storage unit 109, adjusts a correction amount for a trapezoidal distortion for each of an angle range of the received projection angle $\theta_H$ of up to the boundary start angle, an angle range from the boundary start angle to the boundary angle, an angle range from the boundary angle to the boundary end angle, and an angle range after the boundary end angle.

A correction coefficient according to this second embodiment is derived based on the reciprocal of the ratio between the length of the left side and the length of the right side of the projection image that is projected so as to be displayed in a case where a trapezoidal correction is not performed.

The keystone adjustment unit 107 of the projector device 1' according to this second embodiment, for example, until the projection angle $\theta_H$ arrives at the boundary start angle from 0°, maintains the shape of the projection image that is projected to the wall face 2900 so as to be displayed thereon in an approximate rectangle and accordingly, an adjustment for increasing the correction amount for the trapezoidal distortion is performed based on the correction coefficient derived in accordance with the projection angle $\theta_H$.

Next, the keystone adjustment unit 107 of the projector device 1', as the projection angle $\theta_H$ changes from the boundary start angle to the boundary angle, performs an adjustment for decreasing the correction amount for the trapezoidal distortion based on the correction coefficient derived in accordance with the projection angle $\theta_H$. In addition, the keystone adjustment unit 107, as the projection angle $\theta_H$ changes from the boundary angle to the boundary end angle, performs an adjustment for increasing the correction amount for the trapezoidal distortion based on the correction coefficient derived in accordance with the projection angle $\theta_H$. In this way, in an angle range of the projection angle $\theta_H$ from the boundary start angle to the boundary end angle, the continuity of the shape of the projection image that is projected to the wall face so as to be displayed thereon is maintained.

Then, the keystone adjustment unit 107 of the projector device 1', as the projection angle $\theta_H$ increases to be larger than the boundary end angle, in order to maintain the shape of the projection image that is projected to the wall face so as to be displayed thereon in an approximate rectangle again, performs an adjustment for decreasing the correction amount for the trapezoidal distortion based on the correction coefficient derived in accordance with the projection angle $\theta_H$.

Here, the keystone adjustment unit 107, similarly to the first embodiment, determines the projection direction based on the projection angle $\theta_H$ and determines a correction direction of a trapezoidal correction performed for the trapezoidal distortion based on the determination of the projection direction. Here, the correction direction represents which one of the left side and the right side of the image data is to be compressed. Then, the keystone adjustment unit 107 derives each projection angle $\theta_H$ described above or a correction coefficient for the angle range thereof based on the correction direction.

The keystone correction unit 108 according to this embodiment corrects the lengths of the left side and the right side of the image data corresponding to the left side and the right side of the projection image based on the correction coefficient, thereby performing a trapezoidal correction for correcting a trapezoidal distortion of the projection image.

FIGS. 30A, 30B, and 30C are diagrams that illustrate a trapezoidal correction in a case where image data is projected onto the projection faces that are the wall faces 2900 and 2901 illustrated in FIG. 29.

FIG. 30A illustrates the shapes of a projection image of a case where a trapezoidal correction is not performed. In FIG. 30A, a shape 3000 is the shape of the projection image for the projection direction 230, a shape 3001 is the shape of the projection image for the projection direction 2910, a shape 3002 is the shape of the projection image for the projection direction 2911, a shape 3003 is the shape of the projection image for the projection direction 2913, and a shape 3004 is the shape of the projection image for the projection direction 2914. Also in a case where the projection image is projected by rotating the projection lens in the horizontal direction, when the trapezoidal correction is not performed, as illustrated in the shapes 3001 and 3003, a trapezoidal distortion occurs in the projection image.

FIG. 30B illustrates an example of the shapes of an image relating to the image data after the trapezoidal correction. In FIG. 30B, shapes 3010, 3011, 3012, 3013, and 3014 illustrate the shapes of the image relating to the image data that is a projection target for the projection directions 230, 2910, 2911, 2913, and 2914 illustrated in FIG. 29.

FIG. 30C illustrates an example of the shapes of projection images that are projected to the projection medium so as to be displayed thereon based the image data after the trapezoidal distortion correction is performed by the keystone correction unit 108. In FIG. 30C, shapes 3020, 3021, 3022, 3023, and 3024 illustrate the shapes of the projection image that is projected to the projection face so as to be displayed thereon in the projection directions 230, 2910, 2911, 2913, and 2914 illustrated in FIG. 29.

In the case of the projection direction 230, which is in the initial state, of a projection angle of 0°, as the shape 3010 of an image relating to image data, a rectangular shape for which the correction coefficient is "1", in other words, a correction amount for a trapezoidal distortion is zero is formed. Then, on the projection face, the projection image of the shape 3020 that is a rectangle is displayed.

Thereafter, as the projection angle $\theta_H$ is increased, in order to maintain the projection image displayed on the projection face to be in a rectangle, the keystone adjustment unit 107 increases the correction amount for a trapezoidal distortion by gradually decreasing the correction coefficient from "1". In other words, as the projection angle $\theta_H$ is increased, the trapezoidal shape of the image relating to the image data is changed such that the length of the left side is further shorter than the length of the right side.

Then, in a case where the projection angle is in the projection direction 2910 corresponding to the boundary start angle at which the left side of the projection image almost coincides with the boundary between the wall face 2900 and the wall face 2901, the shape 3011 of the image relating to the image data is formed. This shape 3011 has a trapezoidal shape for which the correction amount is largest in an angle range until the projection angle $\theta_H$ arrives at the boundary start angle from the initial state, in other words, a trapezoidal shape in which a difference between the length of the left side and the length of the right side is largest in the range.

Thereafter, the keystone adjustment unit 107 performs an adjustment for decreasing a correction amount for a trapezoidal distortion, compared to the case of the shape 3011, by causing the correction coefficient to gradually approach "1", and a trapezoidal correction is performed by the keystone correction unit 108. In other words, the keystone correction unit 108 gradually cancels the trapezoidal correction for the image data by decreasing the correction amount by using the keystone adjustment unit 107 for a trapezoidal correction in the case of the boundary start angle.

Then, in a case where the projection angle $\theta_H$ is the boundary angle corresponding to the projection direction 2911, in other words, the direction of the boundary between the wall face 2900 and the wall face 2901, the keystone adjustment unit 107 sets the correction amount for a trapezoidal distortion to zero by setting the correction coefficient to "1" ("−1"), in other words, completely cancels the trapezoidal correction for the image data and projects the shape 3012 of an image relating to the image data having a rectangular shape again. Accordingly, similarly to the first embodiment described above, while the projection image 3022, as illustrated in FIG. 30C, that is the projection image projected onto the projection medium so as to be displayed thereon is not in the shape of a rectangle, the shape can be continuously changed.

Thereafter, as the projection angle $\theta_H$ passes through the boundary angle and is increased, the keystone adjustment unit 107 gradually increases the correction amount for a trapezoidal distortion by gradually increasing the correction coefficient from "−1". In other words, in a trapezoidal shape of an image relating to the image data, as the projection angle $\theta_H$ increases, the length of the left side changes to be longer than the length of the right side. In addition, at this time, since the correction coefficient is gradually increased from "−1", the keystone correction unit 108 performs a trapezoidal correction that is opposite to the trapezoidal correction used for a projection image to be projected to the wall face.

Then, in a case where the projection angle $\theta_H$ is in the projection direction 2913 corresponding to the boundary end angle at which the right side (a side disposed farther from the projector device 1') of the projection image almost coincides with the boundary between the wall face 2900 and the wall face 2901, the shape 3013 of the image relating to the image data is formed. This shape 3013 is a trapezoidal shape for which the correction amount is largest in an angle range until the projection angle $\theta_H$ arrives at 90° from the boundary end angle, in other words, a trapezoidal shape in which a difference between the length of the left side and the length of the right side is largest in the range.

In the way described above, in the angle range in which the projection angle $\theta_H$ is larger than the boundary start angle and is smaller than the boundary end angle, the shape of the projection image that is projected to the projection medium so as to be displayed thereon can be continuously changed.

Then, in a case where the projection angle $\theta_H$ becomes 90° corresponding to the projection direction 2914, in other words, a horizontal direction of the projector device 1' of the wall face 2901, a rectangular shape for which the correction coefficient is "1", in other words, the correction amount for a trapezoidal distortion is zero is formed as the shape 3014 of the image relating to the image data. Then, on the projection face, a projection image having the shape 3024 of the rectangle is displayed.

In addition, the drum unit including the projection lens 12 may be rotated toward the left side, and, as the correction operation, a correction opposite to the correction of the projection direction 230 to the projection direction 234 may be performed.

As above, according to this second embodiment, the drum 30 including the projection lens 12 projects an image while rotating in the horizontal direction, and, at this time, the keystone adjustment unit 107 and the keystone correction unit 108 gradually decrease the correction amount for a trapezoidal distortion when the projection angle $\theta_H$ of the projection lens 12 is between the boundary start angle of the projection direction at which the left side of the projection image approximately coincides with the boundary of the wall face 2900 and the wall face 2901 and the boundary angle of the projection direction toward the boundary and gradually increase the correction amount for a trapezoidal distortion when the projection angle is between the boundary angle and the boundary end angle of the projection direction at which the right side of the projection image approximately coincides with the above-described boundary. Accordingly, also on the boundary between the two projection faces (the wall face 2900 and the wall face 2901), the smooth and stable projection image that can be easily viewed can be displayed.

In addition, the deriving of the correction amount using the keystone adjustment unit 107 is performed using a technique that is the same as that of the case of the first embodiment described above.

Modified Example of Second Embodiment

Also in the second embodiment, similarly to the first modified example of the first embodiment, the keystone adjustment unit 107 may be configured such that the trapezoidal distortion correction is canceled by setting the correction coefficient to "1" or "−1" in a case where the projection angle $\theta_H$ becomes an angle near the boundary angle instead of at a time point when the projection angle $\theta_H$ becomes precisely the boundary angle.

In addition, also in the second embodiment, similarly to the second modified example of the first embodiment, in the initial setting operation, the registration unit 118 may be configured such that some of the boundary start angle, the boundary angle, and the boundary end angle are designated by the user, and the other angles are calculated based on the designated angles and the view angle α of the projection image.

For example, in the initial setting operation, the registration unit 118 may be configured such that the boundary start angle at a time when the left side of the projection image approximately coincides with the boundary between the wall face 2900 and the wall face 2901 is designated by the user pressing keys of the operation unit 14, and the boundary angle having the boundary between the wall face 2900 and the wall face 2901 as the projection direction 2911 and the boundary end angle corresponding to the projection direction 2913 at which the right side of the projection image approximately coincides with the boundary between the wall face 2900 and the wall face 2901 are calculated from the boundary start angle by using the view angle α. To the contrary, the registration unit 118 may be configured such that the boundary end angle is designated by the user, and the boundary start angle is calculated based on the boundary end angle and the view angle α.

In addition, in the initial setting operation, the registration unit 118 may be configured such that two angles including the boundary start angle and the boundary end angle are designated by the user, and the boundary angle is calculated by using one of the designated angles and the view angle α. Alternatively, in the initial setting operation, the registration unit 118 may be configured such that only the boundary angle is designated by the user, and the boundary start angle and the boundary end angle are calculated by using the boundary angle and the view angle α.

According to the modified example of the second embodiment, the same advantages as those of the second embodiment are acquired, and, in the initial setting operation, all the projection angles $\theta_H$ of the boundary start angle, the boundary angle, and the boundary end angle do not need to be registered by the user, whereby user convenience is improved.

Each of the projector devices 1 and 1' according to the first and second embodiments and the modified examples thereof has a configuration that includes hardware such as a control device such as a central processing unit (CPU), storage devices such as a read only memory (ROM) and a random access memory (RAM), an HDD, and an operation unit 14.

In addition, the rotation control unit 104, the view angle control unit 106, the image control unit 103, the image processing unit 102, the image cut-out unit 100, the keystone correction unit 108, the keystone adjustment unit 107, and the registration unit 118 mounted as circuit units of the projector devices 1 and 1' of the first and second embodiments and the modified examples thereof may be configured to be realized by software instead of being configured by hardware.

In a case where the projector device is realized by the software, an image projection program (including an image correction program) executed by the projector devices 1 and 1' according to the first and second embodiments and the modified examples thereof is built in a ROM or the like in advance and is provided as a computer program product.

The image projection program executed by the projector devices 1 and 1' according to the first and second embodiments and the modified examples thereof may be configured to be recorded on a computer-readable recording medium such as a compact disk (CD), a flexible disk (FD), or a digital versatile disk (DVD) so as to be provided as a file having an installable form or an executable form.

In addition, the image projection program executed by the projector devices 1 and 1' according to the first and second embodiments and the modified examples thereof may be configured to be stored in a computer connected to a network such as the Internet and be provided by being downloaded through the network. In addition, the image projection program executed by the projector devices 1 and 1' according to the first and second embodiments and the modified examples thereof may be configured to be provided or distributed through a network such as the Internet.

The image projection program executed by the projector devices 1 and 1' according to the first and second embodiments and the modified examples thereof has a module configuration including the above-described units (the rotation control unit 104, the view angle control unit 106, the image control unit 103, the image processing unit 102, the image cut-out unit 100, the keystone correction unit 108, the keystone adjustment unit 107, the registration unit 118, and the input control unit 119). As actual hardware, as the CPU reads the image projection program from the ROM and executes the read image projection program, the above-described units are loaded into a main memory device, and the rotation control unit 104, the view angle control unit 106, and the image control unit 103, the image processing unit 102, the image cut-out unit 100, the keystone correction unit 108, the keystone adjustment unit 107, the registration unit 118, and the input control unit 119 are generated on the main storage device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection device comprising:
a projection unit that converts input image data into light and projects converted light with a predetermined view angle as a projection image onto a projection medium configured by a first projection face and a second projection face lined up to have a predetermined angle therebetween;
a projection direction changing unit that changes a projection direction of the projection unit from a first projection direction up to a second projection direction;
a projection angle deriving unit that derives a projection angle of the projection unit in the projection direction changed by the projection direction changing unit; and
a correction unit that corrects a trapezoidal distortion of the projection image projected onto the projection medium in accordance with the projection angle derived by the projection angle deriving unit, wherein the correction unit sets a correction amount for the trapezoidal distortion of a case where the derived projection angle is changed within a range larger than a first predetermined angle determined based on the projection direction toward a boundary between the first projection face and the second projection face and smaller than a second predetermined angle determined based on the projection direction toward the boundary to be the correction amount for the trapezoidal distortion at one of the first predetermined angle and the second predetermined angle or less.

2. The projection device according to claim 1, wherein the correction unit gradually decreases the correction amount for the trapezoidal distortion according to a change of the derived projection angle from the first predetermined angle to a third predetermined angle that is determined based on the projection direction toward the boundary within the range and gradually increases the correction amount for the trapezoidal distortion according to a change of the derived projection angle from the third predetermined angle to the second predetermined angle.

3. An image correction method comprising:
converting input image data into light and projecting converted light with a predetermined view angle as a projection image onto a projection medium configured by a first projection face and a second projection face lined up to have a predetermined angle therebetween using a projection unit;
changing a projection direction of the projection unit from a first projection direction up to a second projection direction;
deriving a projection angle of the projection unit in the projection direction changed in the changing of a projection direction; and
correcting a trapezoidal distortion of the projection image projected onto the projection medium in accordance with the projection angle derived in the deriving of a projection angle,
wherein, in the correcting of a trapezoidal distortion, a correction amount for the trapezoidal distortion of a case where the derived projection angle is changed within a range larger than a first predetermined angle determined based on the projection direction toward a boundary between the first projection face and the second projection face and smaller than a second predetermined angle determined based on the projection direction toward the boundary is set to be the correction amount for the trapezoidal distortion at one of the first predetermined angle and the second predetermined angle or less.

4. The image correction method according to claim 3, wherein, in the correcting of a trapezoidal distortion, the correction amount for the trapezoidal distortion according to a change of the derived projection angle from the first predetermined angle to a third predetermined angle that is determined based on the projection direction toward the boundary within the range is gradually decreased, and the correction amount for the trapezoidal distortion according to a change of the derived projection angle from the third predetermined angle to the second predetermined angle is gradually increased.

* * * * *